US010438290B1

(12) United States Patent
Winklevoss et al.

(10) Patent No.: US 10,438,290 B1
(45) Date of Patent: Oct. 8, 2019

(54) SYSTEM, METHOD AND PROGRAM PRODUCT FOR GENERATING AND UTILIZING STABLE VALUE DIGITAL ASSETS

(71) Applicant: Winklevoss IP, LLC, Wilmington, DE (US)

(72) Inventors: Cameron Howard Winklevoss, New York, NY (US); Tyler Howard Winklevoss, New York, NY (US)

(73) Assignee: Winklevoss IP, LLC, Wilmington, DE (US)

( * ) Notice: Subject to any disclaimer, the term of this patent is extended or adjusted under 35 U.S.C. 154(b) by 0 days.

(21) Appl. No.: 15/960,040

(22) Filed: Apr. 23, 2018

Related U.S. Application Data

(60) Provisional application No. 62/660,655, filed on Apr. 20, 2018, provisional application No. 62/647,353, filed on Mar. 23, 2018, provisional application No. 62/638,679, filed on Mar. 5, 2018.

(51) Int. Cl.
| | |
|---|---|
| *G06Q 40/06* | (2012.01) |
| *H04L 9/32* | (2006.01) |
| *G06Q 20/10* | (2012.01) |
| *H04L 9/06* | (2006.01) |
| *G06F 16/18* | (2019.01) |
| *G06F 16/182* | (2019.01) |
| *G06Q 20/06* | (2012.01) |
| *G06Q 20/22* | (2012.01) |

(52) U.S. Cl.
CPC ......... *G06Q 40/06* (2013.01); *G06F 16/1815* (2019.01); *G06F 16/1834* (2019.01); *G06Q 20/065* (2013.01); *G06Q 20/102* (2013.01); *G06Q 20/223* (2013.01); *H04L 9/0637* (2013.01); *H04L 9/3213* (2013.01)

(58) Field of Classification Search
CPC ..... G06Q 40/06; G06Q 20/065; G06Q 20/223
See application file for complete search history.

(56) References Cited

U.S. PATENT DOCUMENTS

| | | | |
|---|---|---|---|
| 4,790,431 A | 12/1988 | Reel et al. | |
| 5,675,649 A | 10/1997 | Brennan et al. | |
| 5,799,287 A | 8/1998 | Dembo | |
| 5,950,176 A | 9/1999 | Keiser et al. | |
| 6,021,257 A | 2/2000 | Chikauchi | |
| 6,157,920 A | 12/2000 | Jakobsson et al. | |

(Continued)

FOREIGN PATENT DOCUMENTS

| | | |
|---|---|---|
| CA | 2627540 A1 | 9/2009 |
| CN | 103927656 | 7/2014 |

(Continued)

OTHER PUBLICATIONS

"What Is Blockchain Technology?" Quora. N.p. Jan. 15, 2009. Web. Jun. 9, 2017. <https://www.quora.com/What-is-blockchain-technology-1>.

(Continued)

*Primary Examiner* — Jay Huang
(74) *Attorney, Agent, or Firm* — Amster Rothstein & Ebenstein LLP

(57) ABSTRACT

The present invention generally relates to the use of a stable value digital asset to pay dividends for securities and other financial instruments tied to a blockchain.

21 Claims, 31 Drawing Sheets

(56) References Cited

U.S. PATENT DOCUMENTS

| | | |
|---|---|---|
| 6,505,174 B1 | 1/2003 | Keiser et al. |
| 6,523,012 B1 | 2/2003 | Glassman et al. |
| 6,583,712 B1 | 6/2003 | Reed et al. |
| 7,167,565 B2 | 1/2007 | Rajasekaran |
| 7,330,538 B2 | 2/2008 | Dunsmuir |
| 7,391,865 B2 | 6/2008 | Orsini et al. |
| 7,487,123 B1 | 2/2009 | Keiser et al. |
| 7,677,974 B2 | 3/2010 | Van Luchene |
| 7,716,484 B1 | 5/2010 | Kaliski, Jr. |
| 7,870,058 B2 | 1/2011 | Maltzman |
| 7,873,573 B2 | 1/2011 | Realini |
| 7,999,748 B2 | 8/2011 | Ligtenberg et al. |
| 8,108,278 B2 | 1/2012 | Tzekin et al. |
| 8,108,283 B2 | 1/2012 | Dimitri et al. |
| 8,139,770 B2 | 3/2012 | Zheng et al. |
| 8,224,702 B2 | 7/2012 | Mengerink et al. |
| 8,229,855 B2 | 7/2012 | Huang et al. |
| 8,229,859 B2 | 7/2012 | Samid |
| 8,239,330 B2 | 8/2012 | Montero et al. |
| 8,249,965 B2 | 8/2012 | Tumminaro |
| 8,255,297 B2 | 8/2012 | Morgenstern et al. |
| 8,275,692 B2 | 9/2012 | Cartledge et al. |
| 8,306,910 B2 | 11/2012 | Wilkes |
| 8,326,751 B2 | 12/2012 | Driemeyer et al. |
| 8,352,326 B2 | 1/2013 | Betzler et al. |
| 8,452,703 B2 | 5/2013 | O'Leary et al. |
| 8,538,848 B1 * | 9/2013 | Myhrvold ............ G06Q 50/184 705/36 R |
| 8,606,685 B2 | 12/2013 | Keiser et al. |
| 8,630,951 B2 | 1/2014 | Wilkes |
| 8,688,525 B2 | 4/2014 | Minde |
| 8,688,563 B2 | 4/2014 | Mehew et al. |
| 8,712,914 B2 | 4/2014 | Lyons et al. |
| 8,719,131 B1 | 5/2014 | Roth et al. |
| 9,704,143 B2 | 7/2017 | Walker et al. |
| 9,747,586 B1 * | 8/2017 | Frolov ............... G06Q 20/0655 |
| 9,794,074 B2 | 10/2017 | Toll et al. |
| 10,026,082 B2 | 7/2018 | Davis |
| 10,146,792 B1 | 12/2018 | Dobrek et al. |
| 2002/0143614 A1 | 10/2002 | MacLean et al. |
| 2002/0171546 A1 | 11/2002 | Evans et al. |
| 2003/0009413 A1 | 1/2003 | Furbush et al. |
| 2003/0014749 A1 | 1/2003 | Simons et al. |
| 2003/0225672 A1 | 12/2003 | Hughes et al. |
| 2004/0049464 A1 | 3/2004 | Ohmori et al. |
| 2004/0143710 A1 | 7/2004 | Walmsley |
| 2004/0193657 A1 | 9/2004 | Saito et al. |
| 2004/0243488 A1 | 12/2004 | Yamamoto et al. |
| 2005/0044022 A1 | 2/2005 | Spirgel et al. |
| 2005/0240510 A1 | 10/2005 | Schweickert et al. |
| 2007/0117615 A1 | 5/2007 | Van Luchene |
| 2007/0146797 A1 | 6/2007 | Sakai et al. |
| 2007/0219869 A1 | 9/2007 | Haines et al. |
| 2007/0271455 A1 | 11/2007 | Nakano et al. |
| 2008/0109280 A1 | 5/2008 | Csoka |
| 2008/0120221 A1 | 5/2008 | Toneguzzo |
| 2008/0140578 A1 | 6/2008 | Felt et al. |
| 2008/0167965 A1 | 7/2008 | Von Nothaus et al. |
| 2008/0215474 A1 | 9/2008 | Graham et al. |
| 2008/0243703 A1 | 10/2008 | Al-Herz et al. |
| 2008/0249957 A1 | 10/2008 | Masuyama et al. |
| 2008/0281444 A1 | 11/2008 | Krieger et al. |
| 2009/0089168 A1 | 4/2009 | Schneck |
| 2009/0094134 A1 | 4/2009 | Toomer et al. |
| 2009/0098939 A1 | 4/2009 | Hamilton, II et al. |
| 2009/0119200 A1 | 5/2009 | Riviere |
| 2009/0132830 A1 | 5/2009 | Haga et al. |
| 2009/0265268 A1 | 10/2009 | Huang et al. |
| 2010/0094771 A1 | 4/2010 | VanderPal |
| 2010/0174646 A1 | 7/2010 | Cole et al. |
| 2010/0228674 A1 | 9/2010 | Ogg et al. |
| 2010/0250360 A1 | 9/2010 | Ball et al. |
| 2010/0306084 A1 | 12/2010 | Ciptawilangga |
| 2011/0110516 A1 | 5/2011 | Satoh |
| 2011/0112662 A1 | 5/2011 | Thompson et al. |
| 2011/0231913 A1 | 9/2011 | Feng et al. |
| 2011/0270748 A1 | 11/2011 | Graham, III et al. |
| 2011/0302412 A1 | 12/2011 | Deng et al. |
| 2012/0078693 A1 | 3/2012 | Wilkes |
| 2012/0101886 A1 | 4/2012 | Subramanian et al. |
| 2012/0123924 A1 | 5/2012 | Rose et al. |
| 2012/0185395 A1 | 7/2012 | Wilkes |
| 2012/0239543 A1 | 9/2012 | Ryan |
| 2012/0278200 A1 | 11/2012 | van Coppenolle et al. |
| 2013/0036373 A1 | 2/2013 | Alderfer et al. |
| 2013/0041773 A1 | 2/2013 | Muse |
| 2013/0054471 A1 | 2/2013 | Samid |
| 2013/0061049 A1 | 3/2013 | Irvine |
| 2013/0159699 A1 | 6/2013 | Torkkel |
| 2013/0166455 A1 | 6/2013 | Feigelson |
| 2013/0191277 A1 | 7/2013 | O'Leary et al. |
| 2013/0232023 A2 | 9/2013 | Muse |
| 2013/0238478 A1 | 9/2013 | Bruno |
| 2013/0246233 A1 | 9/2013 | Hakim |
| 2013/0254052 A1 | 9/2013 | Royyuru et al. |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary |
| 2013/0325701 A1 | 12/2013 | Schwartz |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0081710 A1 | 3/2014 | Rabie |
| 2014/0122903 A1 | 5/2014 | Endo et al. |
| 2014/0141869 A1 | 5/2014 | Shore |
| 2014/0156497 A1 | 6/2014 | Mehew et al. |
| 2014/0164251 A1 | 6/2014 | Loh |
| 2014/0233740 A1 | 8/2014 | Niamut et al. |
| 2014/0280476 A1 | 9/2014 | Chiussi et al. |
| 2014/0310527 A1 | 10/2014 | Veugen et al. |
| 2014/0344015 A1 | 11/2014 | Puertolas-Montanes et al. |
| 2015/0033301 A1 | 1/2015 | Pianese |
| 2015/0120567 A1 | 4/2015 | Van Rooyen et al. |
| 2015/0120569 A1 | 4/2015 | Belshe |
| 2015/0170112 A1 | 6/2015 | Decastro |
| 2015/0193744 A1 | 7/2015 | Adleman |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik |
| 2015/0262168 A1 | 9/2015 | Armstrong |
| 2015/0262171 A1 | 9/2015 | Langschaedel |
| 2015/0262172 A1 | 9/2015 | Rebernik |
| 2015/0262173 A1 | 9/2015 | Durbin et al. |
| 2015/0262176 A1 | 9/2015 | Langschaedel et al. |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Färnlöf et al. |
| 2015/0348169 A1 | 12/2015 | Harris |
| 2015/0356523 A1 | 12/2015 | Madden |
| 2015/0356555 A1 | 12/2015 | Pennanen |
| 2015/0363777 A1 | 12/2015 | Ronca et al. |
| 2015/0363783 A1 | 12/2015 | Ronca et al. |
| 2015/0379510 A1 | 12/2015 | Smith |
| 2016/0027229 A1 | 1/2016 | Spanos et al. |
| 2016/0028552 A1 | 1/2016 | Spanos et al. |
| 2016/0078219 A1 | 3/2016 | Hernan |
| 2016/0080156 A1 | 3/2016 | Kaliski, Jr. et al. |
| 2016/0086187 A1 | 3/2016 | Joao |
| 2016/0092988 A1 | 3/2016 | L etourneau |
| 2016/0112200 A1 | 4/2016 | Kheterpal et al. |
| 2016/0125040 A1 | 5/2016 | Kheterpal et al. |
| 2016/0162873 A1 | 6/2016 | Zhou |
| 2016/0203448 A1 | 7/2016 | Metnick |
| 2016/0234026 A1 * | 8/2016 | Wilkins ................. G06F 21/64 |
| 2016/0335533 A1 * | 11/2016 | Davis ........................ G06F 9/44 |
| 2016/0371771 A1 * | 12/2016 | Serrano ................... H04L 67/12 |
| 2017/0005804 A1 | 1/2017 | Zinder |
| 2017/0017955 A1 | 1/2017 | Stern |

(56) References Cited

U.S. PATENT DOCUMENTS

| | | |
|---|---|---|
| 2017/0091750 A1 | 3/2017 | Maim |
| 2017/0124535 A1 | 5/2017 | Juels |
| 2017/0132630 A1 | 5/2017 | Castinado |
| 2017/0154331 A1 | 6/2017 | Voorhees |
| 2017/0293898 A1 | 10/2017 | Rampton |
| 2018/0068359 A1 | 3/2018 | Preston et al. |
| 2018/0089758 A1 | 3/2018 | Stradling et al. |
| 2018/0089759 A1 | 3/2018 | Stradling et al. |
| 2018/0089760 A1 | 3/2018 | Stradling et al. |
| 2018/0089761 A1 | 3/2018 | Stradling et al. |
| 2018/0091316 A1 | 3/2018 | Stradling et al. |
| 2018/0204192 A1 | 7/2018 | Whaley et al. |
| 2019/0095880 A1 | 3/2019 | Glover et al. |
| 2019/0130399 A1 | 5/2019 | Wright et al. |

FOREIGN PATENT DOCUMENTS

| | | |
|---|---|---|
| EP | 2634738 A1 | 4/2013 |
| WO | WO 00/26745 | 5/2000 |
| WO | WO2000026745 A2 | 5/2000 |
| WO | WO 01/67409 | 9/2001 |
| WO | WO 01/86373 | 11/2001 |
| WO | WO 2008/127428 | 10/2008 |
| WO | WO2011008630 | 1/2011 |
| WO | 2016-015041 | 1/2012 |
| WO | WO2013034278 A2 | 3/2013 |
| WO | WO 2015/059669 | 4/2015 |
| WO | WO 2015/085393 | 6/2015 |
| WO | WO 2015/113519 | 8/2015 |
| WO | WO 2015/179020 | 11/2015 |
| WO | WO 2016/008659 | 1/2016 |
| WO | WO 2016/022864 | 2/2016 |
| WO | WO 2016/029119 | 2/2016 |

OTHER PUBLICATIONS

Bankex Proof-of-Asset Protocol—The Smart White Paper, version 0.3.1 beta (Oct. 19, 2017) 36 pgs.

ATMIA ATM Industry Association Position Paper, www.atmia.com, Internet.

Winklevosses' Gemini to Offer Cryptocurrency Block Trading, Olga Kharif and Matthew Leising, Bloomberg.com (Apr. 9, 2018) https://www.bloomberg.com/news/articles/2018-04-09/winklevoss-s-gemini-to-offer-cryptocurrency-block-trading, Internet.

A block chain based decentralized exchange, Harsh Patel.

Marketplace—Gemini, web.archive.org (Last modified Jan. 8, 2018) http://web.archive.org/web/20180125115941/https://gemini.com/marketplace/, Internet.

Marketplace—Gemini, web.archive.org (Last modified Nov. 25, 2017) http://web.archive.org/web/20171211092415/https://gemini.com/marketplace/, Internet.

Marketplace, Gemini.com (Last modified Sep. 20, 2018) https://gemini.com/marketplace/, Internet.

The Ripple Network Review—What Is Ripple?, Donald McIntyre—Etherplan (Aug. 1, 2013) https://etherplan.com/2013/08/01/the-ripple-network-review-what-is-ripple/4103/, Internet.

U.S. Appl. No. 61/954,434, filed Mar. 17, 2014.

U.S. Appl. No. 61/990,017, filed May 7, 2014.

U.S. Appl. No. 62/042,676, filed Aug. 27, 2014.

U.S. Appl. No. 62/056,100, filed Sep. 26, 2014.

U.S. Appl. No. 62/086,669, filed Dec. 2, 2014.

U.S. Appl. No. 62/099,992, filed Jan. 15, 2015.

David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.

Ken Hawkins, Exchange-Traded Funds (ETFs), Investopedia (May 12, 2013) Internet archive, https://web.archive.org/web/20130512125447/http://www.investopedia.com/university/exchange-traded-fund/.

Proof of stake instead of proof of work, Bitcoin Forum, https://bitcointalk.org/index.php?topic=27787 (last visited Nov. 6, 2015).

Trading Namecoins for Bitcoins, Bitcoin Forum, https://bitcointalk.org/index.php?topic=6289.0 (last visited Nov. 6, 2015).

Rafael Cosman, https://www.facebook.com/rafaelCosman, Internet, accessed Apr. 16, 2018, 14 pgs., Facebook, Internet.

Erin Hobey, Co-Founder Rafael Cosman: TrustToken Is an Asset Tokenization Platform Backed by Real Assets that Democratize Access Both to Investment Opportunities & Capital, https://www.crowdfundinsider.com/2018/02/128365-interview-trusttoken-rafael/, Feb. 20, 2018 @ 12:30 p.m.—accessed Apr. 16, 2018, 10 pgs., Internet.

TrustProtocol, Commits• trusttoken/TrustProtocol • GitHub, https://github.com/trusttoken/TrustProtocol/commits/master?after=54f8673366f8dc79cbf4f2aa3e9416bb7c18150d+34, 1 pg., accessed Apr. 16, 2018, Internet.

Patent Application Full Text and Image Database, Results of Search in PGPUB Production Database Mar. 15-Sep. 30, 2001 for: IN/"Cosman; Rafael," 1 pg., U.S. Patent & Trademark Office.

Rafael Cosman, Rafael Cosman (@RafaelCosman) | Twitter, https://twitter.com/rafaelcosman?lang=en, accessed Apr. 16, 2018, 23 pgs., Internet.

Rafael Cosman, RafaelCosman (Rafael Cosman) / Repositories • GitHub, https://github.com/RafaelCosman? page=2&tab=repositories, accessed Apr. 16, 2018, 3 pgs., Internet.

Rafael Cosman, RafaelCosman (Rafael Cosman) / Repositories • GitHub, https://github.com/RafaelCosman?tab=repositories, accessed Apr. 16, 2018, 4 pgs., Internet.

Rafael Cosman, RafaelCosman (Rafael Cosman) • GitHub, https://github.com/RafaelCosman, accessed Apr. 16, 2018, 1 pg., Internet.

Rafael Cosman, Deep Dive with Rafael Cosman, CTO & Cofounder TrustToken, https://www.tokendaily.co/p/deep-dive-with-rafael-cosman-cto-cofounder-trusttoken, accessed Apr. 16, 2018, 5 pgs., Token Daily, Internet.

Stephen Kade, TrueUSD: A Stablecoin That You Can Redeem 1-for-1 for US Dollars, https://blog.trusttoken.com/ trueusd-a-usd-backed-stablecoin-you-can-trust-9688796cfd0d, Jan. 23, 2018—accessed Apr. 16, 2018, 9 pgs., Internet.

Trusttoken, Tokenization you can Trust, https://twitter.com/TrustToken, accessed Apr. 16, 2018, 18 pgs., TrustToken (@TrustToken) | Twitter, Internet.

Trusttoken, Introducing Crunchbase Pro, https://www.crunchbase.com/organization/trusttoken#section-overview, accessed Apr. 16, 2018, 1 pg., TrustToken | Crunchbase, Internet.

Trusttoken, Tokenization you can Trust, https://github.com/trusttoken, accessed Apr. 16, 2018, 2 pgs., TrustToken • GitHub, Internet.

Trusttoken, Executive Summary, https://docsend.com/view/ws6tkvs, Feb. 14, 2018 (accessed Apr. 16, 2018) 7 pgs., Version 0.61, TrustToken, Internet.

Techrecaps, TrustToken Private and Public Pre-Sale FAQ, https://hackernoon.comitrusttoken-launches-trueusd-stablecoin-on-bittrex-exchange-f506ac5cf6fc, Mar. 8 2018 (accessed Apr. 16, 2018) 4 pgs., TrustToken, Internet.

Trusttoken Team, TrustToken Launches TrueUSD Stablecoin on Bittrex Exchange, https://blog.trusttoken.com/ trusttoken-pre-sale-and-main-sale-faq-f7914f74fb6d, Feb. 15, 2018 (accessed Apr. 16, 2018) 5 pgs., TrustToken, Internet.

Cosmos, A Network of Distributed Ledgers, Jae Kwon and Ethan Buchman, https://cosmos.network/resources/whitepaper, (accessed May 29, 2018) Whitepaper—Resources—Cosmos Network, Internet.

The Security Token Thesis—Hacker Noon, Stephen McKeon, https://hackernoon.com/the-security-token-thesis-4c5904761063, (Accessed May 29, 2018), Hackernoon.com, Internet.

Compound: The Money Market Protocol—Version 0.2 (Feb. 2018) Robert Leshner, Geoffrey Hayes, 10 pgs., https://compound.finance, Internet.

Interledger Architecture | Interledger (Accessed May 29, 2018), 11 pgs. https://interledger.org/rfcs/0001-interledger-architecture/draft-2.html, Internet.

(56) References Cited

OTHER PUBLICATIONS

JPMorgan Has Big Plans for Blockchain by Rakesh Sharma, May 10, 2018, Investopedia, 6 pgs., https://www.investopedia.com/news/jpmorgan-has-big-plans-blockchain/, Internet.
JPMorgan Trial Puts Debt Issuance on a Blockchain, Sujha Sundararajan, CoinDesk, (Apr. 10, 2018) 8 pgs., https://www.coindesk.com/jpmorgan-trial-puts-debt-issuance-on-a-blockchain/, Internet.
Polkadot paper, Dr. Gavin Wood, Version: 1 (Sep. 20, 2017).
John McCrank—UK-based Coinfloor to launch physically settled bitcoin futures—Reuters (Accessed Jun. 18, 2018) 2 pgs., https://uk.reuters.com/article/uk-crypto-currencies-coinfloor/uk-based-coinfloor-to-launch-physically-settled-bitcoin-futures-idUKKCNGQ2DF, Internet.
Writing upgradable contracts in Solidity—Colony, Elena Dimitrova (Jun. 8, 2016) 18 pgs., https://blog.colony.io/writing-upgradeable-contracts-in-solidity-6743f0eecc88, Internet.
Burnable Token, OpenZeppelin.org (accessed Jun. 18, 2018) https://openzeppelin.org/api/docs/tokenERC20BurnableToken.html, 2 pages.
Coinbase Custody is Officially Open for Business, The Coinbase Blog, Sam McIngvale (Jul. 2) https://blog.coinbase.com/coinbase-custody-is-officially-open-for-business-182c297d65d9, 4 pages.
Coinbase Custody—coinbase.com (retrieved Jul. 9, 2018) https://custody.coinbase.com/, 3 pages.
Dapp-bin/wallet.sol at master • ethereum/dapp-bin • GutHub (retrieved Jun. 21, 2018) https:github.com/ethereum/dapp-bin/blob/master/wallet/wallet.sol, 7 pages.
Token Standard Extension for Increasing & Decreasing Supply, Alex Miller • ethereum/EIPs • GitHub (retrieved Jun. 21, 2018), https://github.com/ethereum/EIPs/pull/621, 21 pages.
ERC 644: Token Standard for Modular and Upgradeable Tokens • Issue #644 • ethereumlEIPs • GitHub, (opened by chrisfranko—Jun. 16, 2017) https://github.com/ethereum/EIPs/issues/644, 9 pages.
GitHub—BitGoleth-multisig-v2: Multi-Sig Wallet v2, supporting original Wallet.sol methods with additional confirmAndExecute improvements to allow for single-transaction signing by multiple owners (retrieved Jun. 21, 2018) https://github.com/BitGo/eth-multisig-v2, 2 pages.
Fundamentals, FAQ (Accessed Jun. 26, 2018) 10 pgs. https://faq.rsk.com/en/main/, Internet.
Mike Calvanese, Flexible Upgradability for Smart Contracts—Level K—Medium (Mar. 10) 15 pgs., https://medium.com/level-k/flexible-upgradability-for-smart-contracts-9778d80d1638.
Ico/contracts/BurnableToken.sol at master—TokenMarketNet/ico—GitHub (Accessed Jun. 18, 2018) 1 pp., https://github.com/TokenMarketNet/ico/blob/master/contracts/BurnableToken.sol, Internet.
Ico/MintableToken.sol at master—TokenMarketNet/ico—GitHub (Accessed Jun. 21, 2018), 2 pgs., https://github.com/TokenMarketNet/ico/blob/master/contracts/MintableToken.sol, Internet.
Ico/UpgradeableToken.sol at master• TokenMarketNet/ico • GitHub (Accessed Jun. 8, 2018) 3 pgs., https://github.com/TokenMarketNet/ico/blob/master/contracts/UpgradeableToken.sol, Internet.
MintableToken contract MintableToken is StandardToken • OpenZeppelin 1.8.0, OpenZeppelin.org (Accessed Jun. 18, 2018) 3 pgs., https://openzeppelin.org/api/docs/token_ERC20_MintableToken.html, Internet.
GitHub—gnosis/MultiSigWallet: Allows multiple parties to agree on transactions before execution,(Accessed Jun. 21, 2018) 3 pgs., https://github.com/Gnosis/MultiSigWallet, Internet.
GitHub—ConsenSys/MultiSigWallet—Ethereum MultiSigWallet (accessed Jun. 21, 2018) 1 pg., 3. https://github.com/ConsenSys/MultiSigWallet, Internet.
New batchOverflow Bug in Multiple ERC20 Smart Contracts (CVE-2018-10299) A Blockchain Security Company—Peckshield (Apr. 22, 2018) medium.com/@peckshield/alert-new-batchoverflow-bug-in-multiple-erc20-smart-contracts-cve-2018-10299-511067db6536, Internet.
Home—OmniLayer/omnicore Wiki—GitHub—Welcome to the Omni Core wiki! (Accessed Jun. 26, 2018) 1 pg., https://github.com/OmniLayer/omnicore/wiki, Internet.
StandardToken—contract StandardToken is ERC20, BasicToken—OpenZeppelin (Accessed Jun. 21, 2018) https://openzeppelin.org/api/docs/token_ERC20_StandardToken.html, Internet.
openzeppelin-solidity/BurnableToken.sol at master—OpenZeppelin/openzeppelin-solidity—GitHub (Accessed Jun. 18, 2018) 1 pg., https://github.com/OpenZeppelin/openzeppelin-solidity/blob/master/contracts/token/ERC20/BurnableToken.sol, Internet.
OpenZeppelin/openzeppelin-solidity (Accessed Jun. 21, 2018) 3 pgs., https://github.com/OpenZeppelin/openzeppelin-solidity/blob/master/contracts/token/ERC20/StandardToken.sol, Internet.
Smart Contract Upgradeability using Eternal Storage (Accessed Jun. 8, 2018) 6 pgs., 3. https://blog.zeppelinos.org/smart-contract-upgradeability-using-eternal-storage/, Internet.
Superbitcoin—Supersmartbitcoin.com (Accessed Jun. 26, 2018) 8 pgs., http://supersmartbitcoin.com/, Internet.
Tether: Fiat currencies on the Bitcoin blockchain (20 pgs.).
Upgradable Solidity Contract Design—Rocket Pool—Medium, David Rugendyke (Nov. 21, 2017) 21 pgs., https://medium.com/rocket-pool/upgradable-solidity-contract-design-54789205276d, Internet.
[ANN] M-of-N "Fragmented Backups" now in Armory (command-line only), Bitcoin Forum (Mar. 6, 2013), https://bitcointalk.org/index.php?topic=149820.0 (last visited Dec. 4, 2013).
2-of-3 Paper Wallets, Bitcoin Forum (published Jan. 29, 2013), https://bitcointalk.org/index.php?topic=139625.msg1487254 (last visited Dec. 4, 2013).
A Physical Price Tag for a Digital Currency. Introducing Bittag., BitTag, http://bittag.net/ (last visited Feb. 5, 2014).
A powerful trading platform for Bitcoin traders, BTXTrader.com (Aug. 13, 2013) Internet Archive, https://web.archive.org/web/20130813052513/http://www.btxtrader.com/.
About Bitcoin, Bitcoin.org (May 2, 2013) Internet Archive, http://web.archive.org/web/20130502214154/http://bitcoin.org/en/about.
An Open Source P2P Digital Currency, Bitcoin.org, http://bitcoin.org/en/ (last visited Jul. 22, 2013).
Ashlee Vance & Brad Stone, The Bitcoin-Mining Arms Race Heats Up, BloombergBusinessweek, http://www.businessweek.com/articles/2014-01-09/bitcoin-mining-chips-gear-computing-groups-competition-heats-up (last visited Jan. 9, 2014).
Bitcoin Fund Exclusively Available on EXANTE's Platform, EXANTE, https://exante.eu/press/news/266/ (last visited Oct. 10, 2013).
Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.
Bitcoin Theft Insurance, Ecoin Club (published Dec. 3, 2013), http://ecoinclub.com/bitcoin-insurance/ (last visited Dec. 5, 2013).
Bitcoin, Wikipedia (Jun. 24, 2013), Internet Archive http://web.archive.org/web/20130624030646/http://en.wikipedia.org/wiki/Bitcoin.
Bitcoinaverage code repository, GitHub, https://github.com/bitcoinaverage/bitcoinaverage/commits/master?page=134 (last visited Feb. 24, 2014).
BitcoinAverage.com—independent bitcoin price, Bitcoin Forum, https://bitcointalk.org/index.php?topic=270190.0 (last visited Feb. 24, 2014).
BitcoinAverage.com, Reddit, http://www.reddit.com/r/Bitcoin/comments/1jl9c2/ (last visited Feb. 24, 2014).
Bitcoin's First Kiosk, Robocoin (Jul. 2, 2013) Internet Archive, https://web.archive.org/web/20130702171110/https://robocoinkiosk.com/.
Bitcoin's First Real ATM, Robocoin Blog, http://blog.robocoinkiosk.com/ (last visited Nov. 11, 2013).
Bitflash Weekly Review (Apr. 14, 2014), Pantera, https://panteracapital.com/bitflash/ (last visited Apr. 15, 2014).
Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visited May 30, 2014).
Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).

(56) References Cited

OTHER PUBLICATIONS

Buying and Selling Linden Dollars, Second Life, http://community.secondlife.com/t5/English-Knowledge-Base/Buying-and-selling-Linden-dollars/ta-p/700107 (last visited Dec. 9, 2013).
Charts, Bitcoin Charts (May 10, 2013) Internet Archive, https://web.archive.org/web/20130510172057/http://bitcoincharts.com/charts/.
Choose Your Wallet, Bitcoin.org (May 30, 2013) Internet Archive, http://web.archive.org/web/20130530072551/http://bitcoin.org/en/choose-your-wallet.
Circle (May 19, 2014) Internet Archive, https://web.archive.org/web/20140519175717/https://www.circle.com/.
Coinbase, Bitcoin Wallet (Jul. 22, 2013) Internet Archive, http://web.archive.org/web/20130722200359/https://coinbase.com/.
Coinbase, Bitcoin Wallet, https://coinbase.com/ (last visited Aug. 15, 2013).
CoinDesk Bitcoin Price Index, CoinDesk, http://www.coindesk.com/price/ (last visited Oct. 23, 2013).
CoinDesk, This week we released the first version of our mobile app on iPhone, Twitter (published May 2, 2014), https://twitter.com/coindesk/status/462255287177453568?refsrc=email (last visited May 5, 2014).
Durnford, Barter network aims to help Mile End's cash-strapped live well, The Gazette [Montreal, Que] (Jan. 23, 1996).
Electrum, Bitcoin wiki, https://en.bitcoin.it/wiki/Electrum (last visited Jul. 22, 2013).
Elliptic Vault: Secure, Worry-free Storage for Your Bitcoins, Elliptic.co (Jan. 12, 2014) Internet Archive, https://web.archive.org/web/20140112043128/https://www.elliptic.co/vault.
FAQ: What's the Difference Between PPCoin and Bitcoin?, GitHub, https://github.com/ppcoin/ppcoin/wiki/FAQ (last visited Jul. 22, 2013).
First Bitcoin Capital Corp.(otc markets:BITCF) Launches Digital Currency Exchange, CoinQX.com in Beta, The Wall Street Journal MarketWatch, http://www.marketwatch.com/story/first-bitcoin-capital-corpotc-markets-bitcf-launches-digital-currency-exchange-coinqxcom-in-beta-2014-05-21 (last visited May 21, 2014).
How Bitcoin Works Under the Hood, Imponderable Things (Scott Driscoll's Blog) (published Jul. 14, 2013), http://www.imponderablethings.com/2013/07/how-bitcoin-works-under-hood.html (last visited Oct. 10, 2013).
How DigiCash Blew Everything, Next (published Jan. 1999), http://cryptome.org/jya/digicrash.htm (last visited Jan. 9, 2014).
How Does Bitcoin Work?, Bitcoin.org, (May 1, 2013) Internet Archive, http://web.archive.org/web/20130501092121/http://bitcoin.org/en/how-it-works.
How is Mt.Gox weighted average calculated?, Bitcoin Forum (Mar. 18, 2013), https://bitcointalk.org/index.php?topic=154548.0 (last visited Jul. 25, 2013).
Ina Steiner, eBay Mulls New Feature to Eliminate Deadbeat Bidders, EcommerceBytes Blog (published May 12, 2012), http://www.ecommercebytes.com/C/blog/blog.pl?/pl/2012/5/1336831866.html (last visited May 30, 2014).
Independent Bitcoin Price, BitcoinAverage, https://bitcoinaverage.com/explain.htm (last visited Mar. 4, 2014).
Introducing BDIC: Bitcoin's decentralized, privately-funded version of the FDIC, Reddit (published Dec. 4, 2013), http://www.reddit.com/r/Bitcoin/comments/1s365o/introducing_bdic_bitcoins_decentralized/ (last visited Dec. 5, 2013).
James Ball, Meet the seven people who hold the keys to worldwide internet security, The Guardian, http://www.theguardian.com/technology/2014/feb/28/seven-people-keys-worldwide-internet-security-web (last visited Mar. 7, 2014).
Jeremy Allaire, What We Have Been Up to at Circle, The Circle Blog (May 19, 2014) Internet Archive, https://web.archive.org/web/20140519162958/https://www.circle.com/2014/05/15/circle-update/.
Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.
John Biggs, Xapo Raises $20 Million to Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
Jon Southurst, ATM Industry Association Publishes Report on Bitcoin ATMs, CoinDesk (published Mar. 20, 2014), http://www.coindesk.com/atm-industry-association-publishes-report-bitcoin-atms/ (last visited Mar. 21, 2014).
Jonathan Shieber, Circle Emerges From Stealth to Bring Bitcoin to the Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Larry Ren, Proof of Stake Velocity: Building the Social Currency of the Digital Age, www.reddcoin.com (Apr. 2014).
Lisa Fleisher, London's New Bitcoin Exchange Hopes to Avoid Mt. Gox Fate, The Wall Street Journal (published Apr. 30, 2014), http://blogs.wsj.com/digits/2014/04/30/londons-new-bitcoin-exchange-hopes-to-avoid-mt-gox-fate/ (last visited May 1, 2014).
Markets API, Bitcoin Charts (Jun. 3, 2013) Internet Archive, https://web.archive.org/web/20130603091557/http://bitcoincharts.com/about/markets-api.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).
Writing Upgradable Smart Contracts in Solidity Narayan Prusty @narayanprusty—qnimate.com (Accessed Jun. 8, 2018) 9 pgs., http://qnimate.com/writing-upgradable-smart-contracts-in-ethereum/, Internet.
Japanese Banks to Harness Ripple DLT for Consumer Payments App, Wolfie Zhao, CoinDesk (Mar. 7, 2018) https://www.coindesk.com/japanese-banks-to-harness-ripple-dlt-for-consumer-payments-app/?ct=Sailthru_BI_Newsletters&mt=8&nr_email_referer=1%E2%80%A6, Internet.
Introducing Compound, the Money Market Protocol, Robert Leshner, Medium.com (Jan. 30, 2018) https://medium.com/compound-finance/introducing-compound-the-money-market-protocol-4b9546bac87, Internet.
LeviarCoin Announces Crowdsale for Its Revolutionary Blockchain-Based In-App Purchases and Software Protection Platform—LeviarCoin (Jun. 2, 2017) https://www.pmewswire.com/news-releases/leviarcoin-announces-crowdsale-for-its-revolutionary-blockchain-based-in-app-purchases-and-software-protection-platform-300468062.html, Internet.
Leviar—an Anonymous, Secure and Private Cryptocurency—Leviar Coin, 16 pgs.
Goldman Sachs files patent for virtual settlement currency—Jennifer Hughes, Financial Times (Dec. 3, 2015) https://www.ft.com/content/b0d8f614-997c-11e5-9228-87e603d47bdc, Internet.
Money Services Business (MSB) Registration for TrueUSD, TrustToken Team, www.trusttoken.com (Accessed Apr. 16, 2018) https://blog.trusttoken.com/money-services-business-msb-registration-for-trueusd-b0a5fc1ee673, Internet.
TrueCoin is registering as a Money Service Business (MSB), TrustToken Team, www.trusttoken.com (Accessed Apr. 16, 2018) https://blog.trusttoken.com/truecoin-is-registering-as-a-money-service-business-msb-866c25561675, Internet.
TrueUSD, the world's first legally-backed stable cryptocurrency, is now trading on Bittrex, TrustToken Team, www.trusttoken.com (Accessed Apr. 16, 2018) https://blog.trusttoken.com/trueusd-the-worlds-first-legally-backed-stable-cryptocurrency-is-now-trading-on-bittrex-6a49b621f058, Internet.
TrueUSD, the world's only stable cryptocurrency redeemable for USD, is now tradeable with Ether on Bittrex, TrustToken Team, www.trusttoken.com (Accessed Apr. 16, 2018) https://blog.trusttoken.com/trueusd-the-worlds-first-legally-backed-stable-cryptocurrency-is-now-tradeable-with-ether-on-5ab45091314e, Internet.

(56) References Cited

OTHER PUBLICATIONS

Who are the correspondent banks and trustee partners for TrueUSD?, TrustToken Team, www.trusttoken.com (Accessed Apr. 16, 2018) https://blog.trusttoken.com/who-are-the-correspondent-banks-and-trustee-partners-for-trueusd-e12508f0d5a2, Internet.

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.

Notice of References Cited, U.S. Appl. No. 12/192,809 (dated Oct. 10, 2012).

Online auctions: An in-depth look, National Consumers League, http://www.nclnet.org/personal-finance/121-online-auctions/279online-auctions-an-in-depth-look (last visited May 30, 2014).

PPCoin Proof of Stake Minting Setup Guide, Bitcoin Forum (Apr. 25, 2013) https://bitcointalk.org/index.php?topic=187714.0 (last visited Jul. 22, 2013).

PPCoin, Wikipedia, http://en.wikipedia.org/wiki/PPCoin (last visited Jul. 22, 2013).

Private Bitcoin Insurance, Inscrypto, http://go.inscrypto.com (last visited Jan. 24, 2014).

Proof-of-stake, Wikipedia, http://en.wikipedia.org/wiki/Proof-of-stake (last visited Jul. 22, 2013).

Proof-of-work System, Wikipedia, http://en.wikipedia.org/wiki/Proof-of-work (last visited Jul. 22, 2013).

Protocol of Bitcoin, Wikipedia, http://en.wikipedia.org/wiki/Bitcoin_mining (last visited Jul. 22, 2013).

Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).

Rob Wile, Shares of No-Name Tech Company Go Crazy After It Announces It's Getting Into the Bitcoin Game, Business Insider, http://www.businessinsider.com/wpcs-bitcoin-2013-12?nr_email_referer=1&utm_source=Triggermail&utm_medium=email&utm_content=emailshare (last visited Dec. 30, 2013).

Satoshi Nakamoto, Bitcoin: A Peer-to-Peer Electronic Cash System (Oct. 31, 2008).

Securing Your Wallet, Bitcoin.org (Jul. 21, 2013) Internet Archive, http://web.archive.org/web/20130721194621/http://bitcoin.org/en/secure-your-wallet.

Security for Your Peace of Mind, Coinbase, https://coinbase.com/security (last visited Oct. 28, 2013).

Shamir's Secret Sharing, Wikipedia, http://en.wikipedia.org/wiki/Shamir's_Secret_Sharing (last visited Jul. 22, 2013).

Some Things You Need to Know, Bitcoin.org (May 2, 2013) Internet Archive, http://web.archive.org/web/20130502051011/http://bitcoin.org/en/you-need-to-know.

Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).

Sunny King & Scott Nadal, PPCoin: Peer-to-Peer Crypto-Currency with Proof-of-Stake, (Aug. 19, 2012).

TigerDirect.com Now Accepts Bitcoin Payments!, TigerDirect, http://www.tigerdirect.com/bitcoin/ (last visited Feb. 6, 2014).

U.S. Appl. No. 60/884,172, filed Jan. 9, 2007.

U.S. Appl. No. 61/225,256, filed Jul. 14, 2009.

USD Average Price History, BitcoinAverage, https://bitcoinaverage.com/charts.htm@USD-averages-all (last visited Feb. 24, 2014).

Using Offline Wallets in Armory, Armory (May 20, 2013) Internet Archive, http://web.archive.org/web/20130520100213/https://bitcoinarmory.com/using-offline-wallets-in-armory/.

Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).

Why Bitcoin Is Changing the World, Bitcoin.org (Jun. 20, 2013) Internet Archive, http://web.archive.org/web/20130620062218/http://bitcoin.org/en/innovation.

Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.

World Gold Council, How SPDR Gold Shares (2840 HK) are Created and Redeemed (Mar. 2013).

Bitcoin, A Primer for Policymakers(2013).

Bitcoin: a first assessment, FX and Rates | Global, Bank of America Merrill Lynch (Dec. 5, 2013).

Bitcoin: Questions, Answers, and Analysis of Legal Issues, Congressional Research Service (Dec. 20, 2013).

The audacity of bitcoin, Risks and opportunities for corporates and investors, Global Rates & FX Research, J.P. Morgan (Feb. 11, 2014), http://www.jpmorganmarkets.com/GlobalFXStrategy.

John Heggestuen, Bitcoin: How It Works, and How It Could Fundamentally Change How Companies and Individuals Handle Payments, BI Intelligence (Jan. 30, 2014).

Bitcoin: Intrinsic Value as Conduit for Disruptive Payment Network Technology, Wedbush, Computer Services: Financial Technology (Dec. 1, 2014).

Digitizing Trust: Leveraging the Bitcoin Protocol Beyond the "Coin", Wedbush, Computer Services: Financial Technology (Jan. 2, 2014).

Bitcoin: Watch the Innovation, Not the Price, Wedbush, Computer Services: Financial Technology (Feb. 14, 2014).

"How Bitcoin is Driving Digital Innovation in Entertainment, Mediaand Communications (EMC), PwC Consumer Intelligence Series, Digital Disruptor, (Jan. 27, 2014)."

Bitcoins and Banks: Problematic currency, interesting payment system, UBS, Global Research (Mar. 28, 2014).

François R. Velde, Bitcoin: A primer, The Federal Reserve Bank of Chicago, Chicago Fed Letter (Dec. 2013).

David Andolfatto, Bitcoin and Beyond: The Possibilities and Pitfalls of Virtual Currencies, Federal Reserve Bank of St. Louis, Dialogue With the Fed, Beyond Today's Financial Headlines (Mar. 31, 2014).

All About Bitcoin, Goldman Sachs, Global Macro Research, Top of Mind, Issue 21 (Mar. 11, 2014).

Julieta Duek and Demian Brener, Bitcoin: Understanding and Assessing potential Opportunities, Quasar Ventures, (Jan. 2014).

"Yacine Ghalim and Max Niederhofer, bitcoin: Primer, State of Play, Discussion, Courmayeur, Sunstone Capital (Jan. 24, 2014)."

Timing and Sizing the Era of Bitcoin, Wedbush, Computer Services: Financial Technology (May 27, 2014).

State of Bitcoin 2014, CoinDesk (Feb. 26, 2014).

Ronald A. Glantz, Pantera Primer, (Mar. 11, 2014).

Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).

Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015).

Blocktrail|Bitcoin Block Explorer, Blocktrail (Aug. 18, 2014), https://www.blocktrail.com/.

Jerry Bito and Andrea Castillo, Bitcoin A Primer for Policymakers, Mercatus Center, George Mason University (2013).

Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).

International Search Report and Written Opinion issued in Application No. PCT/US16/25189 dated Jul. 1, 2016 (15 pp.).

"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.

International Search Report and Written Opinion issued in Application No. PCT/US16/040711 dated Oct. 4, 2016 (14 pages).

(56) References Cited

OTHER PUBLICATIONS

"Blockchain Technologies Corp Makes History, 2016 Iowa Caucus Results Forever Documented on Blockchain," https://globenewswire.com/news-release/2016/02/06/808320/10159855/en-Blockchain-Technologies-Corp-Makes-History-2016-Iowa-Caucus-Results-Forever-Documented-on-Blockchain.html, Feb. 5, 2016, 2 pages.

"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.

"Nasdaq Launches Enterprise-Wide Blockchain Technology Initiative," Nasdaq, https://globenewswire.com/news-release/2015/05/11/734456/10133665/en/Nasdaq-Launches-Enterprise-Wide-Blockchain-Technology-Initiative.html, May 11, 2015, 3 pages.

"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.

Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).

"Coinsetter Launches Out of Beta, Platform Now a Full U.S.Bitcoin Exchange, Coinsetter blog (Jul. 24, 2014), http://www.coinsetter.com/blog/2014/07/24/coinsetter-launches-beta-platform-now-full-us-bitcoin-exchange/(last visited Jul. 24, 2014)."

Request for Administrative Ruling on the Application of FinCEN's Regulations to a Virtual Currency Trading Platform, United States Department of the Treasury, FinCEN, (Oct. 27, 2014).

Request for Administrative Ruling on the Application of FinCEN's Regulations to a Virtual Currency Payment System, United States Department of the Treasury, FinCEN, (Oct. 27, 2014).

Daniel Roberts, On Winklevoss Bitcoin index, it's open season for developers, Fortune, (Jul. 22, 2014).

Evan L. Greebel et al., Recent Key Bitcoin and Virtual Currency Regulatory and Law Enforcement Developments, Virtual Currency Advisory, Katten Muchin Rosenman LLP (Nov. 13, 2014).

BTC, Google Finance, https://www.google.com/finance?q=CURRENCY%3ABTC&ei=T-euU7jVFZOUwQPNkIHYCQ) (last visited Jul. 11, 2014).

Sanjay Panikkar et al., ADEPT: An IoT Practitioner Perspective, IBM (2015).

Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.

NYC Bitcoin Exchange Coinsetter Launches Out of Beta With Institutional and Consumer Trading, MarketWatch (published Jul. 24, 2014), http://www.marketwatch.com/story/nyc-bitcoin-exchange-coinsetter-launches-out-of-beta-with-institutional-and-consumer-trading-2014-07-24 (last visited Jul. 24, 2014).

Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).

"We make it easy to build secure, high-level services on topof the Bitcoin protocol, Trusted Coin (Dec. 26, 2013) Internet Archive, https://web.archive.org/web/20131226232433Ihttps://api.trustedcoin.com/f."

WINKBTCO Index, Bloomberg Finance L.P. (Jun. 16, 2014).

\* cited by examiner

Transaction Ledger 115

| Transaction ID | Date | Fee | Origin Identifiers | Amount from Origin | Destination Identifiers | Destination Amount |
|---|---|---|---|---|---|---|
| f06db f23bc69b7fc1556337 3aa6e41cdc1c75d4a613685 95c017b13d7b57c165552 | 2014-06-24 20:41:32 | 0 | 19Zmw5kMbkTjA7qRUdUEwLqgRaMRRLCkh 19Zmw5kMbkTjA7qRUdUEwLqgRaMRRLCkh | 500 500 | 122BNoyhmuLt9G9mdFm3mN4nb73c1UgNKt | 1000 |
| 9cd9cef9b9b9636c8c3a1b7c 1f6aDde17a3cfcf94c575b7 9263Sbef85c069de58 | 2014-06-24 20:41:32 | 0.0001 | 1EvwbspD9jYnH2ZSq6TFbPxfKkM8ejSXqP | 45.9983 | 1PXdpLs2k3ETn9vcL4SRp3UjHxHiiMJzXb 1896XTQKH2uUS1GG965Rmcn8Ymsjhtk6C | 42.1724747 3.8257253 |
| 5f3fb85576336e61e94ab20e b461552a974123c7b3a38b7 414e7c672d41efd9c830 | 2014-06-24 20:41:32 | 0 | 1Su7FXhRawW7EYWwWv2ayA9duahXh85Rnv | 303.92706127 | 17ZQyJ7KtgfMhGVWvLc8gdDi6ByyRUqZ8G 12eqj2bQpRoYqa6BxGtWq8p8d5UpwZqCek | 154.77363532 149.15342595 |
| 5393361199bb3fcbc8d15e e38bb735c69229dd360ea05 e27a19514bc4be82d69f | 2014-06-24 20:41:32 | 0.00005 | 1iW8RpbYjfsmTyV4W62GHpm9QhA2wYPvap | 18.04752924 | 18v92L98k5Wp3ngVDtrVtNQaFaukXcUk 1GmhQNCmgguugGAtVujmqxPtk8P2y4Ev | 17.2974792 0.75 |
| 4616da18de89493f3da984 12a6fc8f70c5c08436377df b28b9ea9986f31b55ef | 2014-06-24 20:41:32 | 0.0001 | 1GD64WARGDLYG71WTTgCpRMpePr18nmGjj | 5 | 1HrjLqUAer7y4JNP8pPxSmhQcifGqjW3NFA 1NRNnus3aD4sxxig5fwwmX1thDnR9w3ZJ 1GD64WARGDLYG71WTTgCpRMpePr18nmGjj | 3.45703882 0.01388369 1.52897749 |

FIG. 2

DASHBOARD FIAT INTERFACE

DASHBOARD FIAT INTERFACE

DASHBOARD FIAT INTERFACE

DASHBOARD FIAT INTERFACE

DASHBOARD DIGITAL ASSET INTERFACE

DASHBOARD DIGITAL ASSET INTERFACE

DASHBOARD DIGITAL ASSET INTERFACE

DASHBOARD DIGITAL ASSET INTERFACE

DASHBOARD SVCoin INTERFACE

DASHBOARD SVCoin INTERFACE

US 10,438,290 B1

SYSTEM, METHOD AND PROGRAM PRODUCT FOR GENERATING AND UTILIZING STABLE VALUE DIGITAL ASSETS

REFERENCE TO RELATED APPLICATIONS

The present application claims priority to and benefit of U.S. Provisional Patent Application Ser. No. 62/660,655, filed Apr. 20, 2018 entitled SYSTEM, METHOD AND PROGRAM PRODUCT FOR GENERATING AND UTILIZING STABLE VALUE DIGITAL ASSETS and also claims priority to and the benefit of U.S. Provisional Patent Application Ser. No. 62/647,353, filed Mar. 23, 2018 entitled SYSTEM, METHOD AND PROGRAM PRODUCT FOR GENERATING AND UTILIZING STABLE VALUE DIGITAL ASSETS and further claims priority to and the benefit of U.S. Provisional Patent Application Ser. No. 62/638,679, filed Mar. 5, 2018 entitled SYSTEM, METHOD AND PROGRAM PRODUCT FOR GENERATING AND UTILIZING STABLE VALUE DIGITAL ASSETS, the entire content of each of which is hereby incorporated by reference herein.

FIELD

The present invention generally relates to the use of a stable value digital asset to pay dividends or other payments for securities and other financial instruments or investments tied to a blockchain. In embodiments, the present invention relates to specific applications of stable value digital asset tokens tied to a blockchain.

BACKGROUND

In recent times, using blockchain technology and/or tokens to track inventory, including potentially, equities or shares in a fund has been a subject of a lot of discussion. However, current blockchain technology, as implemented, does not have adequate technological solutions to paying dividends or other forms of payouts (like interest) on such investments in a stable value token which is tied to a blockchain technology.

Accordingly, it would be beneficial to provide for a method and system that provide for making payments on digital assets that avoid the problems discussed above.

SUMMARY

An object of the present invention is to address technological challenges that currently exist in paying, e.g., dividends, on digital assets tied to a blockchain technology. In embodiments, the present invention may be used to make other payments such as interest and royalties to name a few.

This and other objects shall be addressed by embodiments of the present invention as set forth herein.

The present invention generally relates to the use of stable value digital assets as a crypto currency that can be linked to other digital assets using block chain technology. In embodiments, the present invention relates to specific applications of stable value digital asset tokens tied to a blockchain.

A stable value digital asset token (e.g., SVCoin) is provided which can be pegged to a fiat currency such as USD, Euro, Yen, to name a few. For example, 1 SVCoin will have a net asset value (NAV) of $1. Unlike Bitcoin and many other crypto protocols, the SVCoin will not have a natural cap (e.g., 22 million bitcoins) and because it is pegged to a fiat currency, it will not fluctuate in value against such fiat currency as is typical of many crypto currencies.

In embodiments, the SVCoin can be issued by a trusted entity, like a digital asset exchange, bank or other trusted entity using a token on an established blockchain, like ether or bitcoin, and smart contract technology. Thus, for example, a buyer can provide the trusted entity (e.g., digital asset exchange, bank, etc.) with a fixed sum of fiat (e.g., 50 USD) and in return be issued a corresponding fixed sum of SVCoin (e.g., 50 SVCoin). In embodiments, the digital asset exchange can be a regulated trust, such as Gemini Trust Company LLC ("Gemini"). In embodiments, other types of trusted entities (e.g., banks, trusts, etc.) may also be used to issue, administer, redeem, and/or otherwise manage the SVCoin. In embodiments, the trusted entity (digital asset exchange, bank, etc.) can charge a processing fee for issuing the SVCoin either in fiat or in a digital asset, such as the SVCoin. In embodiments, fiat deposited to the trusted entity (e.g., digital asset exchange) are maintained by the trusted entity on par with the amounts deposited. Thus, in embodiments, SVCoin is collateralized by fiat. SVCoin holders can also exchange SVCoin for fiat on the same notional basis with the trusted entity.

In embodiments, proof of control processes for the SVCoin and fiat held by the trusted entity may also be employed to provide verified trust. In embodiments where the trusted entity or digital asset exchange is a regulated trust, or other regulated entity, regulatory oversight can insure that the appropriate amount of fiat is being maintained to cover the notional amount of SVCoin issued. In embodiments, an independent auditor may be used to verify the appropriate amount of fiat is being maintained.

In embodiments, a method of issuing electronic payments using a stable value digital asset token on a digital asset security token includes the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a distributed public transaction ledger maintained by a plurality of geographically distributed computer systems in a peer-to-peer network in the form of a blockchain; (b) providing a stable value digital asset token database stored on the distributed public transaction ledger maintained by the plurality of geographically distributed computer systems in the peer-to-peer network in the form of the blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each second respective stable value digital asset token holder, wherein the stable value digital asset tokens are issued by a stable value digital asset token issuer using a digital asset exchange computer system associated with a digital asset exchange; (c) receiving, by the digital asset exchange computer system, a first request from the digital asset security token issuer system to purchase a first sum of stable value digital asset tokens in exchange for a second sum of fiat, wherein the first sum corresponds to the second sum based on a fixed notional amount; (d) verifying, by the digital asset exchange computer system, the first request, including: (i) verifying, by the digital asset exchange computer system, that the digital asset security token issuer is a registered user of the digital asset exchange; and (ii) verifying, by the digital asset exchange computer system, that the digital asset security token issuer has at least the second sum of fiat available for transaction with the digital asset exchange as reflected in a fiat ledger of the digital asset exchange computer system; (e) accessing, by the digital asset exchange computer system, the digital asset security token database to determine: (i) each respective digital asset address of the first set of digital asset addresses for each respective digital asset security token holder; and (ii) a respective corresponding payment amount in stable value digital asset tokens for each respective digital asset security token holder based at least in part on the fixed notional value, the first sum and respective digital asset security token amount associated with each digital asset address of the first set of digital asset addresses; (f) generating, by the digital asset exchange computer system, transaction instructions for the first sum of stable value digital asset token by updating the stable value digital asset token database to reflect the addition of new stable value digital asset tokens in the amount of the first sum and the corresponding digital asset addresses associated with each new stable value digital asset tokens; (g) transferring, by the digital asset exchange computer system, the second sum of fiat on the fiat account ledger from the user account of the digital asset security token issuer, to a custodial account of the digital asset exchange associated with stable value tokens, wherein the digital asset exchange custodial account will maintain in trust a fifth amount of fiat corresponding to a sixth amount of stable value outstanding based on the fixed notional amount; (h) publishing, by the digital asset exchange computer system to the blockchain, transaction instructions associated with crediting the respective payment amount of stable value digital asset tokens to each respective digital asset address of the first set of digital asset addresses; and (i) notifying, by the digital asset exchange computer system, each digital asset address of the first set of the digital asset addresses of each respective transfer of stable value digital asset tokens to each respective digital asset address of the first set of digital asset addresses.

In embodiments, the blockchain may be the Ethereum blockchain.

In embodiments, the blockchain may be the Bitcoin blockchain.

In embodiments, the digital asset exchange may be a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain may be based on an mathematical protocol for proof of work.

In embodiments, the mathematical protocol for proof of work may be open source.

In embodiments, the blockchain may be based on a mathematical protocol for proof of stake.

In embodiments, the mathematical protocol for proof of stake may be open source.

In embodiments, the blockchain may be based on a cryptographic mathematical protocol.

In embodiments, the method may include a step of publishing, by the digital asset exchange computer system to a side ledger, the transaction instructions associated with crediting the respective payment amount of stable value digital asset tokens to each respective digital asset address of the first set of digital asset addresses and the publishing step (h) includes publishing the transaction instructions from the side ledger to the distributed public asset ledger periodically or aperiodically.

In embodiments, the method may include steps of receiving, at the digital asset security token issuer system, from at least one digital asset security token holder, a payment request prior to the receiving step (c), the payment request including: (i) the digital asset address of the digital asset security token holder; and (ii) a request to transfer a payment amount of stable value digital asset tokens to the digital asset address of the digitals asset security token holder; confirming, at the digital asset security token issuer system, that: (i) the digital asset address of the digital asset token holder is valid; (ii) the amount of digital asset security tokens associated with the address of the digital asset token holder is more than zero; and (iii) the digital asset token holder is entitled to payment; and generating, at the digital asset security token issuer system, the first request based at least in part on the payment request when the digital asset address of the digital token holder is valid, the amount of digital asset security tokens associated with the address of the digital asset token holder is more than zero and the digital asset token holder is entitled to payment.

In embodiments, the digital asset security token database is maintained and stored on the plurality of geographically distributed computer systems in the peer-to-peer network in the form of a blockchain.

In embodiments, the digital asset security token database is maintained on a sidechain, separate from the blockchain, wherein information on the sidechain is published and stored on the blockchain periodically or aperiodically.

In embodiments, the generating step (f) includes generating, by the digital asset exchange computer system, transaction instructions for the first sum of stable value digital asset token by updating the stable value digital asset token database to reserve stable value digital asset tokens in the amount of the first sum.

In embodiments, a method of issuing electronic payments using a stable value digital asset token on a digital asset security token includes steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each digital asset security token holder; and (ii) a respective digital asset security token amount associated with each respective digital asset address, wherein each respective digital asset address of the first set of digital asset addresses is tied to a distributed public transaction ledger maintained by a plurality of geographically distributed computer systems in a peer-to-peer network in the form of a blockchain; (b) providing a stable value digital asset token database stored on the distributed public transaction ledger maintained by the plurality of geographically distributed computer systems in the peer-to-peer network in the form of the blockchain, wherein the stable value digital asset token database comprises a log of stable value digital asset tokens including: (i) a second set of digital asset addresses including a second respective digital asset address for each stable value digital asset token holder; (ii) a respective stable value digital asset token amount for each second respective stable value digital asset token holder, wherein the stable value digital asset tokens are issued by a stable value digital asset token issuer using a trusted entity system associated with a trusted entity; (c) receiving, by the trusted entity system, a first request from the digital asset security token issuer system to purchase a first sum of stable value digital asset tokens in exchange for a second sum of fiat, wherein the first sum corresponds to the second sum based on a fixed notional amount; (d) verifying, by the trusted entity system, the first request, including: (i) verifying, by the trusted entity system, that the digital asset security token issuer is a registered user of the trusted entity system; and (ii) verifying, by the trusted entity system, that the digital asset security token issuer has at least the second sum of fiat available for transaction with the stable value digital asset token issuer system as reflected in a fiat ledger of the trusted entity system; (e) accessing, by the trusted entity system, the digital asset security token database to determine: (i) each respective digital asset address of the first set of digital asset addresses for each digital asset security token holder; and (ii) a corresponding payment amount in stable value digital asset tokens for each digital asset security token holder based at least in part on the fixed notional value, the first sum and respective digital asset security token amount associated with each digital asset address of the first set of digital asset addresses; (f) generating, by the trusted entity system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token; (g) transferring, by the trusted entity system, the second sum of fiat on the fiat account ledger from the user account of the digital asset security token issuer, to a custodial account of the stable value digital asset token issuer system associated with stable value digital asset tokens, wherein the custodial account will maintain in trust a fifth amount of fiat corresponding to a sixth amount of stable value coin outstanding based on the fixed notional amount; (h) publishing, by the trusted entity system to the blockchain, transaction instructions associated with crediting the respective payment amount of stable value digital asset tokens to each respective digital asset address of the first set of digital asset addresses; and (i) notifying, by the trusted entity system, each digital asset address of the first set of the digital asset addresses of each respective transfer of stable value digital asset tokens to each respective digital asset address of the first set of digital asset addresses.

In embodiments, the blockchain is the Ethereum blockchain.

In embodiments, the blockchain is the Bitcoin blockchain.

In embodiments, the stable value digital asset token issuer is a regulated digital asset exchange.

In embodiments, the stable value digital asset token issuer is a bank.

In embodiments, the trusted entity is a regulated digital asset exchange.

In embodiments, the trusted entity is a bank.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on an mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method includes a step of publishing, by the trusted entity system to a side ledger, the transaction instructions associated with crediting the respective payment amount of stable value digital asset tokens to each respective digital asset address of the first set of digital asset addresses, wherein the publishing step (h) includes publishing the transaction instructions from the side ledger to the distributed public asset ledger periodically or aperiodically.

In embodiments, the method includes the additional steps of: receiving, at the trusted entity system, from at least one digital asset security token holder, a payment request prior to the receiving step (c), the payment request including: (i) the digital asset address of the digital asset security token holder; and (ii) a request to transfer a payment amount of stable value digital asset tokens to the digital asset address of the digitals asset security token holder; and confirming, at the digital asset security token issuer system, that (i) the digital asset address of the digital asset token holder is valid; (ii) the amount of digital asset security tokens associated with the address of the digital asset token holder is more than zero; and (iii) the digital asset token holder is entitled to payment; and generating, at the trusted entity system, the first request based at least in part on the payment request when the digital asset address of the digital token holder is valid, the amount of digital asset security tokens associated with the address of the digital asset token holder is more than zero and the digital asset token holder is entitled to payment.

In embodiments, the digital asset security token database is maintained and stored on the plurality of geographically distributed computer systems in the peer-to-peer network in the form of the blockchain.

In embodiments, the digital asset security token database is maintained on a sidechain, separate from the blockchain, wherein information on the sidechain is published and stored on the blockchain periodically or aperiodically.

In embodiments, the generating step (f) includes generating, by the trusted entity system, transaction instructions for the first sum of stable value digital asset tokens by updating the stable value digital asset token database to reserve stable value digital asset tokens in the amount of the first sum.

BRIEF DESCRIPTION OF THE DRAWINGS

Exemplary embodiments of the present invention will be described with references to the accompanying figures, wherein:

FIG. 2 is an exemplary screen shot of an excerpt of an exemplary bitcoin transaction log showing digital addresses in accordance with exemplary embodiments of the present invention;

FIGS. 11A1-4 illustrates an exemplary embodiment of a dashboard fiat interface which allows registered users to deposit and/or withdraw fiat with the digital asset exchange in accordance with exemplary embodiments of the present invention;

FIGS. 11B1-4 illustrates an exemplary embodiment of a dashboard digital asset interface which allows registered users to deposit and/or withdrawal digital assets with the digital asset exchange system in accordance with exemplary embodiments of the present invention;

FIGS. 11C1-2 illustrates an exemplary embodiment of a dashboard SVCoin interface which allows registered users to purchase and/or redeem SVCoins for fiat or digital with the digital asset exchange system in accordance with exemplary embodiments of the present invention;

DETAILED DESCRIPTION

Figure 1:
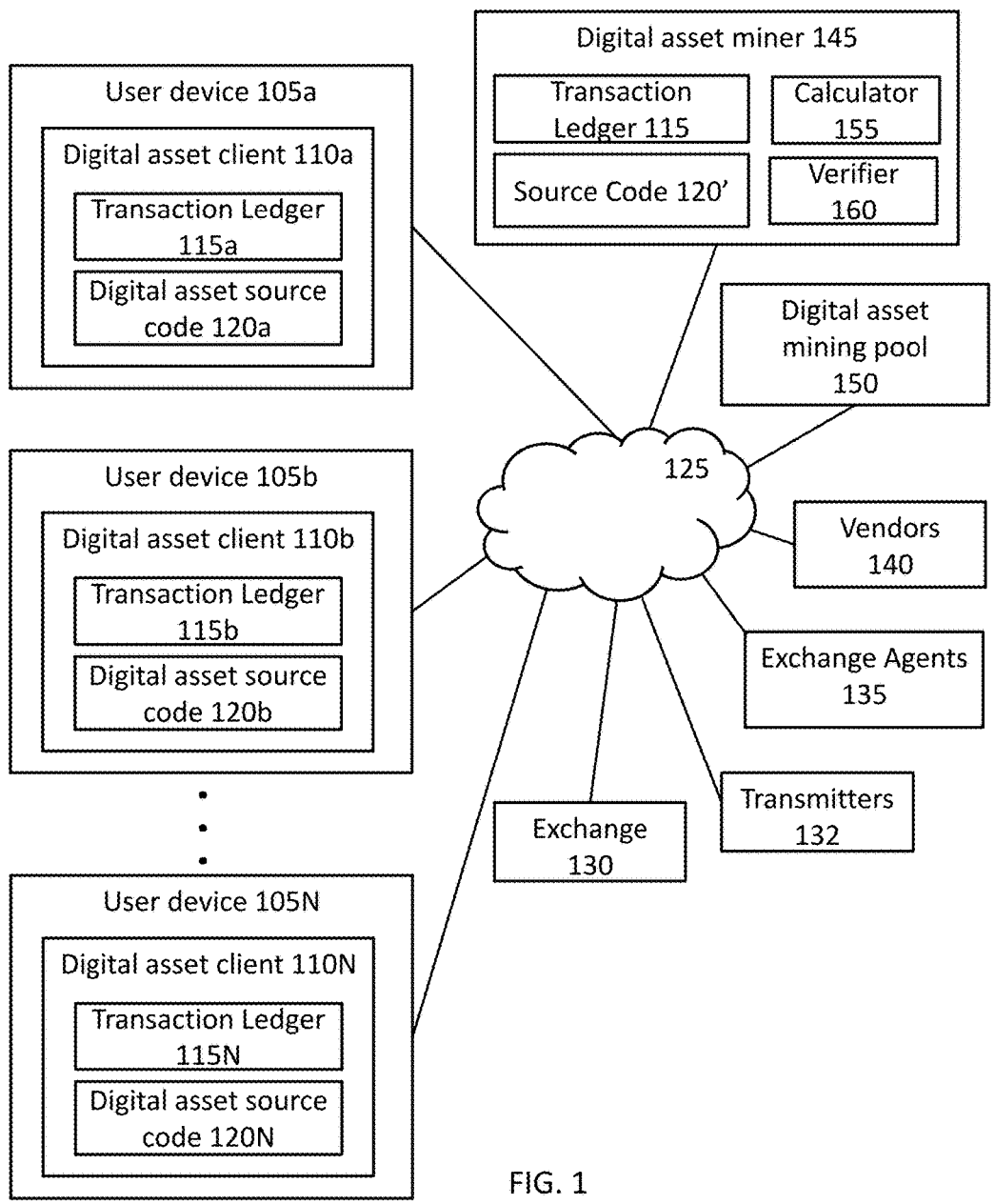
FIG. 1 is a schematic diagram of a digital asset network in accordance with exemplary embodiments of the present invention.

The present invention generally relates to the use of a stable value digital asset to pay dividends for securities and other financial instruments tied to a blockchain. In embodiments, the present invention relates to specific applications of stable value digital asset tokens tied to a blockchain.

Digital Math-Based Assets and Bitcoin

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset.

A bitcoin may be a unit of the Bitcoin digital math-based asset. Other examples of digital math-based assets include Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Skycoin, ZenCash, NAV Coin, Achain, HTMLCOIN, Ubiq, BridgeCoin, Peercoin, PACcoin, XTRABYTES, Einsteinium, Asch, Gas, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin and Tezos, to name a few. In embodiments, digital math-based assets, such as bitcoin, may be accepted in trade by merchants, other businesses, and/or individuals in many parts of the world.

In embodiments, a digital math-based asset may be based on an open source mathematical and/or cryptographic protocol, which may exist on a digital asset network, such as a Bitcoin network or an Ethereum network. The network may be centralized, e.g., run by one or more central servers, or decentralized, e.g., run through a peer-to-peer network. Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network, e.g., via a peer-to-peer sharing. Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without necessarily identifying the assets themselves.

In embodiments, a digital asset ledger, such as the Bitcoin blockchain or the Ethereum blockchain, can be used to achieve consensus and to solve double-spending problems where users attempt to spend the same digital assets in more than one transaction. In embodiments, before a transaction may be cleared, the transaction participants may need to wait for some period of time, e.g., a six confirmation wait (typically one hour in the context of the Bitcoin network, 15 minutes in the context of the Litecoin network, to name a few), before feeling confident that the transaction is valid, e.g., not a double count. Each update to the decentralized electronic ledger (e.g., each addition of a block to the Bitcoin blockchain or the Ethereum blockchain) following execution of a transaction may provide a transaction confirmation. After a plurality of updates to the ledger, e.g., 6 updates, the transaction may be confirmed with certainty or high certainty.

In embodiments, a blockchain can be a public transaction ledger of the digital math-based asset network, such as the Bitcoin network or the Ethereum network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as Gas, may be used to pay such fees.

The digital asset network (e.g., Bitcoin network or Ethereum Network) may timestamp transactions by including them in blocks that form an ongoing chain called a blockchain. In embodiments, the addition of a block may occur periodically, e.g., approximately every 15 seconds, every minute, every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power, or some other consensus mechanism, will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the Bitcoin blockchain. A more detailed discussion of proof of control protocols can be found in co-pending U.S. patent application Ser. No. 15/920,042 filed Mar. 13, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of which is hereby incorporated by reference herein.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators are a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept to short (e.g., 3 seconds for EOS) and producers may be punished for not participating by being removed from consideration. In embodiments, a producer has to produce a minimal number of block, e.g., at least one block every 24 hours to be in consideration. All of the nodes will, by default, not switch to a fork which does not include any blocks not finalized by a sufficient majority (e.g., 15 of the 21 producers) regardless of chain length. Thus, in EOS, each block must gain 15 of 21 votes for approval to be considered a part of the chain.

In embodiments, a delegated byzantine fault tolerance protocol may be used as a consensus mechanism. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e. for the block to be added. If a sufficient majority is not obtained (e.g., less than 66% approval), then a new speaker is chosen and the process starts again.

Ripple uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally signed transactions that began with its creation as a block reward through bitcoin mining. Each owner transfers bitcoin to the next by digitally signing them over to the next owner in a bitcoin transaction which is published to and added on to a block on the blockchain. A payee can then verify each previous transaction, e.g., by analyzing the blockchain to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In particular, ring signatures mix spender's address with a group of others, making it more difficult to establish a link between each subsequent transaction. In addition, Monero provides "stealth addresses" generated for each transaction which make it difficult if not impossible to discover the actual destination address of a transaction by anyone else other than the sender and the receiver. Further, the "ring confidential transactions" protocol may hide the transferred amount as well. Monero is designed to be resistant to application-specific integrated circuit mining, which is commonly used to mine other cryptocurrencies such as Bitcoin, however, it can be mined somewhat efficiently on consumer grade hardware such as x86, x86-64, ARM and GPUs, to name a few.

Another example of a modified blockchain consistent with exemplary embodiments of the present invention discussed above is Darkcoin. Darkcoin adds an extra layer of privacy by automatically combining any transaction its users make with those of two other users—a feature it calls Darksend—so that it will be more difficult to analyze the blockchain to determine where a particular user's money ended up.

Yet another example of a modified blockchain consistent with exemplary embodiments of the present invention discussed above is Zcash. The Zcash network supports different types of transactions including: "transparent" transactions and "shielded" transactions. Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain—the amount transferred into and out of a zaddress is private if between two z-addresses—but may be public if between a z-address and a t-address.

In embodiments, a digital asset based on a blockchain, may in turn include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, smart contracts may be written on other smart contracts to provide for increased functionality. One non-limiting example of this type of structure is the open source Cryptokittens game in which digital kittens are provided as ERC-721 tokens with a series of smart contracts provided to define how the kittens will interact with each other and with users. In embodiments, programming modules may be added to and/or transferred with programming modules associated with specific tokens. By way of illustration, a first token, e.g., a Cryptokitten Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding SVCoins, or a right to request SVCoins from another account as discussed below. If the first token is transferred, the second token would transfer with the ownership of the first token.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network (such as the Ethereum Blockchain, the Bitcoin Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database is basically a table with rows and columns tracking who owns how many tokens.

If a user or another smart contract within the blockchain network (such as the Ethereum Network) sends a message to that token's contract in the form of a "transaction," the code updates its database.

Figure 10:
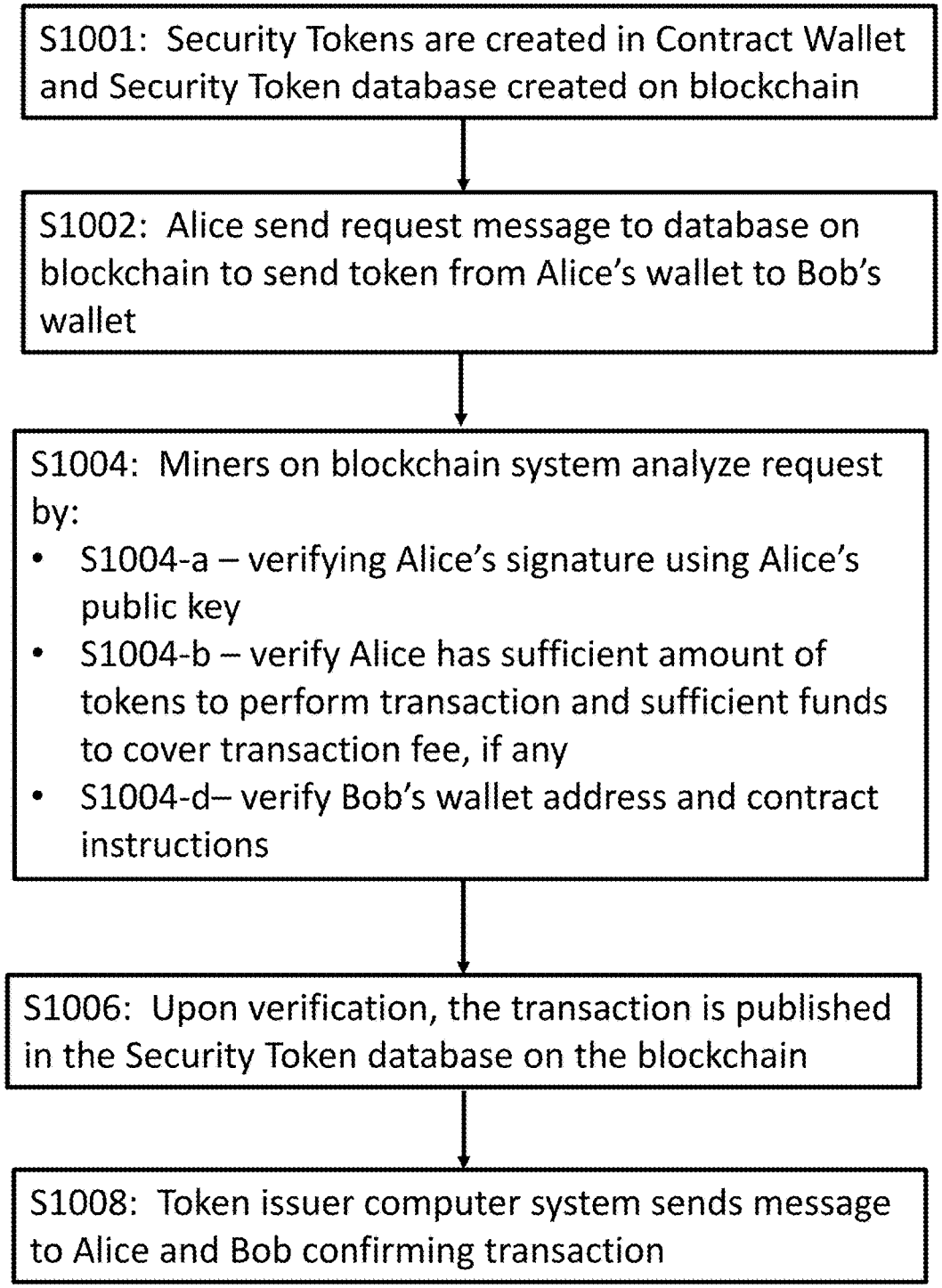
FIG. 10 is an exemplary flow chart of the process of sending tokens from Alice to Bob on the Ethereum blockchain in accordance with exemplary embodiments of the present invention.

So, for instance, as illustrated in FIG. 10, using a token based on the Ethereum Network for illustration purposes, when a wallet app sends a message to a token's contract address to transfer funds from Alice to Bob, the following proceed occurs.

In step S1001, at the token issuer computer system, Security Tokens are created. In embodiments, each Security Token may have a "ECR20 Contract Wallet Address" ("Contract Address") which is used to write a smart contract. In embodiments, the smart contract may include instructions to perform at least: (1) token creation, (2) token transfer, (3) token destruction; and (4) updating smart contract coding. In embodiments, the Contact Address may be associated with a designated cold storage wallet associated with the token issuer. In embodiments, the Contract Address may be associated with a designated hot storage wallet associated with the token issuer. In embodiments, the Contract Address may be associated with a designated cold storage wallet associated with the token issuer, but may also give at least some permission to perform operations by one or more hot wallets associated with the token issuer and/or a token administrator on behalf of the token issuer. Security Tokens may be created in batches (for example, 100,000 SVCoins worth $100,000 U.S. dollars) in the "Contract Wallet" or Contract Address and later moved to a hot wallet or associates digital asset address for transactions as necessary. In embodiments, a Security Token database is maintained in a blockchain, such as the Ethereum blockchain, for example. In embodiments, the ledger may be maintained in the first instance as a database in a sidechain by the issuer or agent and subsequently published and stored as part of a blockchain. In embodiments, Security Tokens may be generated on the fly, however, in this case, the Contract Wallet may be associated with a hot wallet, or a Supplementary Wallet authorized to perform such operations may be used, and may be a hot wallet with the Contract Wallet remaining a cold wallet. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein. In embodiments, Contract Wallets may be maintained by the SVCoin issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

By way of illustration, an ECR20 Contract can include the following representative type of functions as shown in Table 1 in its programming of a Smart Contract associated with a particular token, such as a security token:

TABLE 1

```
 1 // ------------------------------------------------------------
 2 // ERC Token Standard #20 Interface
 3 // https://github.com/ethereum/EIPs/blob/master/EIPS/
   eip-20-token-standard.md
 4 // ------------------------------------------------------------
 5 contract ERC20Interface {
 6 function total Supply( ) public constant returns (uint);
 7 function balanceOf (address tokenOwner) public constant
   returns (uint balance);
 8 function allowance (address tokenOwner, address spender)
   public constant returns (uint remaining);
 9 function transfer (address to, uint tokens) public returns
   (bool success);
10 function approve (address spender, uint tokens) public returns
   (bool success);
11 function transferFrom (address from, address to, uint tokens)
   public returns (bool success);
12
13 event Transfer (address indexed from, address indexed to, uint
   tokens);
14 event Approval (address indexed tokenOwner, address indexed
   spender, uint tokens);
```

Some of the tokens may include further information describing the token contract such as shown Table 2:

TABLE 2

```
1 string public constant name = "Token Name";
2 string public constant symbol = "SYM";
3 uint8 public constant decimals = 18; // 18 is the
  most common number of decimal places
```

In Step S1002, Alice's wallet, or associated digital asset address, may send a request message to the database maintained by the blockchain including: (a) Alice's ethereum digital asset address, which is typically associated with a digital wallet (Source Address); (b) token identification information; (c) amount of token to be transferred; and (d) Bob's ethereum digital asset address (Destination Address). In embodiments, if a fee is charged for the transaction, fee payment information may also be required and provided. For example, on the Ethereum network, an amount of Gas tokens may be required from the sender to pay for processing of the transaction into a block on the blockchain. In embodiments, the message may include a proposed fee amount and/or fee proposal including a limit in e.g., Gas. The request message will also be digitally signed by Alice's private key.

In Step S1004, when miners on the blockchain receive the transaction request directed to the contract wallet or associated digital asset address, with the request message, miners on the blockchain will confirm the transaction, including verifying that the message was properly signed by Alice. In Step S1004-b, the miners may verify that Alice has sufficient amount of tokens to perform the requested transaction, for example, by comparing Alice's balance against Alice's token balance as indicated on the blockchain. In Step S1004-c, the validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

In Step S1006, if the request is verified the transaction is published in the Security Token database of the blockchain reflecting a debit against Alice's token holdings and a corresponding credit to Bob's token holdings (less any applicable fees).

In Step S1008, response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., Gas. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. (In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

Figures 1, 11A:
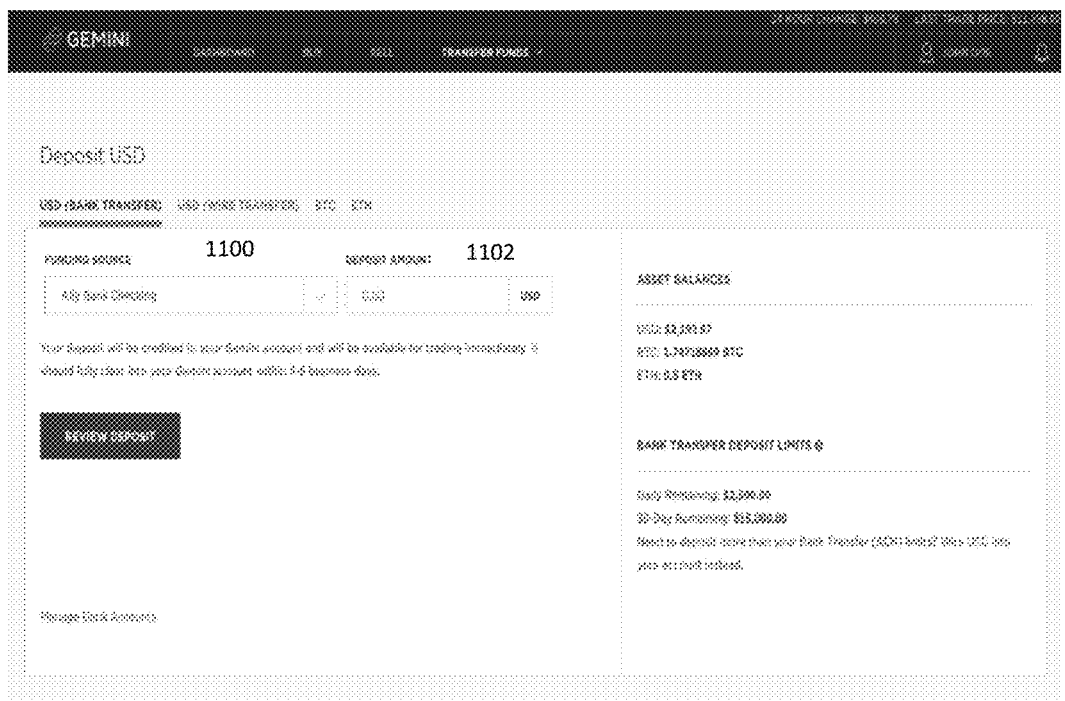
Figures 2, 11A:
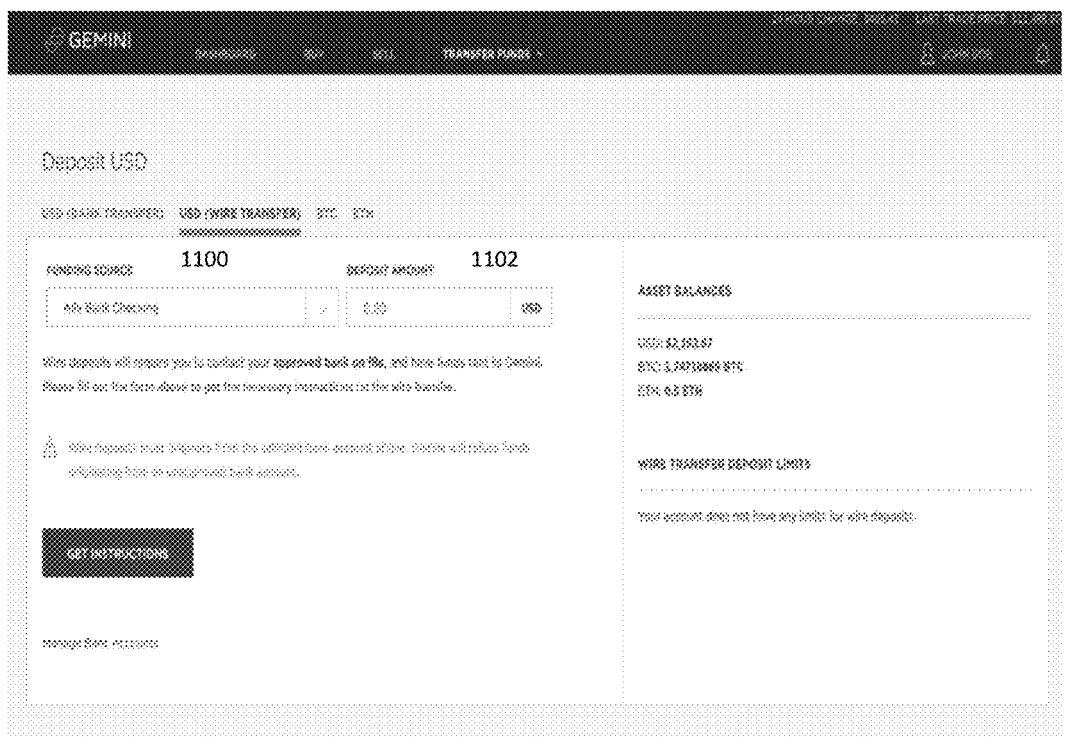
Figures 3, 11A:
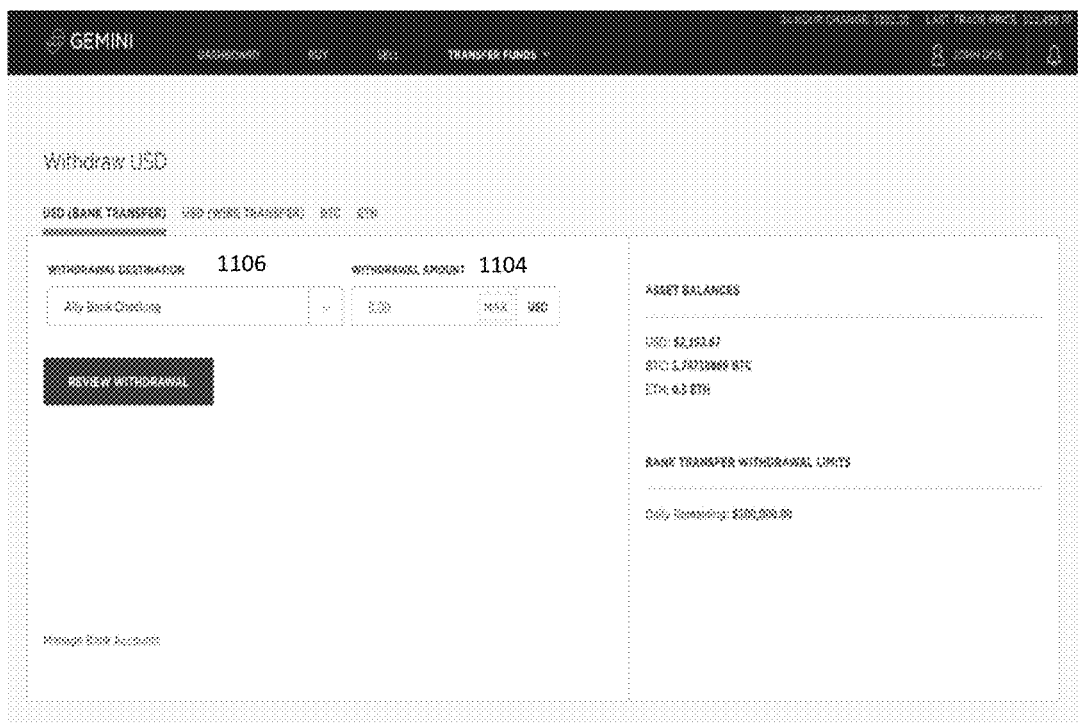

FIG. 2 is an exemplary screen shot of an excerpt of a bitcoin transaction log or transaction ledger 115 showing digital asset account identifiers (e.g., addresses) corresponding to origin and destination accounts for each transaction and amount information for each transaction in accordance with exemplary embodiments of the present invention. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information, to name a few. Other forms of transaction logs can be used consistent with exemplary embodiments of the present invention. In an exemplary embodiment, the description information may be included as a message in a request for a transaction. The description information discussed above thus may also be used to confirm control of over a particular account.

As can be seen in FIG. 2, currency transfers may begin from a single origin and be sent to a single destination or multiple destinations. Similarly, currency may be transferred from multiple origins to one or more destinations.

Figure 2A:
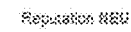
FIG. 2A is an exemplary screen shot of a Security Token ledger in accordance with exemplary embodiments of the present invention.

FIG. 2A illustrates a screenshot showing an exemplary embodiment of a token ledger for a Gas token. This particular screenshot shows a specific example the token ledger for the Gas token provided by etherscan.io. As illustrated the ledger illustrates, in chronological order, a series of transactions identifying the source address 2202 and destination address 2204 along with the quantity of tokens 2206 transferred in each transaction. In embodiments, the Security Token ledger of the present application may be similar to that illustrated in FIG. 2A. In embodiments, as illustrated in FIG. 2A, the Security Token ledger may also include the option to identify all Token holders 2208 as well as options to view token details 2210 and to view the contract details 2012. Similarly, in embodiments, an SVCoin Token ledger of the present application may be similar to that illustrated in FIG. 2A. Digital asset ledgers may be maintained in the form of a database. Such a database may be maintained on a blockchain or off a blockchain as a sidechain which may later be published to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. Of course, other digital asset networks, such as the Ethereum network can be used with embodiments of the present invention. A digital math-based asset network, such as a Bitcoin network, may be an online, end-user to end-user network hosting a public transaction ledger 115 and governed by source code 120 comprising cryptologic and/or algorithmic protocols. A digital asset network can comprise a plurality of end users, a . . . N, each of which may access the network using one or more corresponding user device 105a, 105b, . . . 105N. In embodiments, user devices 105 may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, each user device 105 can run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115a (contained on a user device 105a) should correspond with the electronic transaction ledgers 115b . . . 115N (contained on user devices 105b . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few.

Stable Value Coin Digital Asset Token

In embodiments, a stable value digital asset token ("SVCoin") may operate on a blockchain based network, such as the Ethereum network, a decentralized virtual currency and blockchain network with a programming language that can automatically facilitate, verify, and enforce the terms of a digital contract entered into by human or computer counterparties. In embodiments, the SVCoin may conform with the ERC-223 token standard, making it available for a variety of uses within the Ethereum Network. In embodiments, the SVCoin may conform to the ERC-721 token standard. However, unlike other types of cryptocurrencies currently available on the Ethereum Network or the virtual currency ecosystem generally, the SVCoin will be strictly pegged to a fiat currency, such as the U.S. Dollar, and a custodian, such as a trusted entity like a digital asset exchange or bank, to name a few, will hold an equal value in fiat (e.g., one (1) SVCoin is pegged to be equal to one (1) USD).

In embodiments, a digital asset exchange, such as a regulated digital asset exchange, like Gemini, may be the sole issuer of the SVCoin. In embodiments, especially in the context of a regulated digital asset exchange, in order to obtain freshly minted SVCoin, customers must first register with the digital asset exchange and create an exchange account to allow access to the digital asset exchange platform. Customers may deposit fiat (e.g., USD) with the digital asset exchange, via, e.g., Fedwire, ACH, Swift, to name a few, into the customers respective exchange account, or convert into fiat some or all of existing digital assets held at the digital asset exchange. SVCoin may be held in the customer's exchange account or may be transferred via the blockchain, such as via the Ethereum Network. In embodiments, the SVCoin issuer may be a digital asset exchange, a bank, a trust or some other trusted entity, to name a few.

In embodiments, regardless of whether the SVCoin is stored in the customer's exchange account or transferred via the blockchain such as the Ethereum Network, the digital exchange will continue to hold sufficient fiat to maintain the total value of SVCoin based on a notional pegged rate (e.g., one USD for every one SVCoin issued). In embodiments, fiat will be held in a segregated, omnibus bank account at one or more federally insured depository institution.

In embodiments, customers wishing to redeem their SVCoin for fiat may do so through the digital asset platform. Customers that have transferred their SVCoin to the blockchain will be able to transfer their SVCoin back to their exchange account, and subsequently redeem them for fiat through the digital exchange platform, such as via Fedwire, ACH or SWIFT to the Customer's registered bank account, to name a few. For each fiat redeemed with the digital exchange, a corresponding SVCoin will be removed from circulation. As discussed above, exemplary embodiments of such transactions are discussed in connection with FIGS. 11A1-4, 11B1-4 and 11C1-2.

Blockchain Based Financial Instrument

In embodiments, a digital asset in the form of a token ("Security Token") may be issued to represent inventory, equity interests in a venture, real estate, rights in intellectual property such music, videos, pictures, to name a few. When used as a security, appropriate filings with a regulatory authority may be necessary to comply with local law. In the case of a security, investors may exchange fiat or other digital assets (such as bitcoin or ether, to name a few) in exchange for Security Tokens. Typically, Security Tokens may issue using a smart contract written on another digital asset (such as ether or bitcoin, to name a few), and tracked in a separate database stored in a distributed peer to peer network in the form of a blockchain. In an example, the blockchain is the Ethereum Blockchain and includes all Security Tokens, the respective address associated therewith, wherein maintenance of the blockchain is controlled by contract instructions stored in the form of a smart contract at the Contract Address. In embodiments, the Secure Token database maintained on the blockchain may be viewed via etherscan.io. In embodiments, the Security Token ledger may be maintained as a sidechain in a separate database off chain and published periodically or aperiodically to the blockchain. Each Security Token may also be associated with a specific digital asset address on the network associated with the underlying digital asset (e.g., the Ethereum Network when ether is the underlying digital asset, or the Bitcoin Network, when bitcoin is the digital asset, to name a few). Generally, the same blockchain will be used for the SVCoin and the Security Token.

Digital Asset Exchange

In embodiments, one form of trusted entity that may be an issuer of SVCoin or an agent of the issuer is a digital asset exchange or bank. In embodiments, the trusted entity may maintain an SVCoin database on a blockchain. In embodiments, the trusted entity may maintain the SVCoin database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the SVCoin may be a digital asset exchange, a bank, a trust, or other trusted entity. In the context where a digital asset exchange may act as an issuer for SVCoin, or as an agent of the issuer, a digital asset exchange computer system may maintain a ledger as one or more databases associated with the SVCoin. Such a database may include an electronic log of all transactions, including the source wallet, the destination wallet, the timestamp of the transaction, the amount of the transaction (e.g., the number of SVCoin), and/or the balance in each wallet before and/or after the transaction. In embodiments, the database may include a list of wallet addresses and balances in each wallet of the SV Coin. In embodiments, the issuer may maintain the database by using a smart contract in association with a Contract Digital Address as part of a blockchain network, such as the Ethereum Network. In embodiments, the ledger may be maintained in a database as a sidechain which is periodically, or aperiodically, published to a blockchain such as the Ethereum blockchain. In embodiments, the ledger may be maintained directly on the blockchain.

Figure 3:
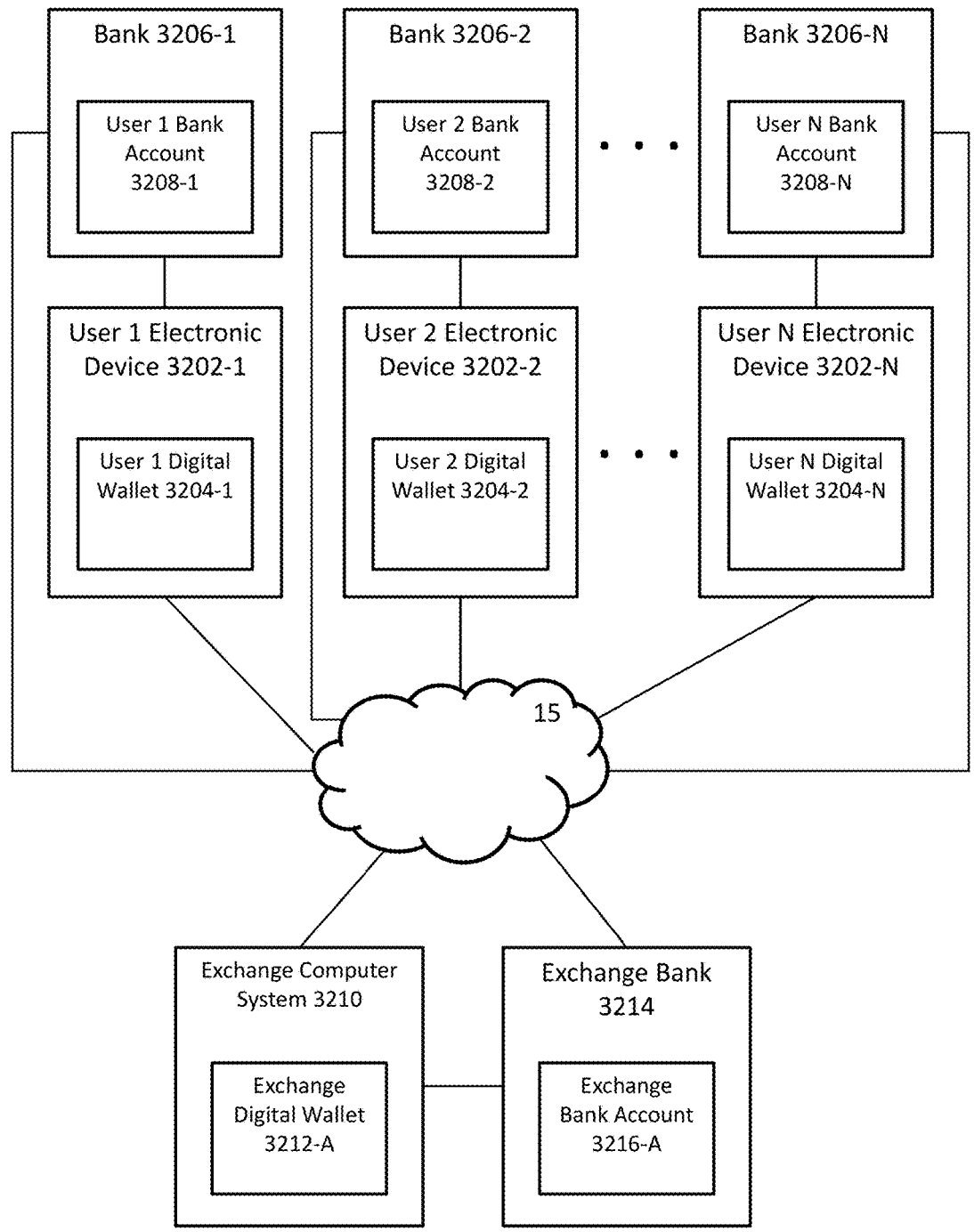
FIG. 3 is an exemplary exchange agent interface in accordance with exemplary embodiments of the present invention.

FIG. 3 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., USD, Euro, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., USD, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, digital asset address associated with a digital wallet, or electronic account. In embodiments, a digital wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 4A:
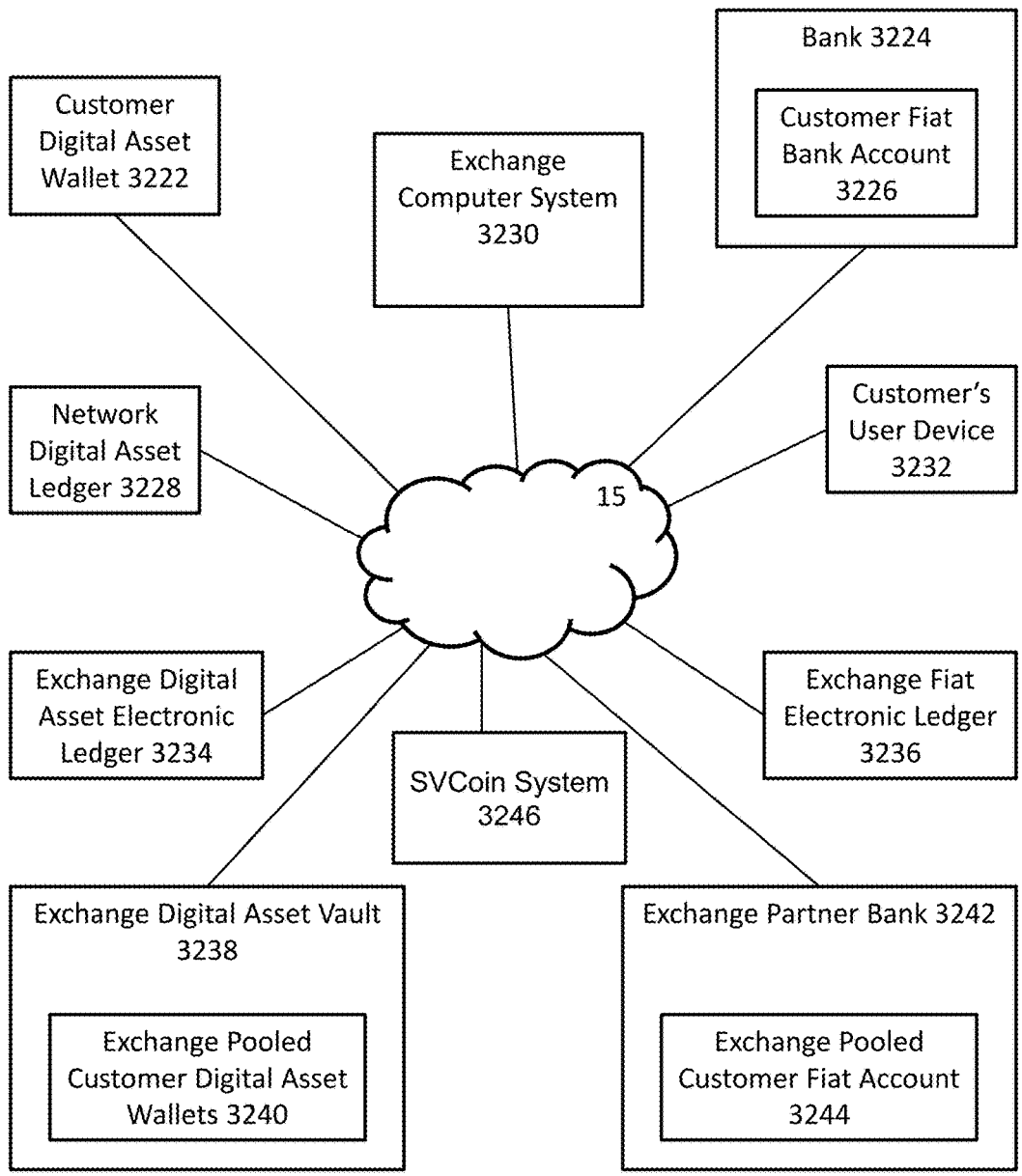
FIGS. 4A-B are schematic diagrams illustrating participants in a digital asset exchange in accordance with exemplary embodiments of the present invention.
Figure 4B:
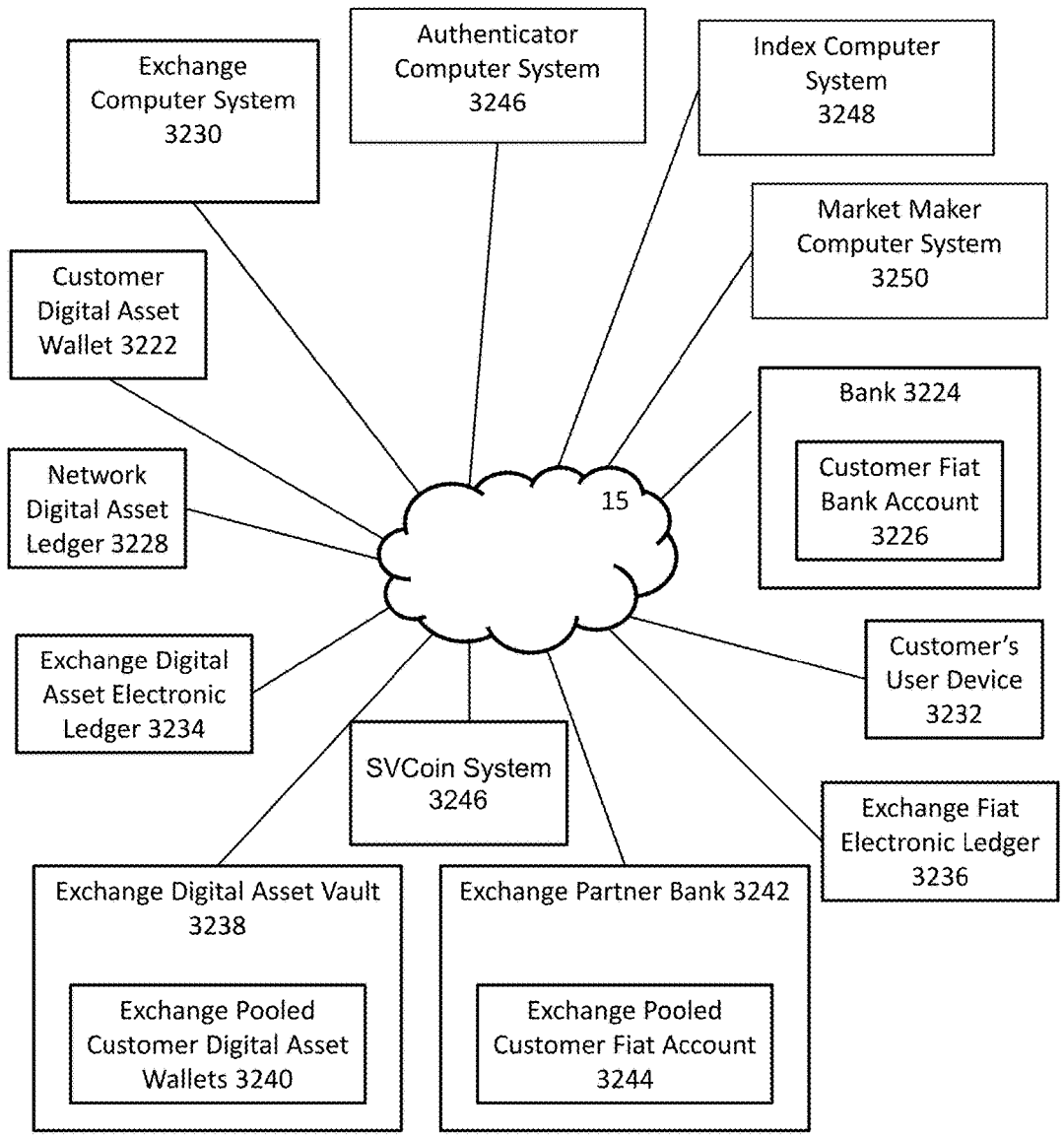

FIG. 4A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets, ether wallets, to name a few), customer banks 3224 having customer fiat bank accounts 3226, a digital asset network ledger 3228 (e.g., the Bitcoin blockchain, the Ethereum blockchain, to name a few), a digital asset network (e.g., the Bitcoin Network, the Ethereum Network, to name a few), one or more exchange customers using one or more customer user device 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection. In embodiments, the exchange may have a SVCoin system 3246. Such a system may allow users to purchase SVCoin tokens using fiat currency and/or digital assets and/or to redeem digital assets in the form of SVCoin tokens, and/or to redeem SVCoin tokens for fiat currency. SVCoin system 3246 may also be used to generate new SVCoin tokens, and cancel redeem SVCoin tokens. SVCoin system 3246 is operatively connected to an SVCoin database that maintains a log of SVCoin tokens. In embodiments, the SVCoin database may be maintained as part of the digital asset network (e.g., the Bitcoin Network, the Ethereum Network, to name a few).

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known.

Figure 5A:
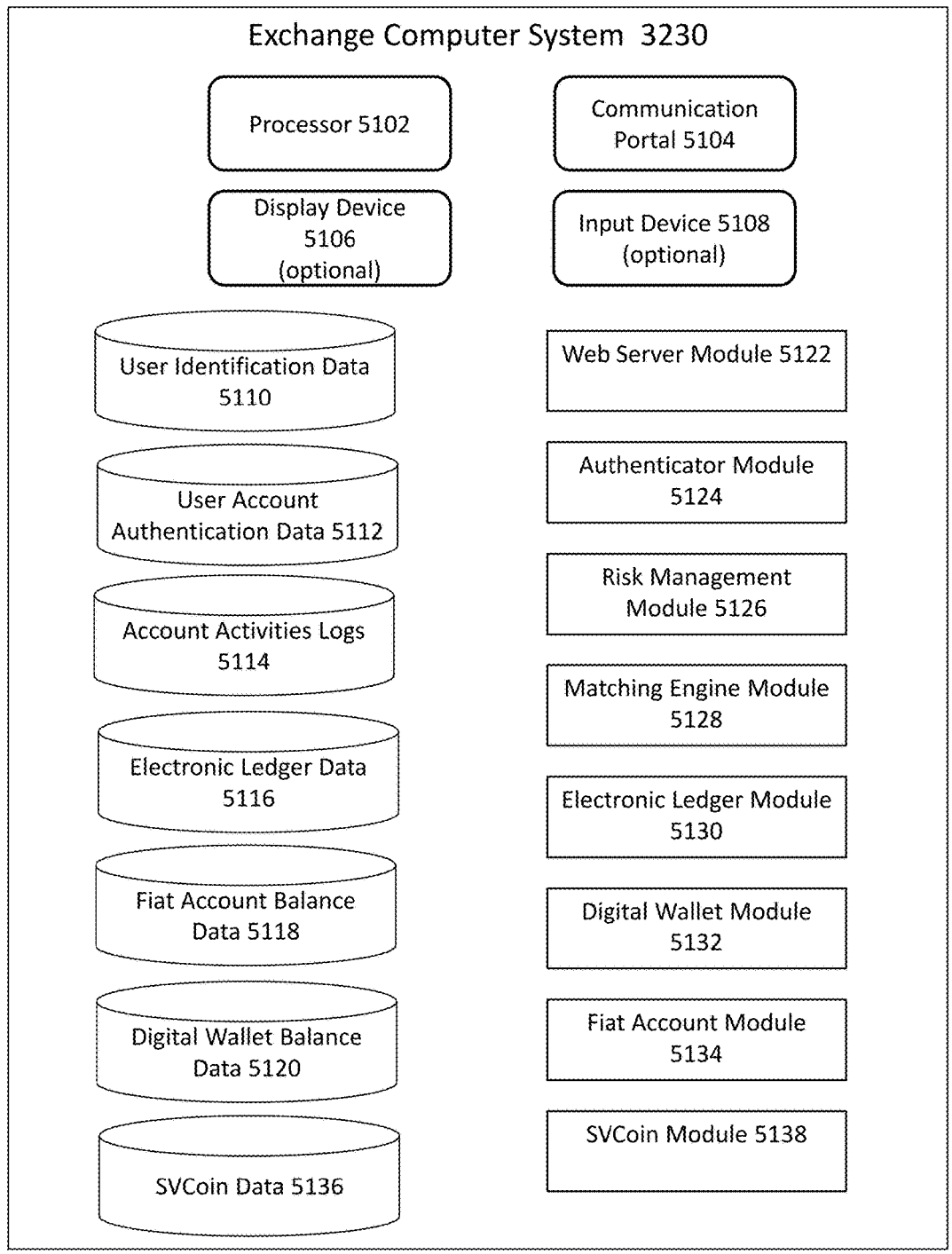
FIGS. 5A-B are schematic diagrams of exemplary exchange computer systems in accordance with exemplary embodiments of the present invention.
Figure 5B:
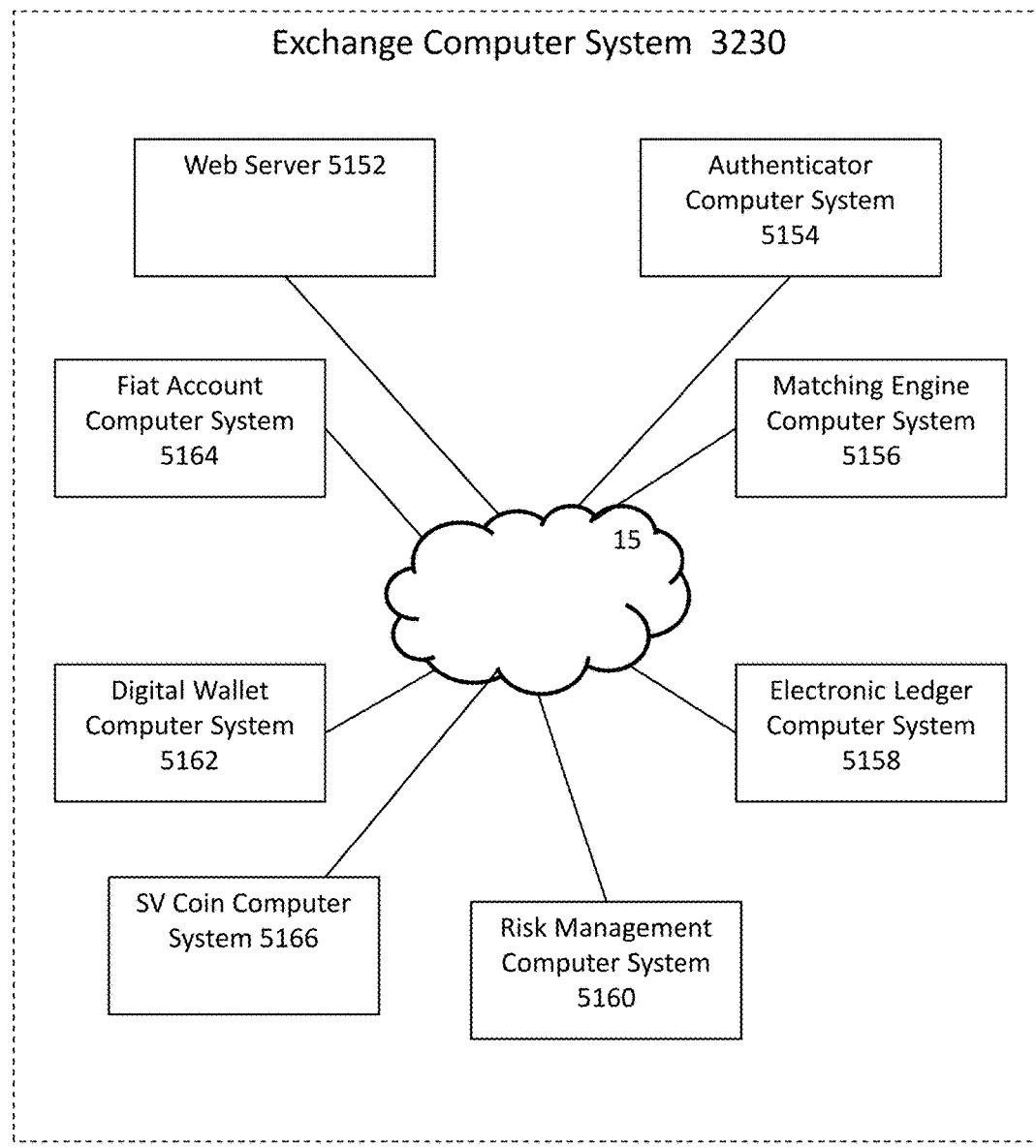

FIGS. 5A-B are schematic diagrams of exemplary exchange computer systems in accordance with exemplary embodiments of the present invention. FIG. 5A shows hardware, data, and software modules, which may run on one or more computers. FIG. 5B shows an exemplary distributed architecture for the exchange computer system.

As shown in FIG. 5A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, digital wallet balance data 5120, and/or SVCoin data 5136, to name a few. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, fiat account module 5134 and/or SVCoin module 5138, to name a few. The processes performed by such modules, the data produced thereby and/or the data accessed thereby are described herein.

A matching engine 5128 may apply a continuous order book price time priority matching algorithm. In embodiments, the matching engine may apply option points at low and/or high frequencies. In embodiments, other matching engines may be included, such as a block trade matching engine (not shown), an auction matching engine (not shown), to name a few.

As shown in FIG. 5B an exchange computer system can include a web server 5152, an authenticator computer system 5154, a matching engine computer system 5156, an electronic ledger computer system 5158, a risk management computer system 5160, a digital wallet computer system 5162, and/or a fiat account computer system 5164. The exchange computer system 3230 may communicate with one or more external computer systems, such as bank computer systems, index computer systems, user computer system (e.g., institutional or individual users), and/or user electronic devices, to name a few. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination. In embodiments, other authentication processes may also be used.

An authenticator computer system 5154 may perform authentication of user login credentials, multi-factor authentication, and/or compare users against databases, such as government databases, for compliance with anti-money laundering laws and/or regulations, to name a few.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches, to name a few. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified. In such embodiments, SVCoin holders may be required to provide the identification information discussed above prior to purchasing SVCoins. Further, the SVCoin issuer will maintain a database including this information for each SVCoin holder. In embodiments, the fiat may be invested in federally insured interest bearing bank accounts, CD's, money market mutual funds, Repos or other financial instruments which offer a return and provide sufficient stability, to name a few.

A SVCoin computer system 5166 may manage purchases of SVCoin tokens using fiat currency and/or digital assets and/or redemption of digital assets in the form of SVCoin tokens, and/or redemption of SVCoin tokens for fiat currency. SVCoin computer system 5166 may also generate new SVCoin tokens, and cancel redeem SVCoin tokens. SVCoin computer system 5166 is operatively connected to an SVCoin database 5136 that maintains a log of SVCoin tokens. In embodiments, the SVCoin database 5136 is maintained by the use of smart contract code associated with a Contract Address on the digital asset blockchain though the digital asset network.

Figure 6:
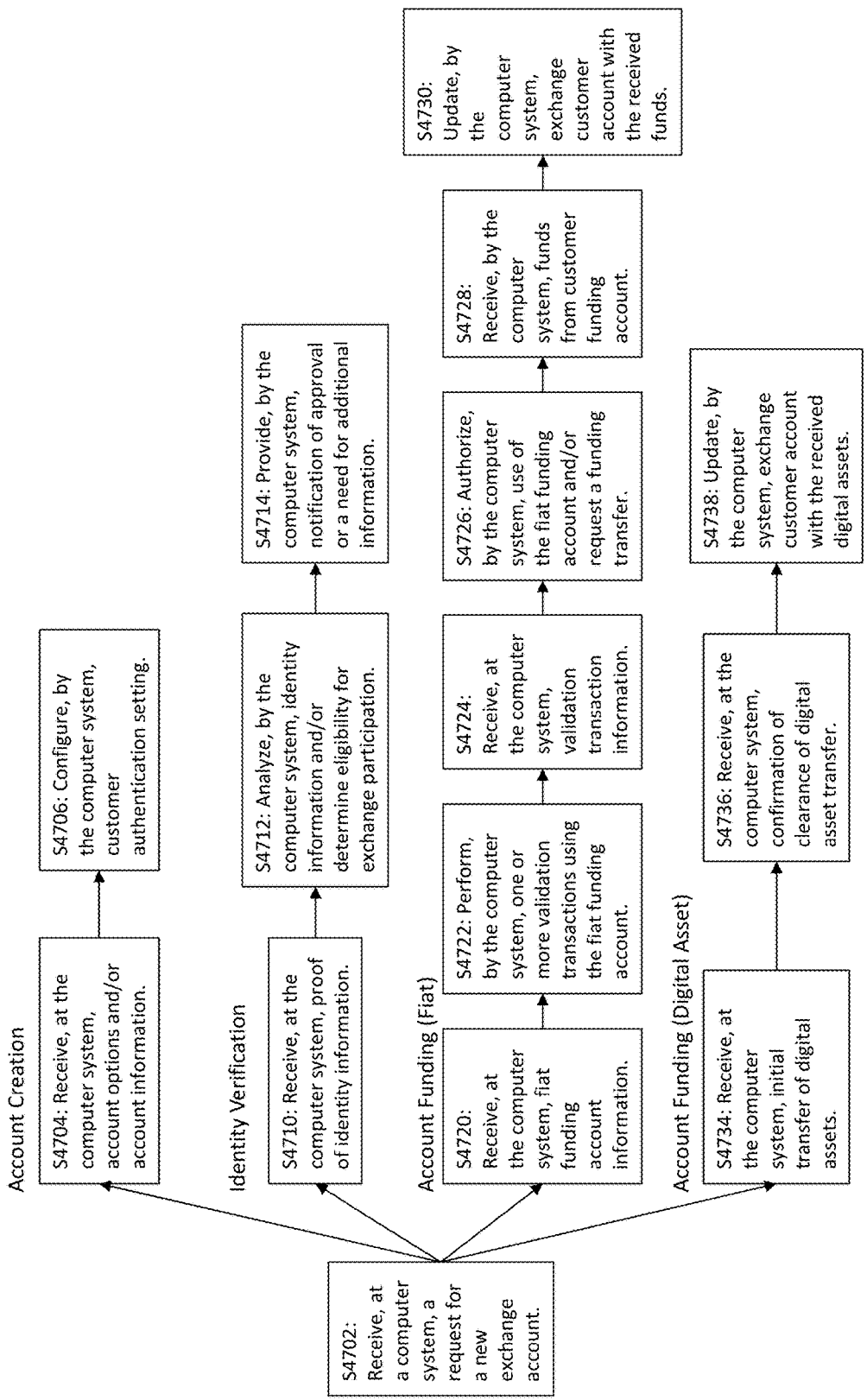
FIG. 6 is an exemplary flow chart for processes for digital asset exchange account creation and account funding in accordance with exemplary embodiments of the present invention.

Referring to the fiat account funding process shown in FIG. 6, in a step S4720 the exchange computer system may receive fiat funding account information. Such information can include a bank account number (e.g., a routing number), a bank name, an account type, and/or an account holder's name, to name a few. In a step S4722, the exchange computer system may perform one or more validation transactions using the fiat funding account. Such transactions may comprise small deposits into the fiat funding account. In a step S4724, the exchange computer system may receive validation transaction information, which may include a transaction amount, date, and/or time. In a step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange or an application programming interface (API), to name a few, to transfer funds to the exchange. In a step S4728, the exchange computer system may receive an electronic notification indicating that funds were received, e.g., in an exchange bank account at a partner bank, from the customer fiat funding account. In a step S4730, the exchange computer system can update an exchange customer account with the received funds. Updating an exchange customer account can comprise electronically updating a fiat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 6, in a step S4734, the exchange computer system can receive an initial transfer of digital assets. In a step S4736, the exchange computer system can receive a confirmation of clearance of the digital asset transfer. In a step S4738, the exchange computer system can update an exchange customer account with the received digital assets. Updating an exchange customer account can include making an electronic entry in an exchange digital asset electronic ledger and/or providing a notification that the digital assets are received.

Figure 7A:
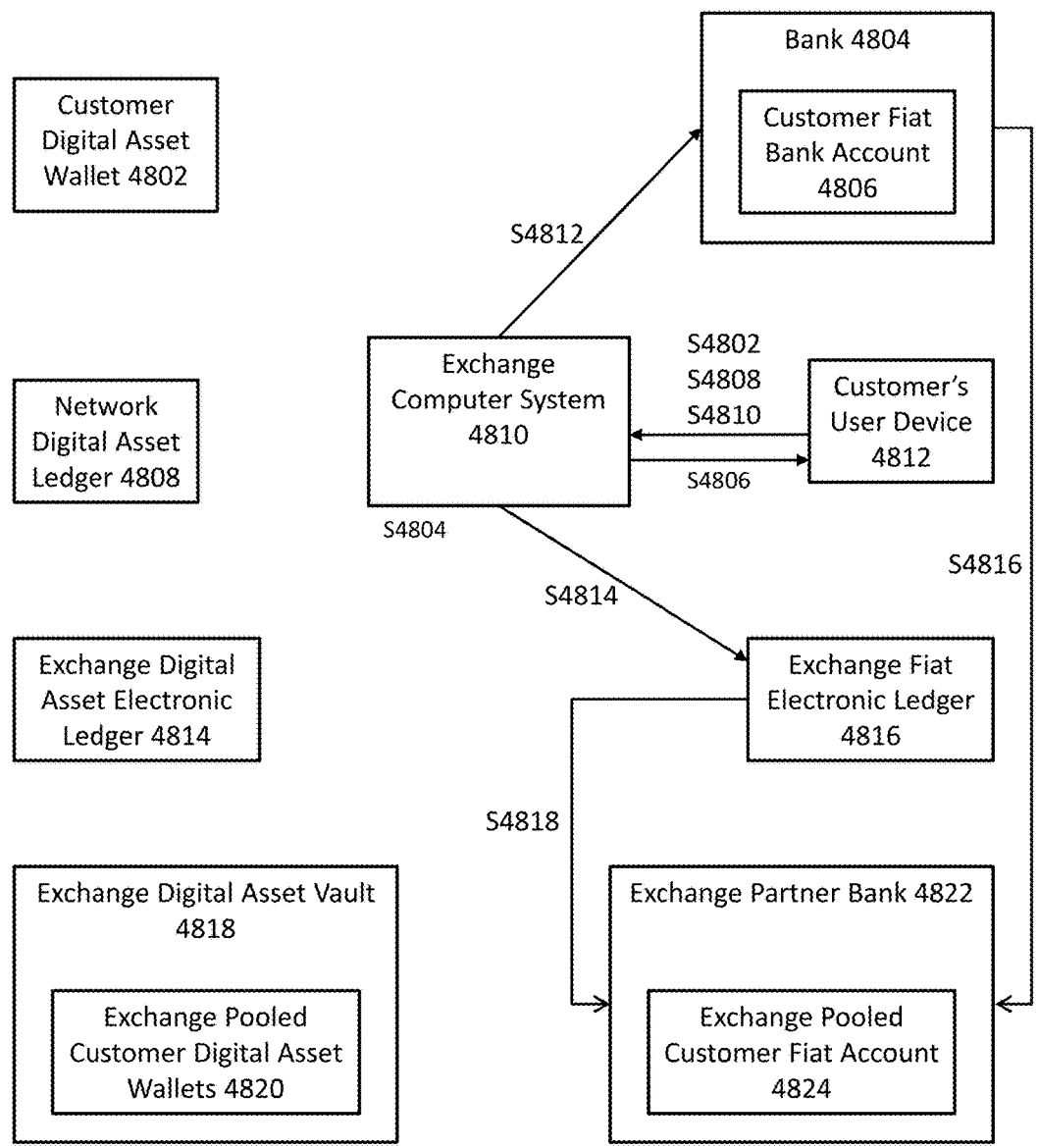
FIGS. 7A-B are an exemplary schematic diagram and corresponding flow chart of a process for digital asset exchange customer account fiat funding via an exchange-initiated request in accordance with exemplary embodiments of the present invention.
Figure 7B:
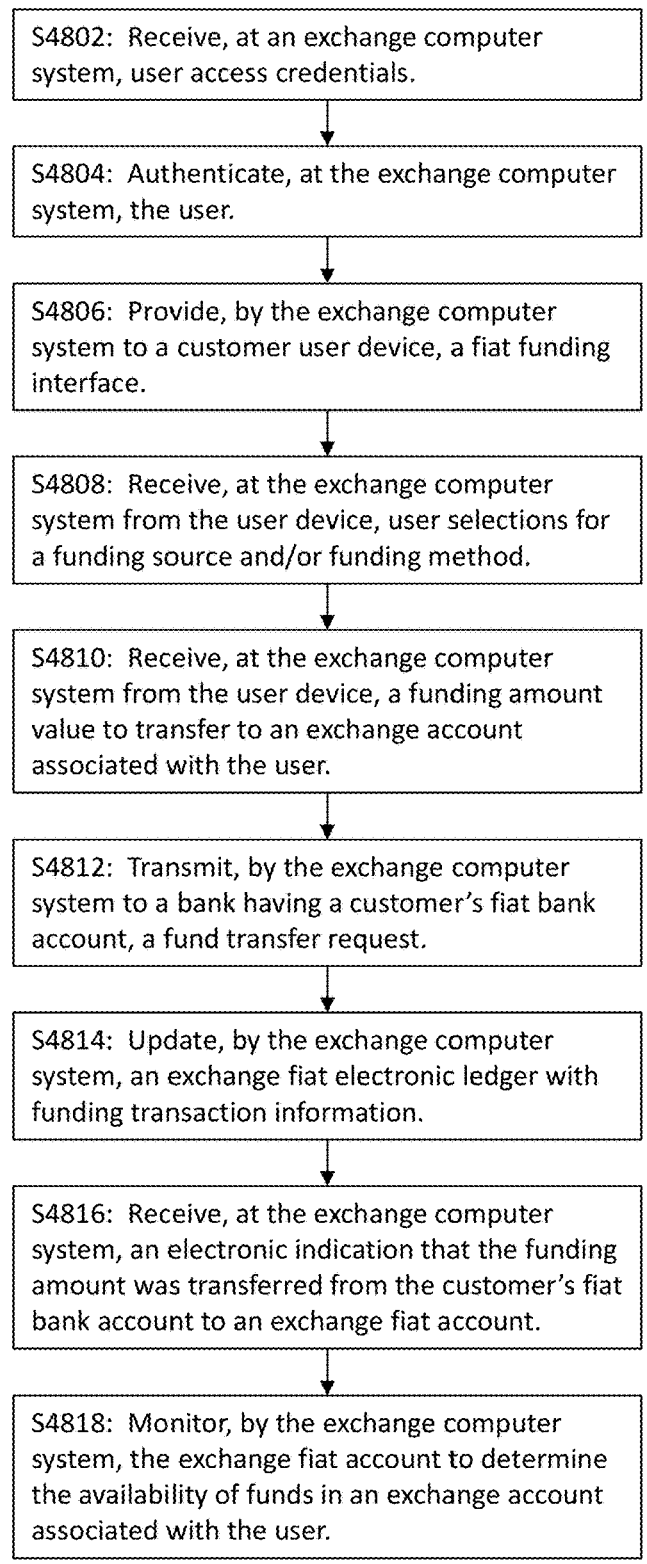

FIG. 7A is an exemplary schematic diagram of an exchange, and FIG. 7B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 4A.

Referring to FIG. 7B, in a step S4802 the exchange computer system can receive, e.g., from a user device, user access credentials. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, S4808 and S4810 may be a single step. Accordingly, the exchange computer system may receive from a user electronic device a user electronic request comprising a funding amount and a funding method. In embodiments, the funding method may be an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 7C:
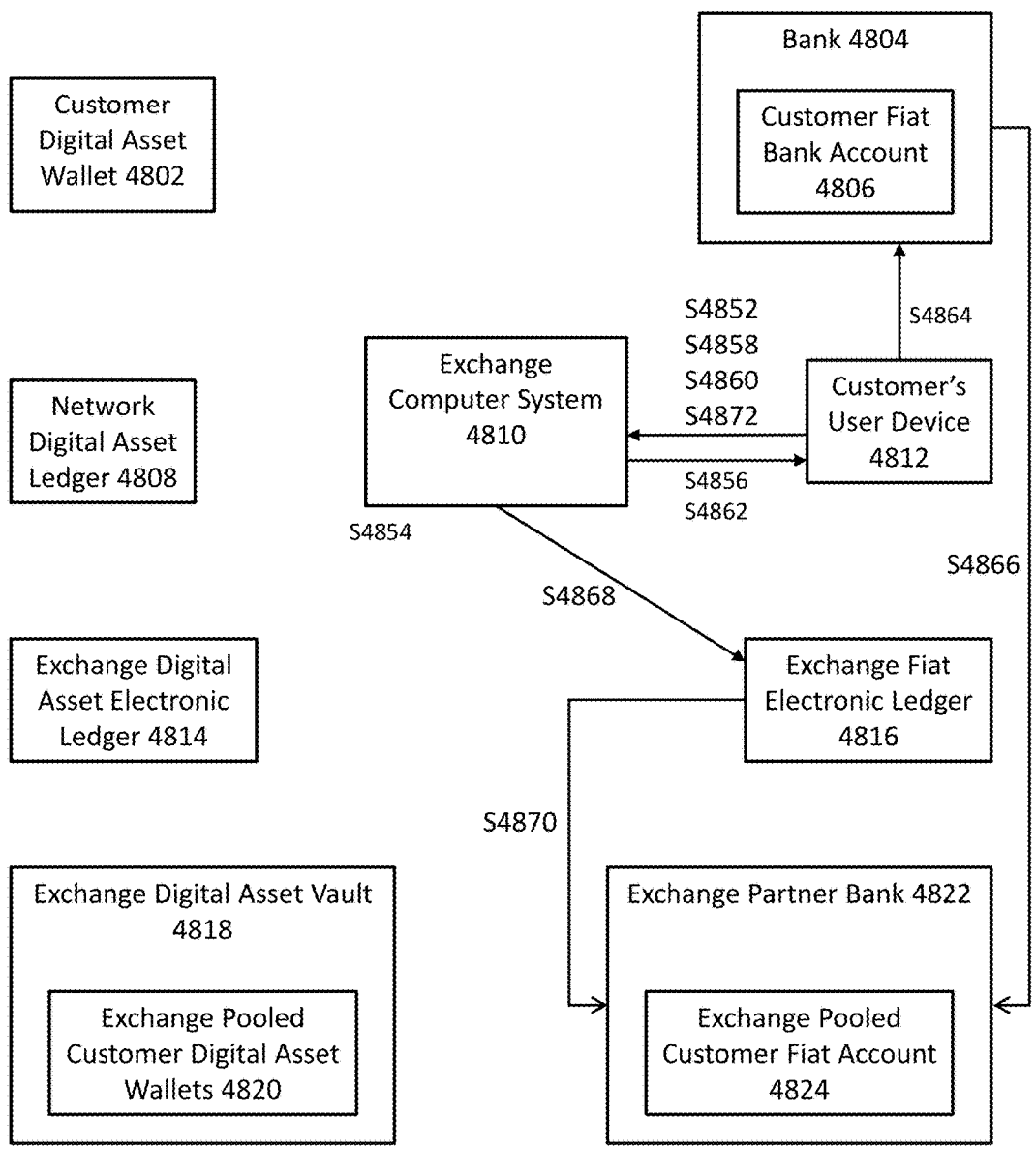
FIGS. 7C-E are an exemplary schematic diagram and corresponding flow chart of a process for digital asset exchange customer account fiat funding via a customer-initiated request in accordance with exemplary embodiments of the present invention.
Figure 7D:
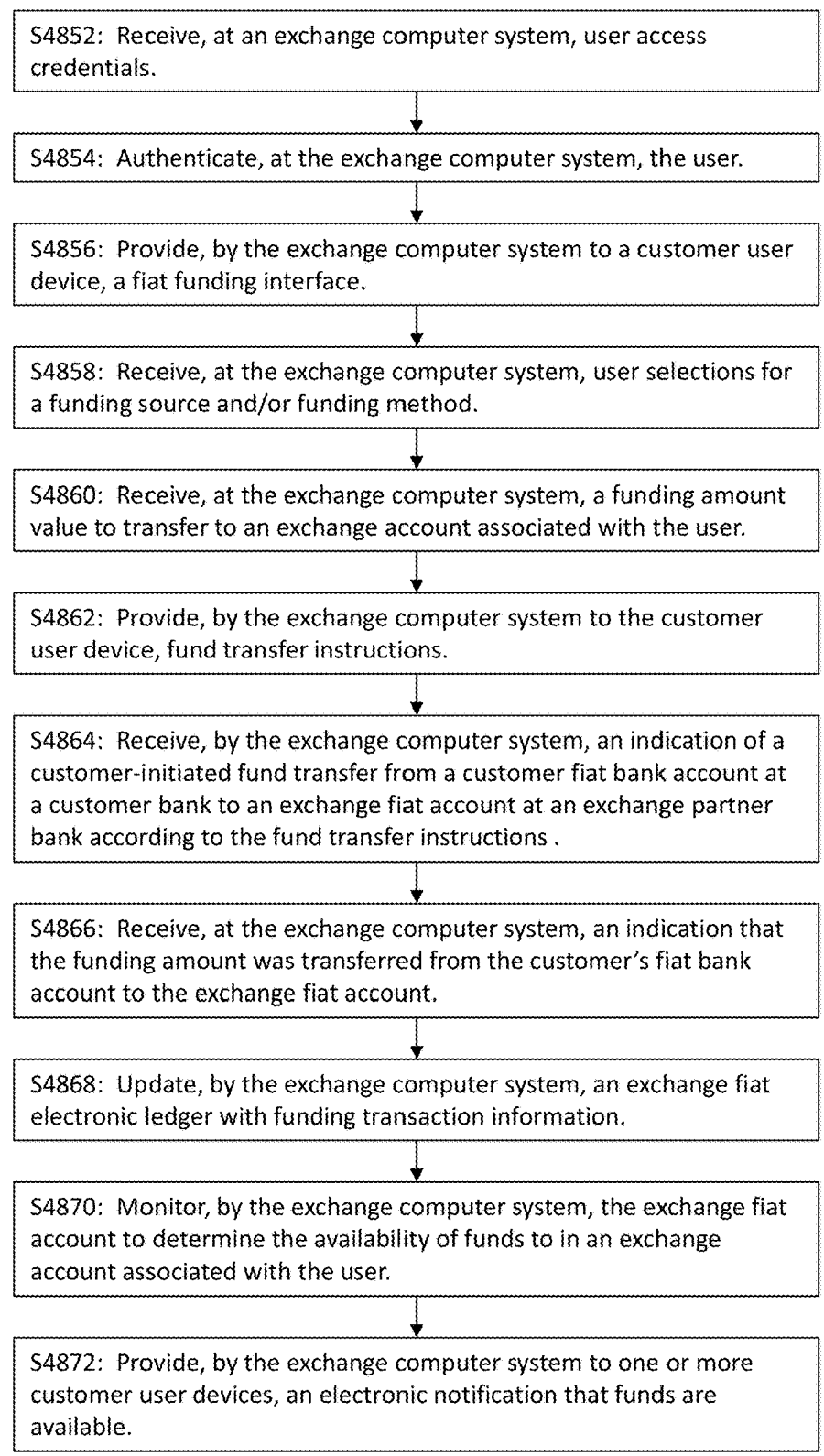

FIG. 7C is an exemplary schematic diagram of an exchange, and FIG. 7D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 7C are described with respect to FIG. 4A.

FIG. 7D is a flow chart showing an exemplary process for digital asset exchange customer account fiat funding. In a step S4852, an exchange computer system can receive user access credentials. In a step S4854, the exchange computer system can authenticate the user by verifying the received access credentials. Verifying the access credentials can comprise comparing the credentials to a secure credentials database. In a step S4856, the exchange computer system can provide to a customer user device a fiat funding interface. In a step S4858, the exchange computer system can receive from the customer user device, user selections for a funding source and/or funding method. The funding method may be a customer-initiated method, such as a wire transfer. In a step S4860, the exchange computer system can receive a funding amount value to transfer to an exchange account associated with the user. In a step S4862, the exchange computer system can provide to the customer user device fund transfer instruction, e.g., wire instructions. In a step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In a step S4866, the exchange computer system may receive an indication that the funding amount was transferred from the customer's fiat bank account to the exchange fiat account. In a step S4868, the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872, the exchange computer system can provide an electronic notification to one or more customer user devices that funds are available for use on the exchange.

Figure 7E:
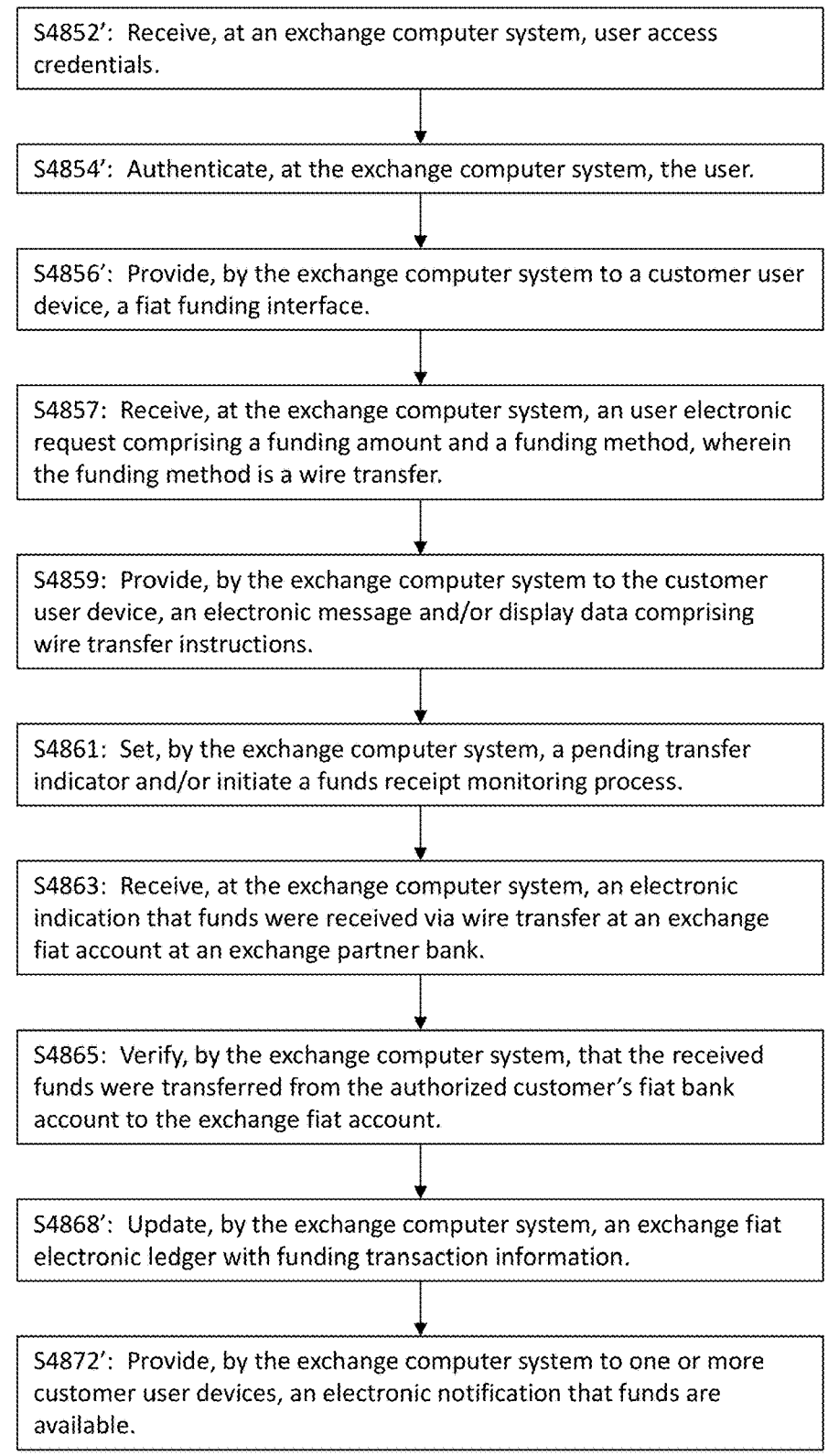

FIG. 7E is a flow chart showing another exemplary process for digital asset exchange customer account fiat funding. In a step S4852', an exchange computer system can receive user access credentials. In a step S4854', the exchange computer system can authenticate the user by verifying the received access credentials. Verifying the access credentials can comprise comparing the credentials to a secure credentials database. In a step S4856', the exchange computer system can provide to a customer user device a fiat funding interface. In a step S4857, the exchange computer system can receive a user electronic request comprising a funding amount and a funding method (e.g., a wire transfer). In a step S4859, the exchange computer system can provide to the customer user device, an electronic message and/or display data comprising wire transfer instructions. In a step S4861, the exchange computer system can set a pending transfer indicator and/or initiate a funds receipt monitoring process. In a step S4863, the exchange computer system can receive an electronic indication that funds were received via wire transfer at an exchange fiat account at an exchange partner bank. In a step S4865, the exchange computer system can verify that the received funds were transferred from the authorized customer's fiat bank account to the exchange fiat account. In a step S4868', the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872', the exchange computer system can provide an electronic notification to one or more customer user devices that funds are available for use on the exchange.

Figure 8A:
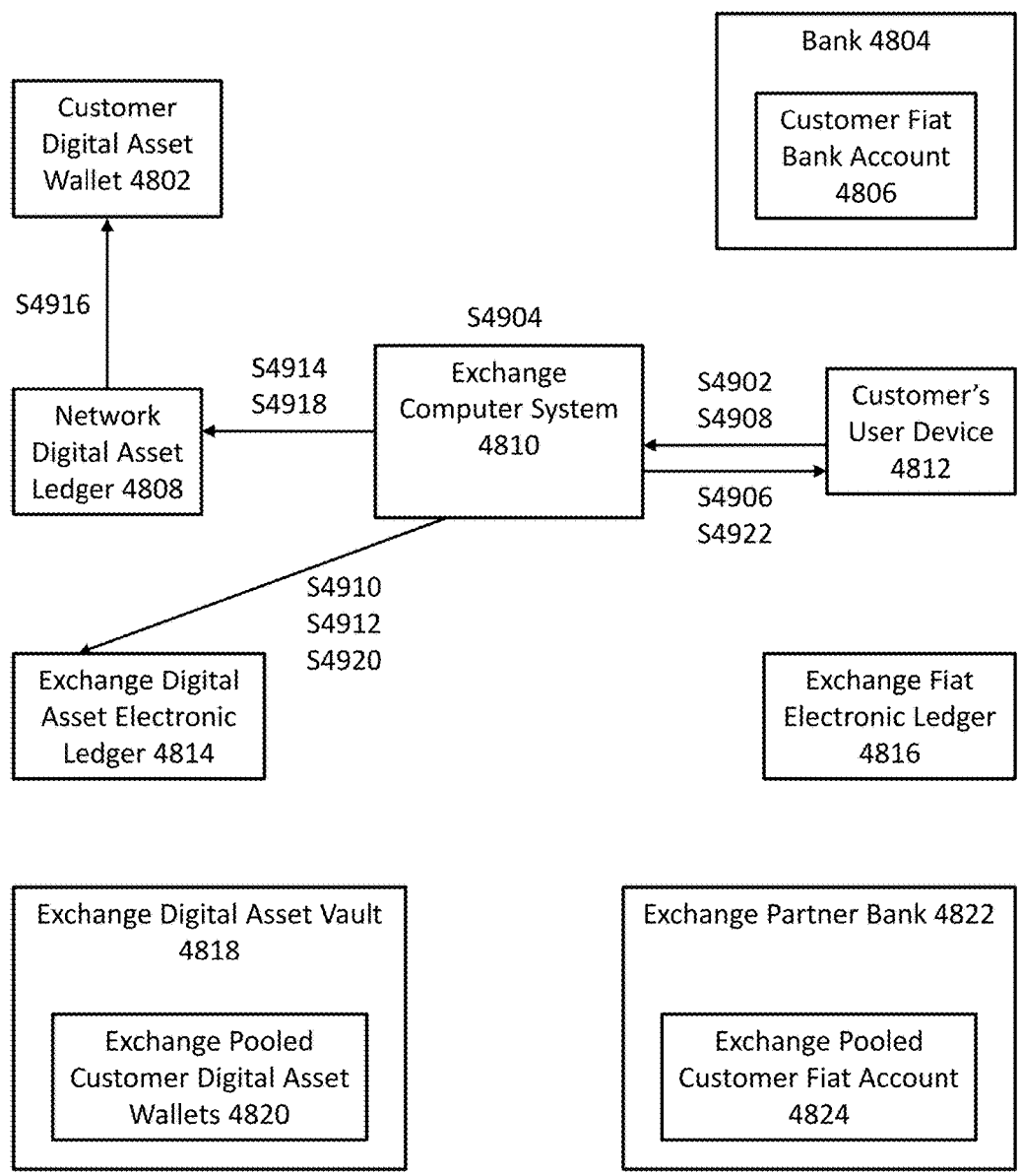
FIGS. 8A-B are a schematic diagram and corresponding flow chart of a process for digital asset exchange account digital asset withdrawal in accordance with exemplary embodiments of the present invention.
Figure 8B:
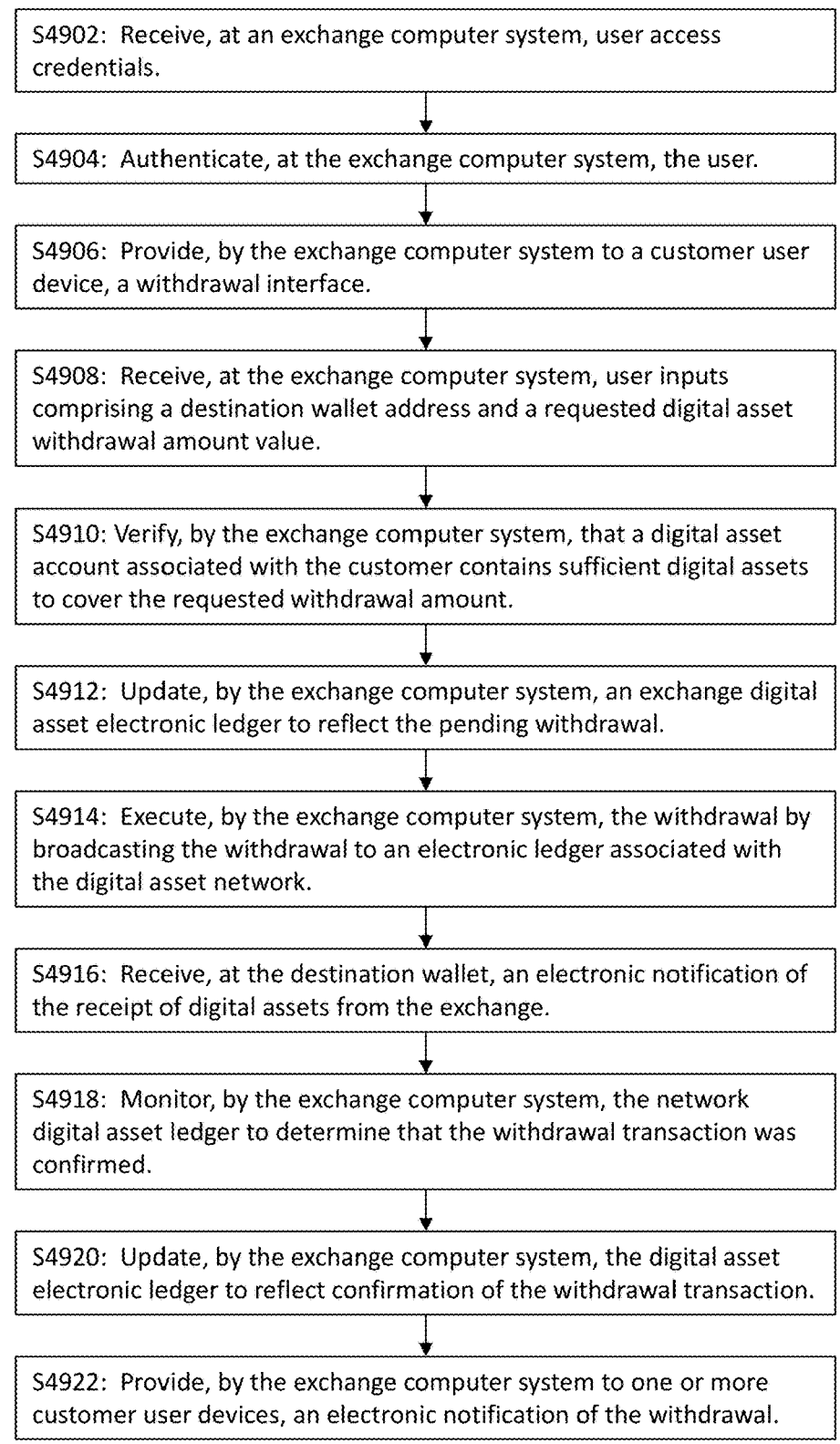

FIG. 8A is an exemplary schematic diagram of an exchange, and FIG. 8B is a corresponding flow chart of a process for digital asset exchange account digital asset withdrawal in accordance with exemplary embodiments of the present invention. The components and entities associated with an exchange that are shown in FIG. 8A are described herein with respect to FIG. 4A.

Referring to FIG. 8B, in a step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In a step S4904, the exchange computer system can authenticate the user based upon the received user access credentials. In a step S4906, the exchange computer system may provide to a customer user device a withdrawal interface. In a step S4908, the exchange computer system may receive from the customer user device user inputs comprising at least a destination digital asset address, typically associated with a destination digital wallet and a requested digital asset withdrawal amount value. In a step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In a step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In a step S4914, the exchange computer system may execute the withdrawal, e.g., by broadcasting the withdrawal to a digital asset network electronic ledger, e.g., the Bitcoin Blockchain, the Ethereum Blockchain, to name a few. In a step S4916, the destination wallet may receive an electronic notification of the receipt of digital assets from the exchange. In a step S4918, the exchange computer system may monitor the network digital asset ledger to determine whether and/or when the withdrawal transaction is confirmed. In a step S4920, the exchange computer system may update the digital asset electronic ledger, e.g., by debiting the withdrawal amount from the customer's exchange account, to reflect confirmation of the withdrawal transaction. In a step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain an loss reporting system and a transaction history system. A fraud analysis system can monitor transactions to detect fraudulent and/or unauthorized transactions. The exchange can also include a SVCoin system, which may comprise a purchase system, redemption system, and a dividend payment system. In a preferred embodiment, a SVCoin system is included to allow users to purchase and redeem stable value coins using fiat currency and/or other digital assets.

Exchange Digital Asset Storage Structure

Deposited customer fiat may be held in a pooled fiat account maintained in a partner bank. Meanwhile, digital assets held by the exchange may be maintained in pooled digital addresses associated with pooled digital wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated offline with transactions generated offline, e.g., on an isolated computer, and transferred to a networked computer via a temporary physical connection or manual transfer. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the Bitcoin network, the Ethereum network, to name a few. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key or private keys/key segments to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. The exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counterparty to the transaction. Transaction amount limits may be placed on such transactions and/or additional fees may be charged. In addition, in embodiments, the exchange may provide a dashboard interface for users (such as registered users) to purchase SVCoins using fiat currency and/or digital assets and/or to redeem digital assets in the form of SVCoins. In embodiments, the dashboard interface for the exchange may also allow users to redeem SVCoins for fiat currency. Since SVCoins are pegged to a fixed notional value of fiat currency, when SVCoins are purchased an equal amount of fiat will be set aside by the exchange as a reserve for when the SVCoins are redeemed. Similarly, when SVCoins are redeemed, payment for such redemption shall come from reserves set aside for such redemption.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars ("USD") held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, a digital asset exchange may hold digital math-based assets and/or fiat currency in trust for users. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities. In embodiments, a digital asset exchange may comply with rules and regulations promulgated by a self-regulatory organization.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

In embodiments, the exchange may permit trading twenty-four hours a day, seven days a week. In embodiments, the exchange may shut down for scheduled and/or unscheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

Exchange-Based Stable Value Coin to Fiat Portal

In embodiments, a digital asset exchange (such as a regulated exchange) can be used to exchange SVCoin for fiat and fiat for SVCoin. Since SVCoin is a stable value token, each token will be pegged to a stable value of fiat (e.g., 1 SVCoin=1 USD or 1 SVCoin=1 EUR, to name a few). In embodiments, when fiat is provided to a digital asset exchange to purchase SVCoin, a sufficient amount of fiat to cover the notional value of the SVCoin will be set aside and held until the SVCoin is redeemed. Similarly, when SVCoin is redeemed the corresponding amount of fiat associated with the notional value of the SVCoin will be taken from such reserves to cover the redemption. In embodiments, each time SVCoins are purchased, redeemed and/or traded, transaction fees may be charged by the SVCoin issuer, and/or others involved in the transaction, such as miners on the digital asset network. Such transaction fees may be charged in fiat, SVCoin and/or other digital assets (e.g, Gas, bitcoin, ether, to name a few).

In embodiments, when a user (such as a registered user of a regulated digital asset exchange) commences a purchase order to acquire SVCoin for fiat, the user may have fiat currency in an associated user account. Alternatively, the user may send fiat currency to the exchange's account, such as an omnibus account, at the applicable bank. In embodiments, when a seller sells SVCoin, the seller may have the SVCoin in an associated user account or may send SVCoin to a digital asset account. Specifically, the seller may send SVCoin to one or more of digital asset addressed, typically associated with digital wallets held by the exchange. In embodiments, exchange transactions may only be completed after the verification that the digital asset accounts and fiat accounts associated with the users involved in the transaction at least equal the quantities of each required by the transaction.

In embodiments, registered users of a digital asset exchange system, such as Gemini, may purchase and/or redeem SVCoins for fiat and/or other digital assets though one or more digital asset dashboard interfaces. In embodiments, the one or more digital asset dashboard interfaces may include: (i) a dashboard fiat interface which allows registered users to deposit and/or withdrawal fiat with the digital asset exchange, (ii) a dashboard digital asset interface which allows registered users to deposit and/or withdrawal digital assets with the digital asset exchange system, (iii) a dashboard SVCoin interface which allows registered users to purchase and/or redeem SVCoins with the digital asset exchange system; and (iv) a dashboard Security Token interface which allow Security Token issuers to provide instructions to transfer SVCoins to Security Token holders. Each of these dashboard interfaces will now be described in turn.

FIGS. 11A1-4 illustrates an exemplary embodiment of a dashboard fiat interface which allows registered users to deposit and/or withdraw fiat with the digital asset exchange.

FIG. 11A1 illustrates an exemplary embodiment of the dashboard fiat interface as used for deposit of fiat. As illustrated, the user has the option to make a transfer from a bank to the exchange by indicating an amount of fiat 1102 (e.g., US dollars) to be transferred from a funding source 1100 (e.g., a bank account).

FIG. 11A2 illustrates an exemplary embodiment of the dashboard fiat interface providing an option of a wire transfer. As in FIG. 11A1, the user indicates an amount of fiat 1102 to be transferred from a funding source 1100, such as a bank, to be wired to the exchange.

FIG. 11A3 illustrates the dashboard fiat interface as used to withdraw fiat from the exchange and deposit it into a destination (e.g., a bank). In this case, the user provides a withdrawal amount of fiat 1104 and a destination 1106, such as a bank account, for the specific fiat.

Figures 4, 11A:
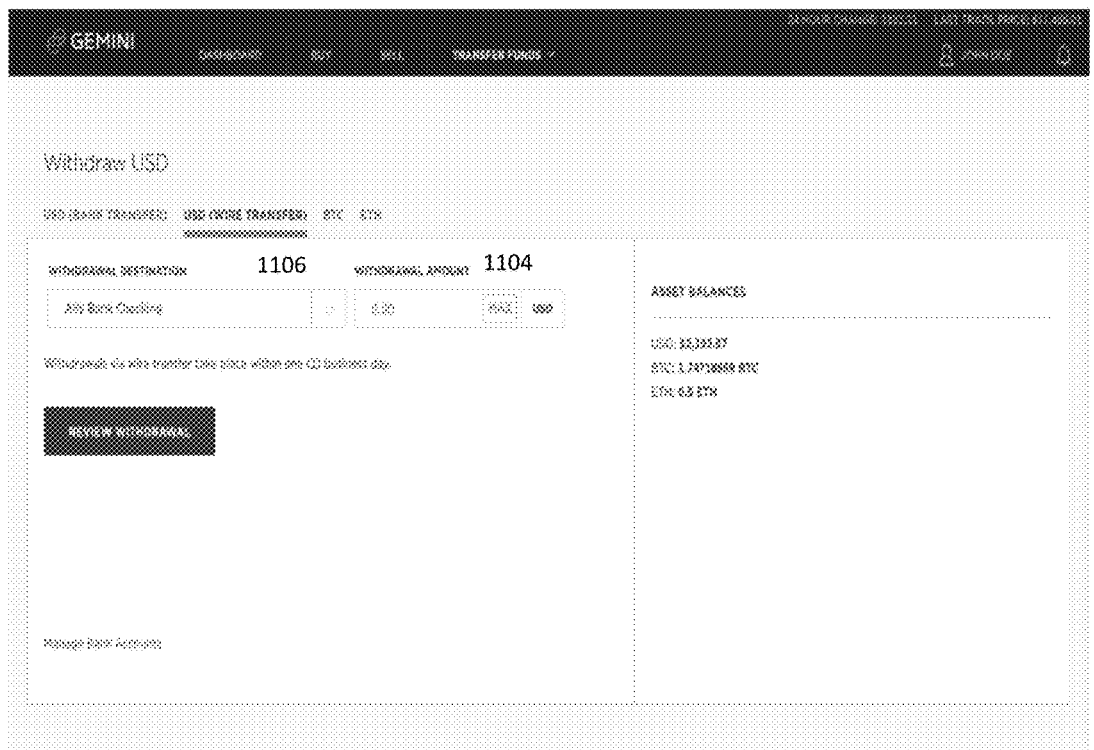

Similarly, FIG. 11A4 illustrates the dashboard fiat interface as used to withdraw fiat via a wire transfer where the user enters the withdrawal amount of fiat 1104 and a destination 1106, such as a bank account.

FIGS. 11B1-4 illustrates an exemplary embodiment of a dashboard digital asset interface which allows registered users to deposit and/or withdrawal digital assets with the digital asset exchange system.

Figures 1, 11B:
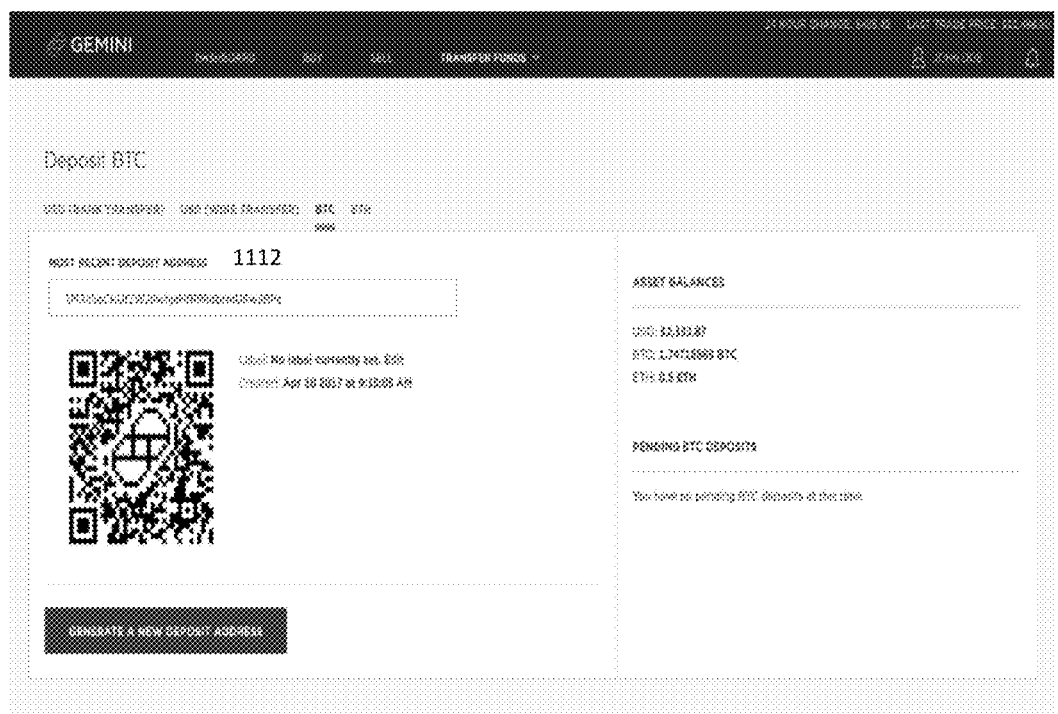
Figures 2, 11B:
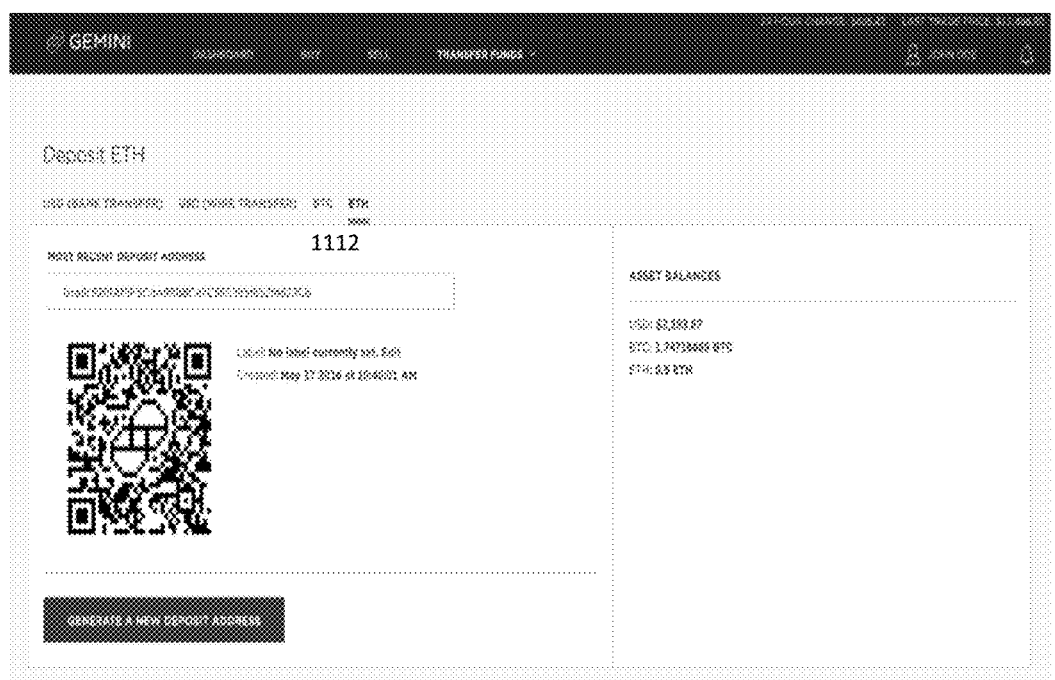
Figures 3, 11B:
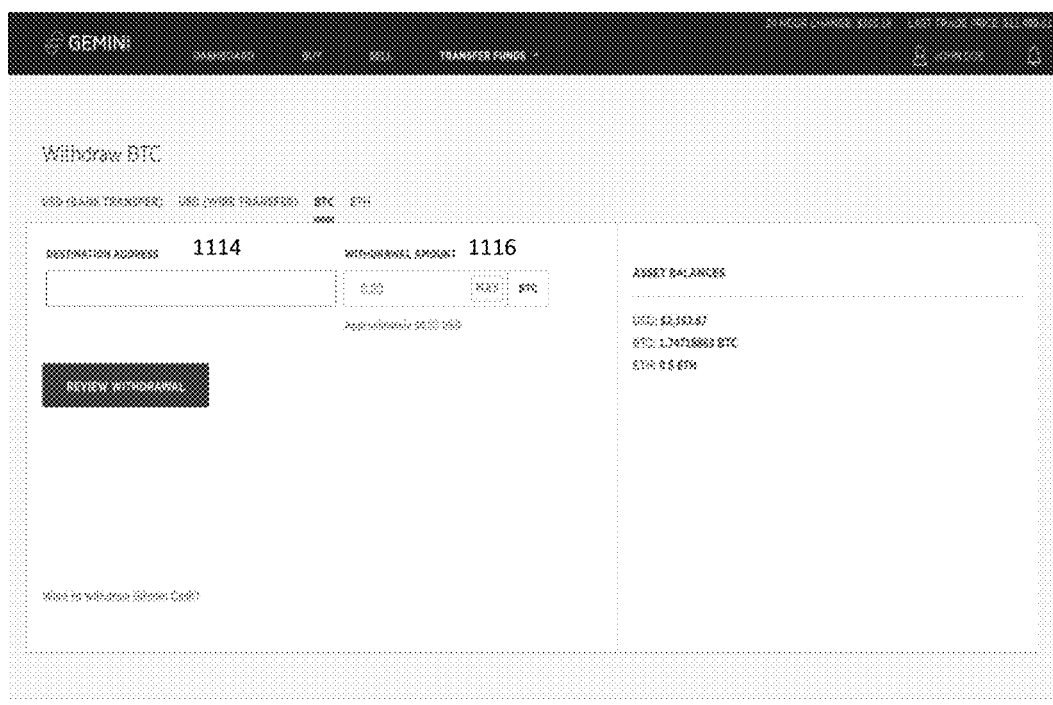
Figures 4, 11B:
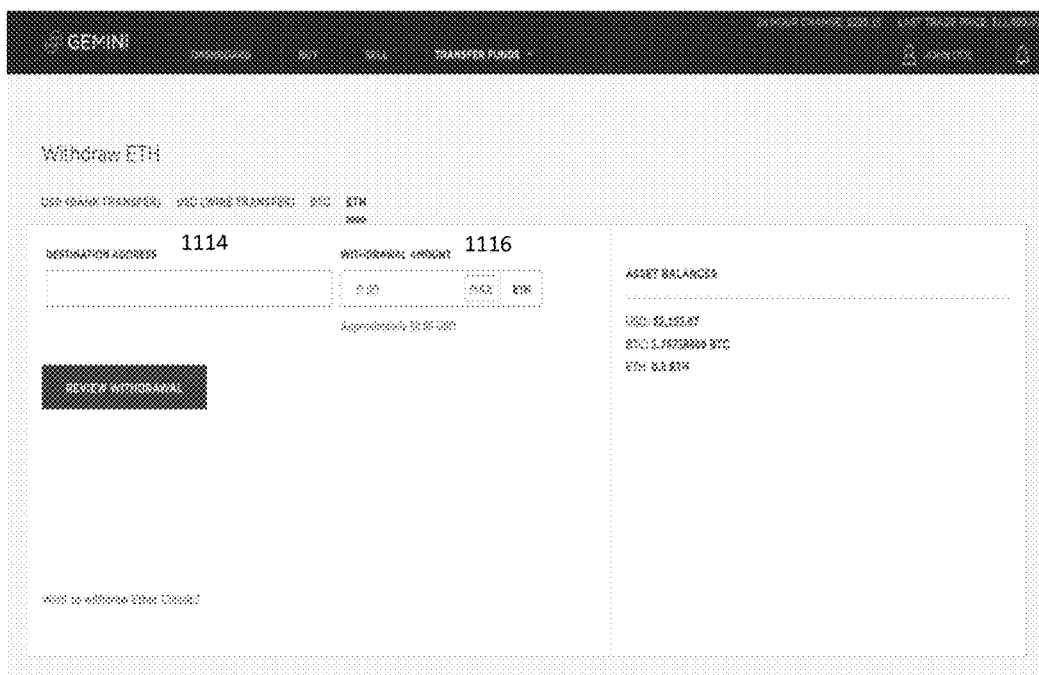

FIG. 11B1 illustrates an exemplary embodiment of the dashboard fiat interface as used for deposit of digital assets, specifically bitcoin in this nonlimiting example. As illustrated, the user enters the current address 1112 of the digital asset (e.g., bitcoin, ether, etc).

FIG. 11B2 illustrates another exemplary embodiment of the dashboard fiat interface as used for deposit of digital assets, specifically ether this nonlimiting example. As illustrated, the user enters the current address 1112 of the digital asset (ether in this example.

FIG. 11B3 illustrates an exemplary embodiment of the dashboard fiat interface as used for withdrawal of digital assets, specifically bitcoin in this nonlimiting example. As illustrated, the user enters the destination address 1114 for the digital asset (bitcoin) as well as amount of digital assets 1116 to be withdrawn.

FIG. 11B4 illustrates an exemplary embodiment of the dashboard fiat interface as used for withdrawal of digital assets, specifically ether this example. As illustrated, the user enters the destination address 1114 of the digital asset (ether) as well as amount of digital assets 1116 to be withdrawn.

Figures 1, 11C:
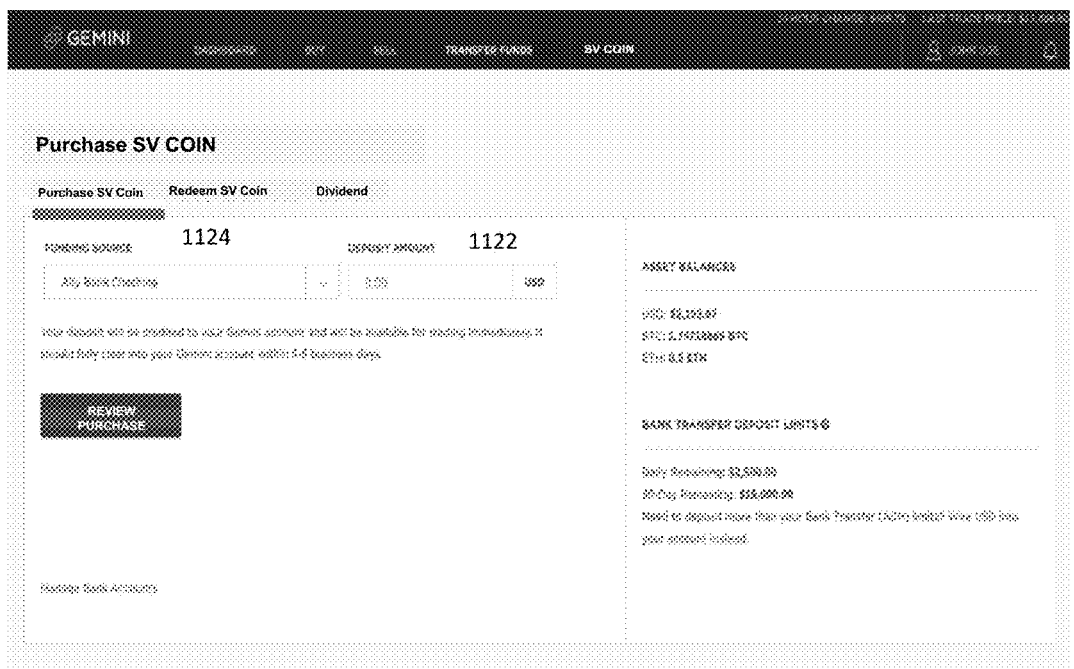
Figures 2, 11C:
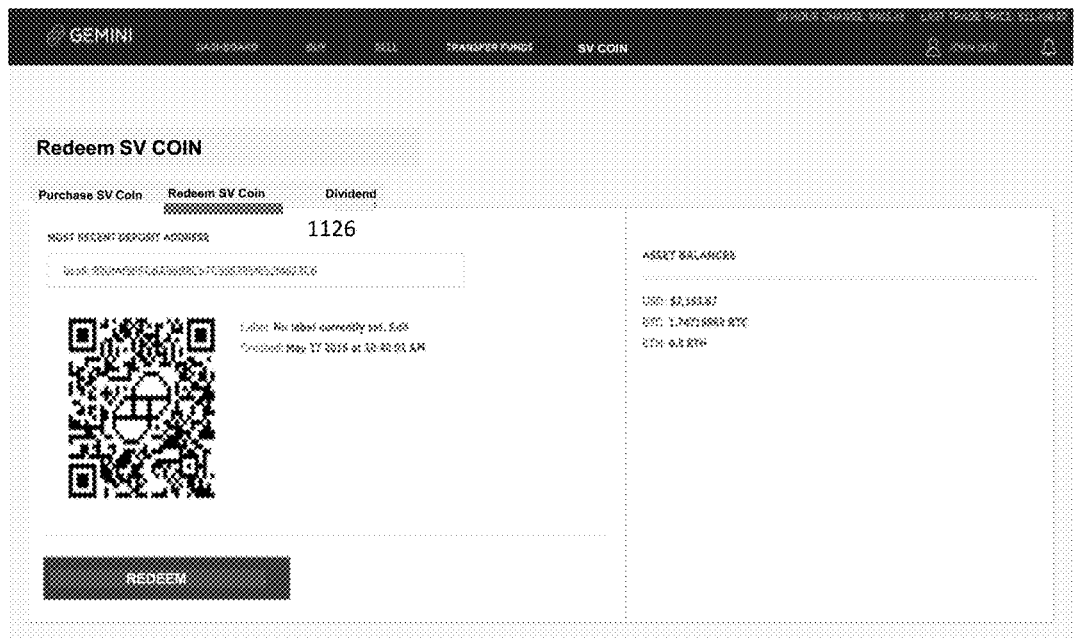

FIGS. 11C1-2 illustrates an exemplary embodiment of a dashboard SVCoin interface which allows registered users to purchase and/or redeem SVCoins with the digital asset exchange system.

FIG. 11C1 illustrates an exemplary embodiment of the dashboard fiat interface as used to purchase SVCoins using fiat. As illustrated, the user may enter an amount of fiat (U.S. dollars, in this example) 1122 to be provided from a source 1124 (e.g., a bank account) to purchase the SVCoins.

FIG. 11C2 illustrates an exemplary embodiment of the dashboard fiat interface as used to purchase SVCoins using digital assets (bitcoin in this example). As illustrated, the user may enter the current address of the digital asset 1126.

Figure 9A:
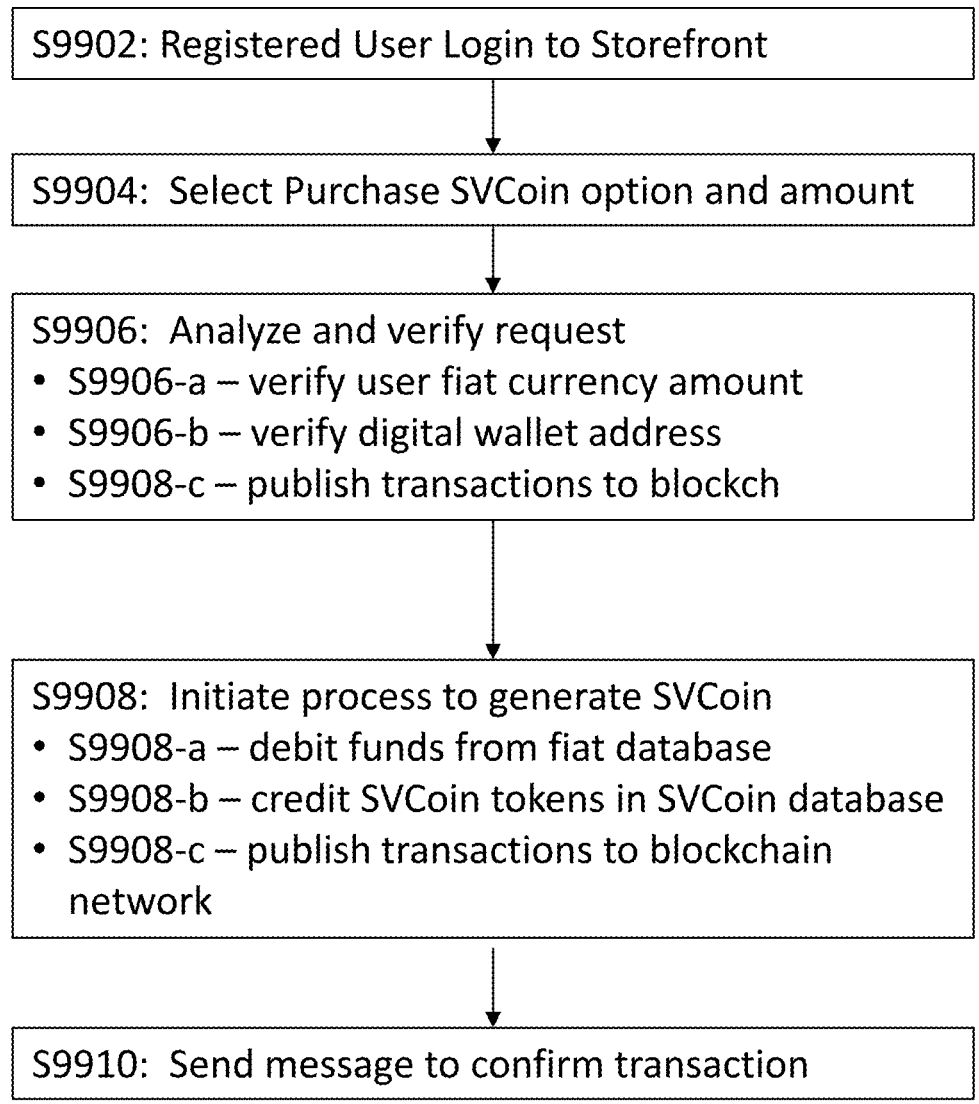
FIG. 9A is an exemplary flow chart of the process for purchasing SVCoin for fiat on a digital asset exchange in accordance with exemplary embodiments of the present invention.

In embodiments, a registered user may purchase SVCoins in exchange for fiat. Referring to FIG. 9A, in S9902, a registered user may log in to the dashboard SVCoin interface, such as illustrated in FIGS. 11C1-2.

In S 9904, the user selects the purchase SVCoin option, and specifies the amount of SVCoins the user seeks to obtain. In embodiments, the user may be requested to provide a digital asset address, typically associated with a digital wallet, such as a digital asset address associated with a blockchain digital asset, like ether. In embodiments, the amount of SVCoins to be purchased may be specified by number of SVCoins, or by an amount of fiat. Since the SVCoins are pegged to the fiat in a stable amount (e.g., 1 SVCoin=1 USD), the system can automatically convert and display the requested amount of SVCoin into fiat, or requested amount of fiat into SVCoin.

In S9906, the digital asset exchange system will analyze and verify that the request can be properly processed. In step S9906-*a*, the digital asset exchange system, as the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S9906-*b*, the digital asset exchange system, may also verify that the digital asset address provided is a valid digital asset address.

In S9908, after the digital asset exchange system has confirmed that the user has sufficient fiat to cover the transaction, the digital asset exchange system may initiate the process of generating the requested SVCoin. In embodiments, where SVCoins were previously generated, then S9908 may be replaced with an alternative process S9908' as discussed below.

Returning to S9908, in S9908-*a*, the digital asset exchange system may debit the designated fiat funds from a fiat ledger associated with the user account, and credit a corresponding amount of fiat to the SVCoin fiat ledger to be held in trust by the Exchange.

In S9908-*b*, the digital asset exchange system shall generate the requested SVCoin tokens. As part of this step, or as an additional step, the digital asset exchange system will update the SVCoin ledger to reflect the creation of the newly generated SVCoins and to indicate the digital asset address associated with these newly generated SVCoins.

In S9908-*c*, the digital asset exchange system shall publish to the blockchain network (e.g., the Ethereum Network) the transaction to be recorded by the blockchain network. In embodiments, a transaction fee may be required by, e.g., a miner, to process and add the requested transaction on the blockchain.

As noted, when a reserve of SVCoin had been previously created but not yet distributed by the digital asset exchange system, S9908' may be implemented instead of S9908. At step S9908-*a'*, digital asset exchange computer system may debit the designated fiat funds from a fiat ledger associated with the user account, and credit a corresponding amount of fiat to the SVCoin fiat ledger to be held in trust by the Exchange.

In step S9908-*b'*, the digital asset exchange computer system may determines an appropriate amount of SVCoin from the reserve to satisfy the request.

In step S9908-*c'*, the digital asset exchange computer system updates the SVCoin ledger to change the address associated with the portion of the reserve determined in step S9908*b'* to the address associated with the user.

In S9910, the digital asset exchange computer system may send a message to the registered user, and/or the designated digital asset address to reflect that the transaction was successfully processed. In embodiments, such messages may include information including: (i) digital asset address; (ii) the amount of tokens generated; and/or (iii) the new balances for the digital asset address.

Figure 9B:
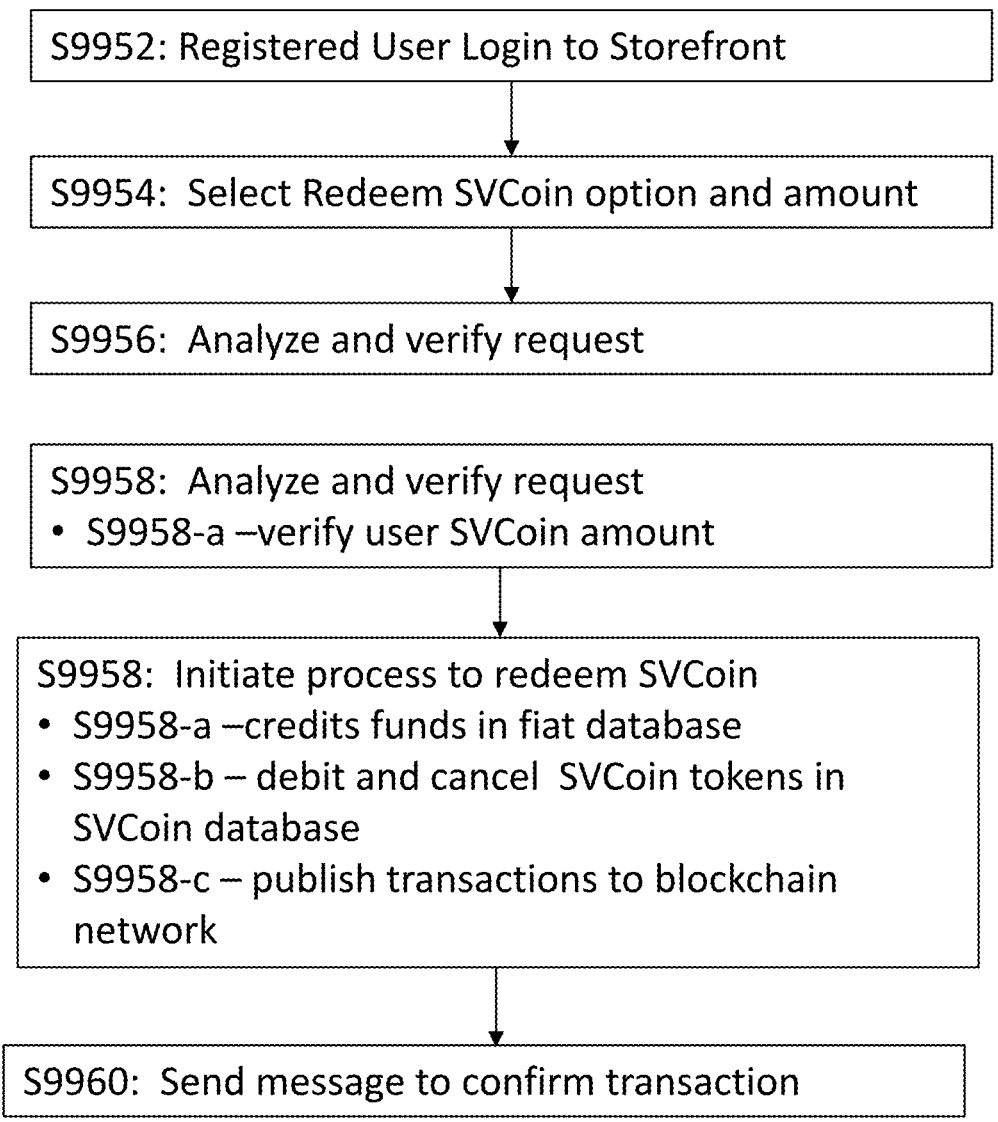
FIG. 9B is an exemplary flow chart of the process for redeeming SVCoin for fiat on a digital asset exchange in accordance with exemplary embodiments of the present invention.

In embodiments, a registered user may redeem SVCoins in exchange for fiat. Referring to FIG. 9B, in S9952, a registered user may log in to the dashboard SVCoin interface, such as illustrated in FIGS. 11C1-2.

In S9954, the user selects the redeem SVCoin option, and specifies the amount of SVCoins the user seeks to redeem. In embodiments, the user may be requested to provide a digital wallet address, such as a digital wallet address associated with a blockchain digital asset, like ether. In embodiments, the amount of SVCoins may be specified by number of SVCoins, or by an amount of fiat. Since the SVCoins are pegged to the fiat in a stable amount (e.g., 1 SVCoin=1 USD), the system can automatically convert the requested amount of SVCoin to fiat, or requested amount of fiat into SVCoin.

In S9956, the digital asset exchange system will analyze and verify that the request can be properly processed. In step S9956-a, the digital asset exchange system, as the SVCoin issuer, may verify that the user has sufficient SVCoin to cover the transaction, as well as any transaction fees that may be charged. In embodiments, the digital asset exchange system may perform verification of the SVCoin balance by checking the token balance of the digital asset address against the SVCoin Token ledger as maintained by the digital asset blockchain. For example, a balance for a token issued based on the Ethereum Network may be check at www.etherscan.io. If the user does not have sufficient SVCoin and/or an insufficient amount for transaction fees and/or provided an invalid digital asset address, to name a few, the transaction may be terminated.

In embodiments, SVCoin transactions may be published and recorded in a SVCoin token side ledger that is separate from an underlying blockchain (e.g., the Ethereum Blockchain). Such a side ledger may be provided using a sidechain, for example, a plasma chain, which is separate from the underlying digital asset blockchain that is maintained on the distributed network. In embodiments, this sidechain is used to record all transactions involving the SVCoin token and is maintained by the token issuer or another trusted entity on behalf of the token issuer. These transactions may then be subsequently published to the underlying digital asset blockchain periodically or aperiodically such that all transactions are publicly viewable and confirmable. In embodiments, with a blockchain supporting shielded transactions, the transactions in the SVCoin token may potentially be shielded only viewable by authorized token holders. In embodiments, transactions on the sidechain may be consolidated prior to publication on the digital asset blockchain to increase speed of processing and reduce transaction costs.

The use of a sidechain in conjunction with a blockchain can provide certain technical advantages not otherwise available by either alone. For example, since all transactions on the sidechain are inevitably published to the digital asset blockchain, these transaction records enjoy the same benefit of immutability provided to all other transactions on the digital asset blockchain. However, use of a sidechain reduces both transaction costs and transaction times overall. Recording the transactions on the sidechain first can be accomplished more rapidly than transactions that are published directly to the digital asset blockchain, which must be confirmed prior to being added to the digital asset blockchain. In embodiments, the sidechain may simply be a database that records all transactions such that there is no need for miners to verify each transaction, and thus, no need to pay miners for this service. In this case, transaction costs are only incurred for the periodic or aperiodic publication of transfers from the sidechain to the underlying digital asset blockchain.

In embodiments, the database for the SVCoin tokens may be maintained as a separate side chain from the database for each Security token. In embodiments, one or more security tokens may be maintained in the same side chain as the SVCoin token, and/or by the same trusted entity system as used to maintain the SVCoin token database.

In S9958, after the digital asset exchange system may confirm that the user has sufficient SVCoin to cover the transaction, as well as any other designated criteria, the digital asset exchange system may initiate the process of redeeming the designated SVCoin.

In S9958-a, the digital asset exchange system shall redeem the designated SVCoin tokens, including updating the SVCoin token ledger database to reflect the debiting and cancelling of the designated tokens and debiting the corresponding digital wallet address associated with such redeemed SVCoin tokens. In embodiments, this process may be performed by generating a transaction on the digital asset exchange network from a contract digital wallet address or other authorized digital wallet address under the relevant SVCoin smart contract programming, to be sent in S9958-c, discussed below.

In S9958-b, the digital asset exchange system shall credit the designated fiat funds to a fiat ledger associated with the user account, and debit a corresponding amount of fiat from the SVCoin fiat ledger being held in trust by the exchange.

In S9958-c, the digital assert exchange system shall publish to the blockchain network (e.g., the Ethereum Network) the transaction to be recorded by the blockchain network. In embodiments, a transaction fee (such as Gas) may be required by, e.g., a miner, to process and add the requested transaction on the blockchain. In embodiments, the transaction fee may be specified as an amount and/or an amount limit to facilitate the transaction being processed by a miner.

In S9960, the digital asset exchange computer system may send a message to the registered user, and/or the designated digital asset addresses to reflect that the transaction was successfully processed. In embodiments, such messages may include information including: (i) digital asset address; (ii) the amount of tokens redeemed; and/or (iii) the new balances for the digital asset address or digital wallet associated therewith.

Blockchain Based Dividend Using Stable Value Coin

Figure 11D:
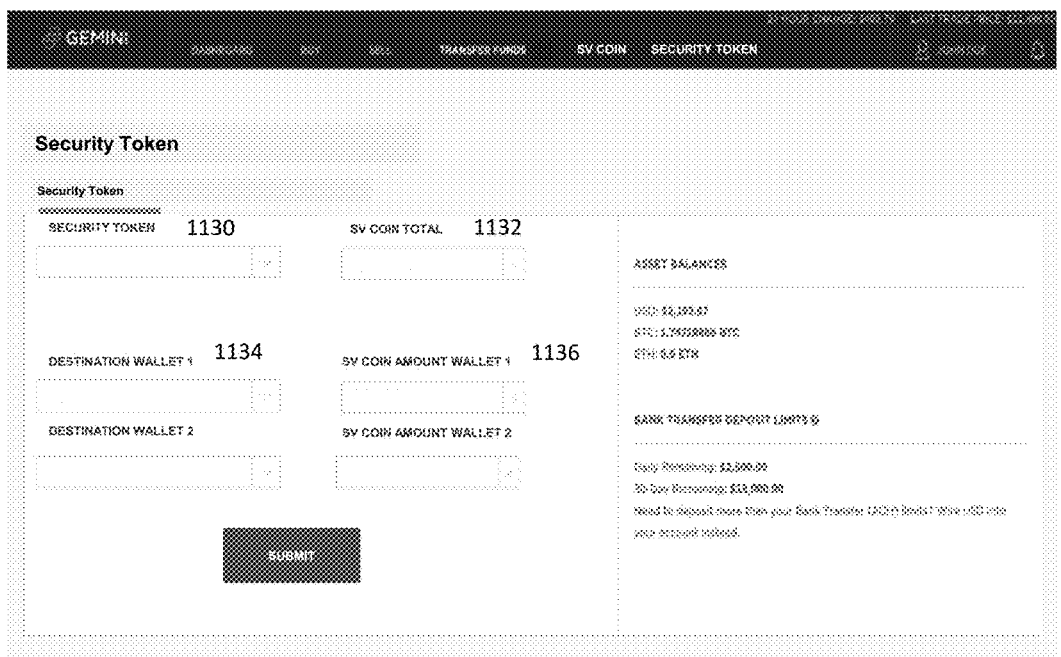
FIG. 11D illustrates an exemplary embodiment of a dashboard Security Token interface which allow Security Token issuers to provide instructions to transfer SVCoins to Security Token holders in accordance with exemplary embodiments of the present invention.

FIG. 11D illustrates an exemplary embodiment of a dashboard Security Token interface which allow Security Token issuers to provide instructions to transfer SVCoins to Security Token holders.

Figure 12:
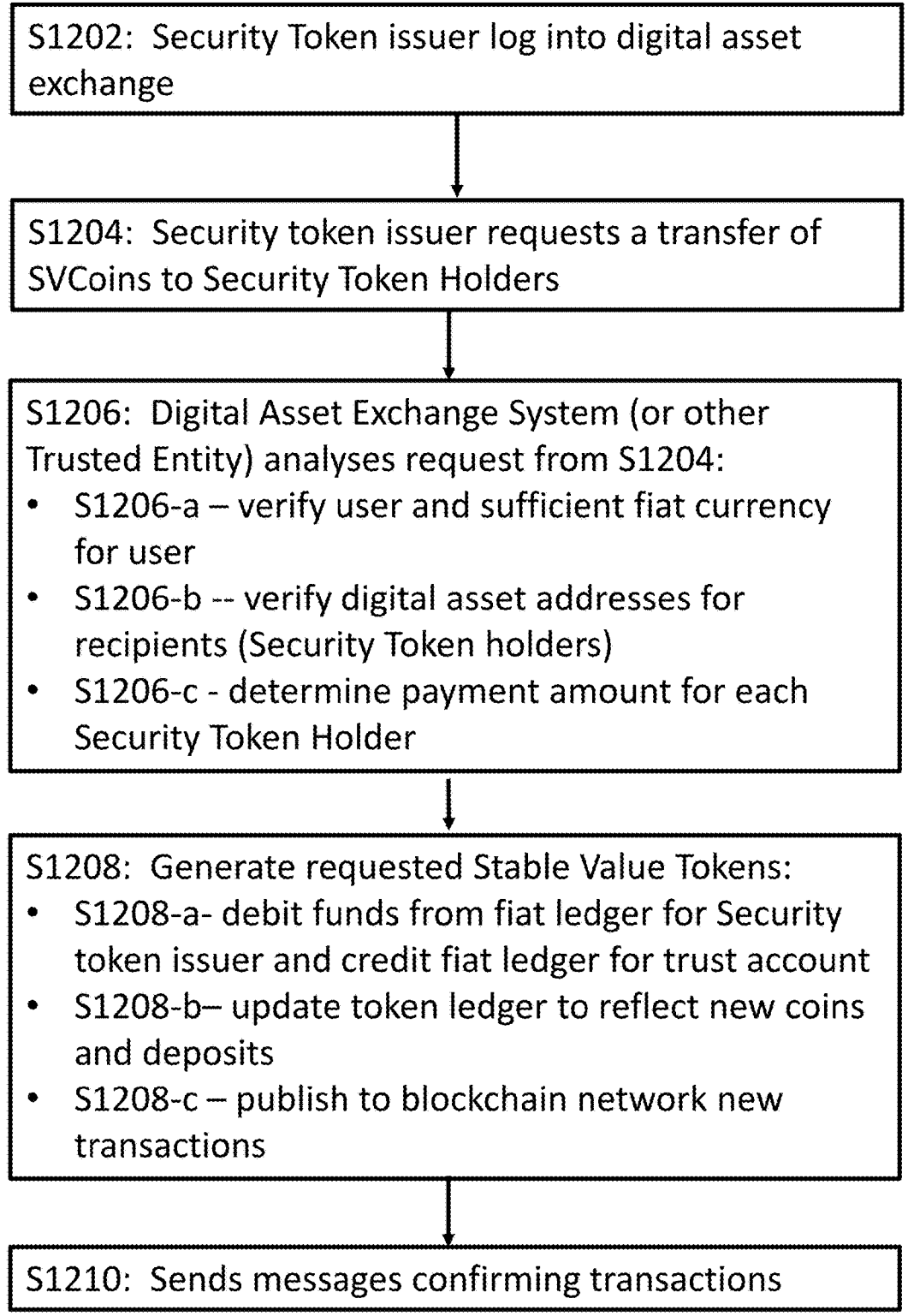
FIG. 12 illustrates an exemplary process flow reflecting an exemplary embodiment where a Security Token issuer initiates a transfer of SVCoins to Security Token holders in accordance with exemplary embodiments of the present invention.

Referring to FIG. 12, an exemplary process flow reflecting an exemplary embodiment is shown where a Security Token issuer initiates a transfer of SVCoins to Security Token holders. It will be appreciated by those skilled in the art that the order of this process may be modified consistent with embodiments of the present invention.

In Step S1202, the Security Token issuer (who will generally by a registered user with the digital asset exchange) will log into the digital asset exchange. In embodiments, the SVCoin issuer is any trusted entity, including a digital asset exchange, bank, trust or other trusted entity. In embodiments, the Security Token issuer will be an authorized user, or otherwise qualified with respect to the trusted entity. In embodiments, the trusted entity may act as agent of the Security Token issuer to generate, distribute and maintain a ledger of SVCoins on behalf of the Security Token issuer.

In Step S1204, the Security Token issuer system, or any trusted entity system acting as agent, will navigate to the dashboard Security Token interface (see, e.g., FIG. 11D) to initiate a request for transfer of SVCoins to Security Token holders. While for purposes of illustration, the request is made via the dashboard Security Token interface, those of skill in the art will appreciate that the request may be made via API calls, submitted by electronic mail, and/or other electronic interactions, consistent with embodiments of the invention. In embodiments, the request shall identify: (i) the Security Token 1130; (ii) the total amount of SVCoins to be distributed 1132; (iii) the Security Token holder's digital asset addresses 1134; (iii) the amount of SVCoins to be distributed to each digital asset address 1136; and/or (iv) other information sufficient to calculate or otherwise determine this information. In embodiments, this information may be provided by providing the digital asset exchange, or other trusted entity system acting on behalf of the SVCoin issuer, with the access to the Security Token database, which would include the list of all current Security Token holders and their respective digital asset address and Security Token balances. In embodiments, the Security Token database may include a list of all current Security Token holders and digital asset addresses associated with each. In such embodiments, the Security Token issuer, may still need to provide the digital asset exchange system, or other trusted entity system, with the amount of SVCoins to be distributed, either individually and/or in total and how to prorate the distribution among Security Token holders.

In Step S1206, the digital asset exchange system, or other trusted entity system, may analyze and verify that the request can be properly processed. In step S1206-a, the digital asset exchange system, as the SVCoin issuer or on behalf of the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S1206-b, the digital asset exchange system, may also verify that the digital asset addresses, provided are each a valid digital asset addresses. To the extent any digital asset addresses are not verified, the transaction may be rejected, and/or the digital asset exchange system may enter into a reconciliation process with the Security Token issuer system or trusted entity system.

At step 1206-c, the digital asset exchange system, or other trusted entity system, may determine an amount of SVCoins to be distributed to each of the digital addresses of the Security Token holders. In embodiments, this determination may be made based on the total number of Security Token holders and the total amount of SVCoins requested by the Security Token issuer. In embodiments, the Security Token issuer may designate a specific sum of SVCoins per Security token. In embodiments a total amount of SVCoins to be purchased may be designated in the request of the Security Token issue with directions to equally or proportionally divide the total sum between the Security Token holders.

In S1208, after the digital asset exchange system, or other trusted entity system, has confirmed that the user has sufficient fiat to cover the transaction, the digital asset exchange system may initiate the process of generating the requested SVCoin.

In S1208-a, the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange. In embodiments, this fiat is held in a custodial account of the exchange or an agent of the exchange.

In S1208-b, the digital asset exchange system, or other trusted entity system, shall generate instructions to generate the requested SVCoin tokens, including instructions to update the SVCoin token ledger database to reflect the addition of the new tokens and the corresponding digital asset addresses associated with such new SVCoin tokens.

In S1208-c, the digital asset exchange system, or other trusted entity system, shall publish to the blockchain network (e.g., the Ethereum Network) the transaction with instructions to be recorded by the blockchain network. In embodiments, a transaction fee may be required by, e.g., a miner, to process and add the requested transaction on the blockchain.

In embodiments, where SVCoin tokens have already been created and are maintained by the digital asset exchange system on reserve, S1208 may be replaced with S1208' as follows. In step 1208-a', the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange, or otherwise reserved by the trusted entity.

At step S1208-b', the digital asset exchange computer system, or other trusted entity system may then determine a portion of the reserve for transfer based on the requested amount of SVCoin identified by the Security Token issuer for transfer to the Security Token holder(s).

At step 1208-c', the digital asset exchange computer system, or other trusted entity system may update the SVCoin token ledger to change the address associated with the determined portion of the reserve SVCoin tokens to the address, or addresses, associated with the Security Token holder.

In S1210, the digital asset exchange computer system may send a message to the Security Token issuer registered user, and/or each of the designated digital asset addresses to reflect that the transaction was successfully processed. In embodiments, such messages may include information including: (i) digital asset address; (ii) the amount of tokens generated/or determined for transfer; and/or (iii) the new balances for the digital asset address or digital wallet associated therewith. In embodiments, the message may include additional information related to the Security Token, including: (iv) the amount of the Security Token held; (v) the dividend issued; and/or (vi) instructions on how to redeem the SVCoin.

EXAMPLES

The following examples illustrate embodiments of the present invention. They are not intended to be limiting. It will be appreciated by those of skill in the art that embodiments may be applied to other use cases not specifically called out herein without departing from the present invention.

Example 1: Real Estate Investment Trust (REIT) Token

In embodiments, shares in a real estate investment trust ("REIT Trust") may be issued using a digital asset, such as a token on the Ether Network ("REIT Token"). The REIT Trust may hold income generating property such as real estate which is leased. As the income generating property generates fiat profits which are intended to be distributed to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the REIT Trust) to REIT Token holders at the respective REIT Token holder's digital asset addresses associated with the Ether Wallet holding the REIT Token.

REIT Token holders may then use the SVCoin as a digital asset to conduct other transactions. Eventually, the SVCoin can be exchanged for fiat at the exchange based on the notional value (e.g., 1 SVCoin=1 dollar).

Example 2: Energy Master Limited Partnership (Energy MLP) Tokens

In embodiments, shares in an Energy Master Limited Partnership ("Energy MLP") may be issued using a digital asset, such as a token on the Ether Network ("Energy MLP Token"). The Energy MLP may offer shares (otherwise known as "units") in the form of a digital asset, such as Energy MLP Tokens that are publicly traded and which generate dividends to the shareholders. As the dividends are distributed on a periodic basis in the form of fiat currency, a corresponding amount of fiat is deposited with a digital asset exchange, such as a regulated digital asset exchange like Gemini. The fiat is then converted into a SVCoin by the Exchange. The SVCoin may then be distributed on a pro-rata basis (or as otherwise instructed by the Energy MLP) to Energy MLP Token holders at the respective Energy MLP Token holder's digital asset addresses associated with the Ether Wallet holding the Energy MLP Token.

Energy MLP Token holders may then use the SVCoin as a digital asset to conduct other transactions. Eventually, the SVCoin can be exchanged for fiat at the exchange based on the notional value (e.g., 1 SVCoin=1 dollar).

Example 3: Equity Security Tokens

In embodiments, equity shares corresponding to a stock certificate in an entity may be issued using a digital asset, such as a token on the Ether Network ("Equity Token"). As dividends based on the Equity Token are generated for distribution to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the entity distributing the shares) to Equity Token holders at the respective Equity Token holder's digital asset addresses associated with the Ether Wallet holding the Equity Token.

Equity Token holders may then use the SVCoin as a digital asset to conduct other transactions. Eventually, the SVCoin can be exchanged for fiat at the exchange based on the notional value (e.g., 1 SVCoin=1 dollar).

Example 4: Venture Capital (VC) Tokens

In embodiments, shares in a Venture Capital fund ("VC Fund") may be issued using a digital asset, such as a token on the Ether Network ("VC Token"). As the VC Fund generates returns to be distributed to investors in the VC Fund, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the VC Fund) to VC Token holders at the respective VC Token holder's digital asset addresses associated with the Ether Wallet holding the VC Token.

VC Token holders may then use the SVCoin as a digital asset to conduct other transactions. Eventually, the SVCoin can be exchanged for fiat at the exchange based on the notional value (e.g., 1 SVCoin=1 dollar).

Example 5: Private Equity (PE) Tokens

In embodiments, shares in a Private Equity fund ("PE Fund") may be issued using a digital asset, such as a token on the Ether Network ("PE Token"). As the PE Fund generates returns to be distributed to investors in the PE Fund, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the PE Fund) to PE Token holders at the respective PE Token holder's digital asset addresses associated with the Ether Wallet holding the PE Token.

PE Token holders may then use the SVCoin as a digital asset to conduct other transactions. Eventually, the SVCoin can be exchanged for fiat at the exchange based on the notional value (e.g., 1 SVCoin=1 dollar).

Example 6: Digital Certificate of Deposit (CD) Tokens

In embodiments, digital certificate of deposits ("Digital CD") may be issued using a digital asset, such as a token on the Ether Network ("CD Token"). As interest amounts are generated based on the terms of the certificate of deposits, a corresponding amount of fiat is to be deposited with a digital asset exchange, such as a regulated digital asset exchange like Gemini. The fiat is then converted into a SVCoin by the Exchange. Upon maturity of the Digital CD (or before maturity), the SVCoin may then be distributed on a pro-rata basis (or as otherwise instructed by the Digital CD issuer and/or less any premature withdrawal penalty) to CD Token holders at the respective CD Token holder's digital asset addresses associated with the Ether Wallet holding the CD Token.

CD Token holders may then use the SVCoin as a digital asset to conduct other transactions. Eventually, the SVCoin can be exchanged for fiat at the exchange based on the notional value (e.g., 1 SVCoin=1 dollar).

Example 7: Digital Bond Tokens

In embodiments, digital bonds may be issued using a digital asset, such as a token on the Ether Network ("Bond Token"). As interest amounts are generated based on the coupon rates of the digital bonds, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the digital bond issuer) to Bond Token holders at the respective Bond Token holder's digital asset addresses associated with the Ether Wallet holding the Bond Token.

Bond Token holders may then use the SVCoin as a digital asset to conduct other transactions. Eventually, the SVCoin can be exchanged for fiat at the exchange based on the notional value (e.g., 1 SVCoin=1 dollar).

Example 8: Peer-to-Peer Lending (P2P) Tokens

In embodiments, a peer-to-peer lending service ("P2P Service") may issue a digital asset, such as a token on the Ether Network ("P2P Loan Token"). As lending amounts and interest payments are distributed, corresponding amounts of fiat is deposited with a digital asset exchange, such as a regulated digital asset exchange like Gemini. The fiat is then converted into SVCoin by the Exchange. The SVCoin may then be distributed on a pro-rata basis (or as otherwise instructed by the lender/borrower) to P2P Loan Token holders at the respective P2P Loan Token holder's digital asset addresses associated with the Ether Wallet holding the P2P Loan Token.

P2P Loan Token holders may then use the SVCoin as a digital asset to conduct other transactions. Eventually, the SVCoin can be exchanged for fiat at the exchange based on the notional value (e.g., 1 SVCoin=1 dollar).

Example 9: Crowdfunding (CF) Tokens

In embodiments, a Crowdfunding service may issue a digital asset, such as a token on the Ether Network ("CF Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Crowdfunding service) to CF Token holders at the respective CF Token holder's digital asset addresses associated with the Ether Wallet holding the CF Token.

CF Token holders may then use the SVCoin as a digital asset to conduct other transactions. Eventually, the SVCoin can be exchanged for fiat at the exchange based on the notinal value (e.g., 1 SVCoin=1 dollar).

Example 10: Real Estate Crowdsourcing Tokens

In embodiments, a Real Estate Crowdsourcing services may issue a digital asset, such as a token on the Ether Network ("RE Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Real Estate Crowdsourcing service) to RE Token holders at the respective RE Token holder's digital asset addresses associated with the Ether Wallet holding the RE Token. RE Token holders may then use the SVCoin as a digital asset to conduct other transactions. Eventually, the SVCoin can be exchanged for fiat at the exchange based on the notional value (e.g., 1 SVCoin=1 dollar).

Example 11: Artistic/Digital Rights Payment Tokens

In embodiments, tokens may be issued against an artistic work, such as a song or movie (DR Token), for example, as a token on the Ethereum network. As royalties are collected for use of the song or movie, a corresponding amount of fiat may be deposited with a digital asset exchange. The fiat may be converted into SVCoin and distributed on a pro-rata basis to the rights holders who are DR Token holders. More specifically, the SVCoin may be transferred the digital asset address associated with a wallet of a DR Token holder as a payment of royalties.

In embodiments of the examples discussed above, the token holders may instigate payment of SVCoin by sending a request for payment. In this case, any transaction fees will be the responsibility of the token holder. In embodiments, the token issuer, or an agent thereof, may implement or instruct distribution of payments in which case transaction fees are the responsibility of the token issuer.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A method of issuing electronic payments using a stable value digital asset token on a digital asset security token comprising the steps of:
    (a) providing a digital asset security token database stored on a first set of one or more computer readable media associated with a digital asset security token issuer system associated with a digital asset security token issuer, wherein the digital asset security token database comprises a log of digital asset security tokens including:
        (i) a first set of digital asset addresses including a respective digital asset address for each respective digital asset security token holder; and
        (ii) a respective digital asset security token amount associated with each respective digital asset address,
    wherein each respective digital asset address of the first set of digital asset addresses is tied to a distributed public transaction ledger maintained by a plurality of geographically distributed computer systems in a peer-to-peer network in the form of a blockchain;
    (b) providing a stable value digital asset token database stored on the distributed public transaction ledger maintained by the plurality of geographically distributed computer systems in the peer-to-peer network in the form of the blockchain, wherein the stable value digital asset token database comprises a log of stable value digital asset tokens including:
        (i) a second set of digital asset addresses including a second respective digital asset address for each respective stable value digital asset token holder;
        (ii) a respective stable value digital asset token amount for each respective stable value digital asset token holder, wherein the stable value digital asset tokens are issued by a stable value digital asset token issuer using a digital asset exchange computer system associated with a digital asset exchange;
    (c) receiving, by the digital asset exchange computer system, a first request from the digital asset security token issuer system to purchase a first sum of stable value digital asset tokens in exchange for a second sum of fiat, wherein the first sum corresponds to the second sum based on a fixed notional amount;
    (d) verifying, by the digital asset exchange computer system, the first request, including:
        (i) verifying, by the digital asset exchange computer system, that the digital asset security token issuer is a registered user of the digital asset exchange; and
        (ii) verifying, by the digital asset exchange computer system, that the digital asset security token issuer has at least the second sum of fiat available for transaction with the digital asset exchange as reflected in a fiat ledger of the digital asset exchange computer system;

(e) accessing, by the digital asset exchange computer system, the digital asset security token database to determine:
  (i) each respective digital asset address of the first set of digital asset addresses for each respective digital asset security token holder; and
  (ii) the respective digital asset security token amount associated with each respective digital asset address;
(f) determining a respective payment amount in stable value digital asset tokens to be made to each respective digital asset address of the first set of digital asset addresses based at least in part on the fixed notional amount, the first sum of stable value digital asset tokens and the respective digital asset security token amount associated with each respective digital asset address of the first set of digital asset addresses;
(g) generating, by the digital asset exchange computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token;
(h) transferring, by the digital asset exchange computer system, the second sum of fiat on the fiat account ledger from the user account of the digital asset security token issuer, to a custodial account of the digital asset exchange associated with stable value digital asset tokens, wherein the digital asset exchange custodial account will maintain in trust a fifth amount of fiat corresponding to a sixth amount of stable value digital asset tokens outstanding based on the fixed notional amount;
(i) publishing, by the digital asset exchange computer system to the blockchain, transaction instructions associated with crediting the respective payment amount of stable value digital asset tokens to each respective digital asset address of the first set of digital asset addresses where ownership of each digital asset security token remains the same;
(j) notifying, by the digital asset exchange computer system, each digital asset address of the first set of the digital asset addresses of each respective transfer of stable value digital asset tokens to each respective digital asset address of the first set of digital asset addresses.

2. The method of claim 1, wherein the blockchain is the Ethereum blockchain.

3. The method of claim 1, wherein the blockchain is the Bitcoin blockchain.

4. The method of claim 1, wherein the digital asset exchange is a regulated digital asset exchange.

5. The method of claim 1, wherein the digital asset security token is a security registered with a government authority.

6. The method of claim 1, wherein the digital asset security token is a debt security and the electronic payments are interest.

7. The method of claim 1, wherein the digital asset security token is an equity security and the electronic payments are dividends.

8. The method of claim 1, wherein the digital asset security token is secured by intellectual property rights and the electronic payments are royalties.

9. The method of claim 1, wherein the blockchain is based on a mathematical protocol for proof of work.

10. The method of claim 9, wherein the mathematical protocol is open source.

11. The method of claim 1, wherein the blockchain is based on a mathematical protocol for proof of stake.

12. The method of claim 11, wherein the mathematical protocol is open source.

13. The method of claim 1, wherein the blockchain is based on a cryptographic mathematical protocol.

14. The method of claim 1, further comprising a step of publishing, by the digital asset exchange computer system to a side ledger, the transaction instructions associated with crediting the respective payment amount of stable value digital asset tokens to each respective digital asset address of the first set of digital asset addresses and the publishing step (i) includes publishing the transaction instructions from the side ledger to the distributed public asset ledger periodically or aperiodically.

15. The method of claim 1 further comprising steps of:
receiving, at the digital asset security token issuer system, from at least one digital asset security token holder, a payment request prior to the receiving step (c), the payment request including:
  (i) the digital asset address of the at least one digital asset security token holder; and
  (ii) a request to transfer a payment amount of stable value digital asset tokens to the digital asset address of the at least one digital asset security token holder;
confirming, at the digital asset security token issuer system, that:
  (i) the digital asset address of the at least one digital asset security token holder is valid;
  (ii) the digital asset security token amount of digital asset security tokens associated with the address of the at least one digital asset security token holder is more than zero; and
  (iii) the at least one digital asset security token holder is entitled to payment; and
generating, at the digital asset security token issuer system, the first request based at least in part on the payment request when the digital asset address of the at least one digital asset security token holder is valid, the digital asset security token amount of digital asset security tokens associated with the address of the at least one digital asset security token holder is more than zero and the at least one digital asset security token holder is entitled to payment.

16. The method of claim 1, wherein the digital asset security token database is maintained and stored on the plurality of geographically distributed computer systems in the peer-to-peer network in the form of the blockchain.

17. The method of claim 1, wherein the digital asset security token database is maintained on a sidechain, separate from the blockchain, wherein information on the sidechain is published and stored on the blockchain periodically or aperiodically.

18. The method of claim 1, wherein the generating step (g) includes generating, by the digital asset exchange computer system, transaction instructions for the first sum of stable value digital asset tokens by updating the stable value digital asset token database to reserve stable value digital asset tokens in the amount of the first sum.

19. The method of claim 1, wherein the payment information relates to a dividend to be paid based on ownership of each digital asset security token.

20. The method of claim 1, wherein the payment amount relates to a royalty to be paid based on ownership of each digital asset security token.

21. The method of claim 1, wherein the payment amount relates to interest to be paid based on ownership of each digital asset security token.

\* \* \* \* \*